United States Patent
Hasegawa

(10) Patent No.: US 6,587,316 B2
(45) Date of Patent: Jul. 1, 2003

(54) SPIN-VALVE TYPE THIN FILM MAGNETIC ELEMENT

(75) Inventor: Naoya Hasegawa, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 126 days.

(21) Appl. No.: 09/934,115

(22) Filed: Aug. 21, 2001

(65) Prior Publication Data
US 2002/0044394 A1 Apr. 18, 2002

(30) Foreign Application Priority Data
Aug. 31, 2000 (JP) .................................. 2000-264581

(51) Int. Cl.[7] .................................................. G11B 5/39
(52) U.S. Cl. ................................................... 360/324.1
(58) Field of Search .............................. 360/322, 324.1, 360/324.11, 324.12

(56) References Cited

U.S. PATENT DOCUMENTS

| | | | |
|---|---|---|---|
| 5,491,600 A | * 2/1996 | Chen et al. ................. 360/322 |
| 5,905,611 A | 5/1999 | Yoda et al. |
| 5,923,504 A | 7/1999 | Araki et al. |
| 5,946,167 A | * 8/1999 | Hara et al. ................. 360/322 |
| 5,968,676 A | 10/1999 | Araki et al. |
| 5,976,713 A | 11/1999 | Fuke et al. |
| 5,991,125 A | 11/1999 | Iwasaki et al. |
| 6,040,962 A | 3/2000 | Kanazawa et al. |
| 6,061,211 A | 5/2000 | Yoda et al. |
| 6,090,498 A | 7/2000 | Omata et al. |
| 6,262,869 B1 | * 7/2001 | Lin et al. ................ 360/324.11 |
| 6,292,336 B1 | * 9/2001 | Horng et al. .......... 360/324.12 |
| 6,466,418 B1 | * 10/2002 | Horng et al. .......... 360/324.12 |
| 6,493,194 B1 | * 12/2002 | Sakaguchi et al. .......... 360/322 |

* cited by examiner

Primary Examiner—David L. Ometz
(74) Attorney, Agent, or Firm—Brinks Hofer Gilson & Lione

(57) ABSTRACT

The relation of $(RS1/H1)/(Rsg/Hg) \leq 0.02$ is valid when the extending length in the vertical direction from an opposed face to an magnetic recording medium toward the inside of the electrode layer is represented by H1, a sheet resistance of the electrode layer is defined by Rs1, the extending length in the vertical direction from an opposed face to an magnetic recording medium toward the inside of the laminated body, or the elevation of the element, is defined by Hg, and the sheet resistance of the laminated body is defined by Rsg, thereby the output characteristics of the spin-valve type thin film magnetic element is improved while preventing side-reading from generating.

14 Claims, 29 Drawing Sheets

SPIN-VALVE TYPE THIN FILM MAGNETIC ELEMENT

BACKGROUND OF THE INVENTION

1. Field of the Invention

The present invention relates to a spin-valve type thin film magnetic element whose electric resistance changes in accordance to the relation between a fixed direction of magnetization of a fixed magnetic layer (pinned magnetic layer) and a direction of magnetization of a free magnetic layer being that are affected by an external magnetic field, and a thin film magnetic head comprising the spin-valve type thin film magnetic element. Particularly, the present invention relates to a technology suitable for use in a spin-valve type thin film magnetic element having an electrode layer comprising an overlay part extending on the surface of a laminated body from each side to the center of the laminated body.

2. Description of the Related Art

The spin-valve type thin film magnetic element is a kind of GMR (Giant Magnetic Electroresistive) element that senses recording magnetic fields from a recording medium such as a hard disk.

The spin-valve type thin film magnetic element has some excellent features such that it has a relatively simple structure among the GMR elements and a high rate of change of magnetoresistance against external magnetic fields, and the electrical resistance can be altered by a relatively weak magnetic field.

FIG. 24 shows a cross-sectional structure of one example of a conventional spin-valve type thin film magnetic element viewed from the face (ABS) side opposed to a recording medium.

The spin-valve type thin film magnetic element shown in FIG. 24 is a so-called bottom-type single spin-valve type thin film element in which one layer each of an antiferromagnetic layer, a pinned magnetic layer, a non-magnetic conductive layer and a free magnetic layer are laminated.

The travel direction of the magnetic recording medium such as the hard disk is in the Z-direction, and the direction of leak magnetic field from the magnetic recording medium is in the Y-direction in this spin-valve type thin film magnetic element.

The conventional spin-valve type thin film magnetic element shown in FIG. 24 comprises a laminated body 109, a pair of hard bias layers 105 formed at both sides of the laminated body 109, and a pair of electrode layers 108 formed on the hard bias layers 105, wherein the laminated body 109 comprises, from the bottom to the top on a substrate, an underlayer 106, an antiferromagnetic layer 101, a pinned magnetic layer 102, a non-magnetic conductive layer 103, a free magnetic layer 104 and a protective layer 107. The electrode layer 108 comprises an overlay part 108a extending over the surface of the laminated body 109 from each side toward the center of the laminated body.

The underlayer 106 comprises Ta (tantalum), and the antiferromagnetic layer 101 is made of an alloy such as a NiCo alloy, a FeMn alloy and a NiMn alloy. The pinned magnetic layer 102 and free magnetic layer 104 is made of Co or a NiFe alloy, Cu is used for the non-magnetic conductive layer 103, the hard bias layer 105 is made of a Co—Pt (cobalt-platinum) alloy, and the electrode layer 108 is made of Cu.

An exchange coupling magnetic field (a coupling anisotropic magnetic field) is generated at the interface between the pinned magnetic layer 102 and antiferromagnetic layer 101, by forming the pinned magnetic layer 102 in contact with the antiferromagnetic layer 101. The direction of magnetization of the pinned magnetic layer 102 is fixed, for example, in the Y-direction.

The direction of variable magnetization of the free magnetic layer 104 is aligned in the X1-direction by magnetizing the hard bias layer 105 in the X1-direction. As a result, the direction of variable magnetization of the free magnetic layer 104 is made to be approximately perpendicular to the direction of magnetization of the pinned magnetic layer 102.

In this spin-valve type thin film magnetic element, a sense current flows from the electrode layer 108 formed on the hard bias layer 105 through the pinned magnetic layer 102, non-magnetic conductive layer 103 and free magnetic layer 104. The travel direction of the magnetic recording medium such as the hard disk is in the Z-direction, and the direction of magnetization of the free magnetic layer 104 changes from the X1-direction to the T-direction when a leak magnetic field from the magnetic recording medium is applied in the Y-direction. Electrical resistance changes in relation to directional changes of magnetization in the free magnetic layer 104 and in the pinned magnetic layer 102 (referred as magnetoresistive effect MR), and the leak magnetic field from the magnetic recording medium is sensed by utilizing the voltage changes based on this electrical resistance change.

As shown in FIG. 24, each electrode layer 108 has an overlay part 108a extending on the laminated body 109 in this spin-valve type thin film magnetic element. Accordingly, almost all the part of a sense current J flows into the laminated body 109 from the tip of the overlay part 108a of the electrode layer 108, when a sense current as a detection current is allowed to flow into the pinned magnetic layer 102, non-magnetic conductive layer 103 and free magnetic layer 104 from the electrode layer 108.

Consequently, a center part 104a, through which almost all the sense current J flows, and side parts (electrode overlay parts) 104, through which few sense current flows, are formed in the free magnetic layer 104.

The central part of the laminated body 109 located between the overlay parts 108a of each electrode layer 108 substantially contributes to regeneration of the recording magnetic field from the magnetic recording medium in this spin-valve type thin film magnetic element, and serves as a sensitive zone manifesting a magnetoresistive effect. Each side part of the laminated body 109 located at under each overlay part 108a serves as a dead zone that does not substantially contribute to regeneration of the recording magnetic field from the magnetic recording medium.

The sensitive zone and dead zone are thus provided by forming an overlay parts 108a of each electrode layer 108. The width of this sensitive zone corresponds to a track width Tw of the spin-valve type thin film magnetoresistive element. Consequently, the track width Tw can be narrowed by providing the overlay part 108a in each electrode layer 108, thereby enabling to comply with narrow track width for high density recording.

However, when the electrode layer 108 is thin and has high resistivity, or when the junction part between each electrode layer 108 and laminated body 109 has a large junction resistance, for example, the sense current J flowing from the overlay part 108a encounters large resistance, and the magnitude of a shunt current J' of the sense current J flowing in through the hard bias layer 105 turns out to be substantially large.

As a result, the sense current J flows through the region represented by symbols D in FIG. 24 that are located under each overlay part 108a of the laminated body 109. When the sense current J flows through the regions D that should be naturally the dead zones, voltage changes based on magnetoresistance changes against the external magnetic field appear in the region D, and signals in the recording track of the magnetoresistive recording medium corresponding to the region D is regenerated due to expressed voltage changes in the region D based on the magnetoresistance change against the external magnetic field.

In the case of the narrowing the tack width for attaining high density recording on the magnetic recording medium, in particular, a side-reading phenomenon occurs whereby a line of information on the adjoining magnetic recording track is read in the region D in place of another line of information on the magnetic recording track that should be naturally read in the sensitive zone. This side-reading phenomenon arises noises to the output signal, and may serve as error sources.

In addition to the problems as hitherto described, it has been a fundamental demand that output characteristics and sensitivity of the spin-valve type thin film magnetic element should be more improved.

SUMMARY OF THE INVENTION

Accordingly, it is an object of the present invention to provide a thin film magnetic head comprising a spin-valve type thin film magnetic element in which output characteristics are improved while preventing side-reading phenomena from occurring.

The present invention for solving the foregoing problems provides a spin valve type thin film magnetic element comprising a laminated body, a bias layer for aligning the direction of magnetization of the free magnetic layer to be approximately perpendicular to the direction of magnetization of the pinned magnetic layer, and an overlay part extending over the surface of the laminated body from each both side toward the center of the laminated body. The laminated body is formed by laminating, on a substrate, at least an antiferromagnetic layer, a pinned magnetic layer formed in contact with the antiferromagnetic layer in which the direction of magnetization is fixed by an exchange coupling magnetic field with the antiferromagnetic layer, and a free magnetic layer formed on the pinned magnetic layer by being separated with a non-magnetic conductive layer. The direction of magnetization of the free magnetic layer is aligned approximately in perpendicular to the direction of magnetization of the pinned magnetic layer. A pair of electrode layers for providing a sense current to the laminated body are further provided. In the spin-valve type thin film magnetic element according to the present invention, the relation represented by the following general equation is valid when the length vertically extending from an opposed face to an magnetic recording medium toward the inside of the magnetic element is represented by H1, a sheet resistance of the electrode layer is represented by Rs1, the length vertically extending from an opposed face to an magnetic recording medium toward the inside of the magnetic element, or the elevation of the element, is represented by Hg, and the sheet resistance of the laminated body is represented by Rsg:

$$(Rs1/H1)/(Rsg/Hg) \leq 0.02$$

Since the spin-valve type thin film magnetic element as described above has the electrode layer comprising the overlay part extending on the surface of the laminated body from each side toward the center of the laminated body, the enter portion of the laminated body serves as a sensitive zone while each side portion located under the overlay part serves as a dead zone. Accordingly, the width of the sensitive zone may be used as a track width, enabling to comply with a narrow track width for high density recording.

In addition, since the relation of $(Rs1/H1)/(Rsg/Hg) \leq 0.02$ is valid when the length vertically extending from an opposed face to an magnetic recording medium toward the inside of the magnetic element is represented by H1, a sheet resistance of the electrode layer is represented by Rs1, the length vertically extending from an opposed face to an magnetic recording medium toward the inside of the magnetic element, or the elevation of the magnetic element, is expressed by Hg, and the sheet resistance of the laminated body is expressed by Rsg, the resistance against a sense current flowing in from the overlay part may be reduced, thereby also reducing a shunt sense current flowing in through the bias layer. As a result, the sense current flowing in the dead zone located at under the overlay part of the laminated body is reduced to prevent voltage changes in the dead zone from occurring. Consequently, side-reading of the spin-valve type thin film magnetic element may be also prevented.

Reducing the shunt sense current, and converging the sense current on the sensitive zone located at the center of the laminated body allow voltage changes in the sensitive region to be improved, thereby enabling output characteristics of the spin-valve type thin film magnetic element to be improved.

The range of the sensitive zone of the laminated body may be determined by a micro-track profile method.

This means that the "sensitive zone" can be defined as a zone where a signal with an intensity of 50% or more of the maximum signal intensity is obtained among the regenerative signals obtained by scanning the spin-valve type thin film magnetic element on a micro-track on which signals have been recorded.

The "dead zone" of the laminated body is located at each side of the sensitive zone, and can be defined as a zone where the signal intensity is reduced to 50% or less of the maximum signal intensity.

Preferably, H1, Rs1, Hg and Rsg satisfy the relation represented by the following general equation in the spin-valve type thin film magnetic element described above:

$$(Rs1/H1)/(Rsg/Hg) \leq 0.01$$

The electrical resistance against the sense current flowing in from the overlay part may be more reduced, thereby further reducing the sense current flowing in through the bias layer, by providing a spin-valve type thin film magnetic element satisfying the equation above.

Consequently, side-reading of the spin-valve type thin film magnetic element may be more effectively prevented. It is also possible to further improve output characteristics of the spin-valve type thin film magnetic element by enhancing voltage changes in the sensitive zone.

The present invention also provides a spin valve type thin film magnetic element comprising a laminated body, a bias layer for aligning the direction of magnetization of the free magnetic layer to be approximately perpendicular to the direction of magnetization of the pinned magnetic layer, and an overlay part extending over the surface of the laminated body from the each side toward the center of the laminated body. The laminated body is formed by laminating, on a substrate, at least an antiferromagnetic layer, a pinned magnetic layer formed in contact with the antiferromagnetic layer in which the direction of magnetization is fixed by an exchange coupling magnetic field with the antiferromagnetic layer, and a free magnetic layer formed on the pinned magnetic layer by being separated with a non-magnetic conductive layer. The direction of magnetization of the free magnetic layer is aligned to be approximately perpendicular to the direction of magnetization of the pinned magnetic layer. A pair of electrode layers for providing a sense current to the laminated body are further provided. The relation represented by the following general equation is valid when the length vertically extending from an opposed face to an magnetic recording medium toward the inside of the electrode layer is represented by H1, the length Hg vertically extending from an opposed face to an magnetic recording medium toward the inside of the laminated body, or the elevation of the element, is adjusted in the range of 0.2 to 0.5 $\mu$m, and a sheet resistance Rsg of the electrode layer is adjusted in the range of 15 to 25 $\Omega/M^2$:

$$(Rs1/H1)/(Rsg/Hg) \leq 1\ \Omega/\mu m$$

The electrical resistance against the sense current flowing in from the overlay part may be reduced, thereby enabling a shunt sense current flowing in through the bias layer to be reduced, in the spin-valve type thin film magnetic element so constructed as described above. As a result, the sense current flowing in the dead zone located under the overlay part of the laminated body may be reduced to prevent voltage changes in the dead zone from appearing, thereby enabling side reading of the spin-valve type thin film magnetic element to be prevented.

Since the shunt sense current is reduced to enable the sense current to be converged on the sensitive zone located at the center of the laminated body, and voltage changes at the sensitive zone may be enhanced to enable output characteristics of the spin-valve type thin film magnetic element to be improved.

Desirably, the relation represented by the following general equation is valid in the relation between H1 and Rs1 when Hg is adjusted within the range of 0.2 to 0.5 $\mu$m and Rsg is adjusted within the range of 15 to 25 $\Omega/M^2$:

$$(Rs1/H1) \leq 0.5\ \Omega/\mu m$$

The electrical resistance against the sense current flowing in from the overlay part may be reduced, thereby enabling a shunt sense current flowing in through the bias layer to be reduced, in the spin-valve type thin film magnetic element so constructed as described above.

As a result, side reading of the spin-valve type thin film magnetic element may be more effectively prevented. Voltage changes in the sensitive zone is further enhanced to enable output characteristics of the spin-valve type thin film element to be more improved.

Desirably, the angle formed between the surface of the overlay part of the electrode layer and the surface of the laminated body is within the range of 45 degrees to 70 degrees in the spin-valve type thin film magnetic element as hitherto described.

The electrical resistance against the sense current flowing in from the overlay part may be reduced, thereby enabling a shunt sense current flowing in through the bias layer to be reduced, in the spin-valve type thin film magnetic element so constructed as described above.

Reducing the shunt current allows side reading of the spin-valve type thin film magnetic element to be more effectively prevented. Output characteristics of the spin-valve type thin film element may be also more improved as a result of enhancing voltage changes in the sensitive zone.

The spin-valve type thin film magnetic element as described above may comprise a dual structure in which the non-magnetic conductive layer, pinned magnetic layer and antiferromagnetic layer are formed on both side of the free magnetic layer, respectively, in the direction of thickness.

Two sets of combinations of the three layers of the free magnetic layer/non-magnetic conductive layer/pinned magnetic layer are available in the spin-valve type thin film magnetic element as described above, which may provide a larger rate of change of magnetoresistance ($\Delta R/R$) as compared with a single spin-valve type thin film magnetic element to make it possible to comply with high recording density of the magnetic head.

Desirably, the spin-valve type thin film magnetic element comprises a mean free path extension layer for extending the mean free path of conduction electrons.

The "mean free path extension layer" as used herein refers to at least one of a backed layer and a specular layer.

In the spin-valve type thin film magnetic element as described above, the mean free path of the conduction electrons having (+)-spins (up-spin) that are responsible for the magnetoresistive effect may be extended to obtain a so-called spin-filter effect, thereby obtaining a large rate of change of magnetoresistance ($\Delta R/R$) to comply with high density recording of the magnetic head.

Providing a specular layer as the mean free path extension layer in the spin-valve type thin film magnetic element described above allows the rate of change of magnetoresistance to be increased by a specular effect as will be described hereinafter.

The reason why the rate of change of magnetoresistance increases by providing the backed layer and specular layer will be described below. Before the description, the principle of a giant magnetoresistive effect in the spin-valve type thin film magnetic element will be briefly described. An example when the backed layer or the specular layer is disposed at a position where the free magnetic layer does not contact the non-magnetic conductive layer will be described herein.

The conduction electrons mainly travels in the vicinity of the non-magnetic conductive layer having a smaller electrical resistance when a sense current is applied to the spin-valve type thin film magnetic element. The conduction electrons involve two kinds of conduction electrons having up-spins ((+)-spins or upward spins) and down-spins ((−)-spins or downward spins) in equal probability.

The rate of change of magnetoresistance of the spin-valve type thin film magnetic element is positively correlated with the mean free path of these two kinds of conduction electrons.

The conduction electrons having down-spins are always scattered at the interface between the non-magnetic conductive layer and free magnetic layer irrespective of the direction of the applied external magnetic field, and the probability for allowing the conduction electrons to be transferred to the free magnetic layer remains low. Accordingly, the mean free path of the down-spin electrons remains shorter as compared with the up-spin conduction electrons.

The conduction electrons having up-spins are transferred from the non-magnetic conductive layer to the free magnetic layer with a high probability, when the direction of magnetization of the free magnetic layer turn out to be in parallel relation to the direction of magnetization of the pinned magnetic layer, thereby making the mean free path of the conduction electrons longer. The mean free path is shortened, on the other hand, as a result of high incidence of scattering at the interface between the non-magnetic conductive layer and free magnetic layer, as the direction of magnetization of the free magnetic layer shifts from the parallel direction when the direction of magnetization of the pinned magnetic layer is affected by the external magnetic field.

The mean free path of the up-spin conduction electrons is greatly changed by the action of the external magnetic field, as compared with the mean free path of the down-spin conduction electrons. Large change in the free path differences of the mean free path among the up-spin conduction electrons results in resistivity changes, also increasing the rate of change of magnetoresistance ($\Delta R/R$) of the spin-valve type thin film magnetic element.

Connecting the backed layer to the free magnetic layer enables the up-spin conduction electrons traveling in the free magnetic layer to be transferred into the backed layer, and the mean free path of the up-spin conduction electrons may be further extended in proportion to the thickness of the backed layer. Consequently, a so-called spin-filter effect may be manifested to increase the mean free path differences of the conduction electrons, thereby enabling the rate of change of magnetoresistance ($\Delta R/R$) of the spin-valve type thin film magnetic element to be further improved.

When the specular layer is laminated on the position where the free magnetic layer does not contact the non-magnetic conductive layer, on the other hand, a potential barrier is formed at the interface between the specular layer and free magnetic layer. As a result, the up-spin conduction electrons traveling in the free magnetic layer may be reflected while their spin states conserved, thereby enabling specular reflection of the up-spin conduction electrons. Accordingly, the mean free path of the up-spin conduction electrons may be extended. The so-called specular effect may be expressed as a result of extended mean free path, and the mean free path differences among the spin-dependent conduction electrons are further increased to enhance the rate of change of magnetoresistance of the spin-valve type thin film magnetic element.

When a specular layer is laminated at the opposite side to the face of the backed layer, which is connected to the free magnetic layer and in contact with the free magnetic layer, the mean free path of the up-spin conduction electrons increases by the spin-filter effect, and the so-called specular effect may be expressed due to the potential barrier formed at the interface between the specular layer and backed layer. Consequently, the mean free path of the up-spin conduction electrons may be further extended by allowing the up-spin conduction electrons to be reflected while conserving their spin states. The mean free path differences among the spin-dependent conduction electrons are further increased to enhance the rate of change of magnetoresistance of the spin-valve type thin film magnetic element.

At least one of the pinned magnetic layer and free magnetic layer may be divided in two parts by being separated with the non-magnetic intermediate layer, and the direction of magnetization of one of the divided layer is by 180° different from the direction of magnetization of the other divided layer to form a ferrimagnetic state in the spin-valve type thin film magnetic element as hitherto described.

When at least the pinned magnetic layer is divided in two parts by being separated with the non-magnetic intermediate layer in the spin-valve type thin film magnetic element, one of the divided pinned magnetic layers serves for fixing the direction of magnetization of the other divided pinned magnetic layer in a proper direction, thereby enabling the magnetic state of the pinned magnetic layer to be maintained in a quite stable state.

An exchange coupling magnetic field is generated, on the other hand, between the divided free magnetic layers, when at least the free magnetic layer is divided into two layers by being separated with the non-magnetic intermediate layer. The free magnetic layers are put into a ferrimagnetic state to permit magnetization of the free magnetic layer to be sensitively reversed against the external magnetic field.

Desirably, the antiferromagnetic layer comprises an alloy containing Mn, and at least one element of Pt, Pd, Rh, Ru, Ir, Os, Au, Ag, Cr, Ni, Ne, Ar, Xe and Kr in the spin-valve type thin film magnetic element as hitherto described.

The antiferromagnetic layer comprising the alloy as described above has a high exchange coupling magnetic field, is excellent in corrosion resistance, and can express a sufficient exchange coupling magnetic field even at a relatively high temperature. Therefore, the operation of the spin-valve type thin film magnetic element may be stabilized particularly even at a relatively high temperature.

The problems as hitherto described can be solved by the thin film magnetic head comprising the spin-valve type thin film magnetic element as described above.

Since the thin film magnetic head comprises the spin-valve type thin film magnetic element as hitherto described, it may be used as a thin film magnetic head having a high regenerative output of magnetic information while having a low incidence of side reading.

DESCRIPTION OF THE PREFERRED EMBODIMENT

A spin-valve type thin film magnetic element according to the present invention and a method for manufacturing thereof, and a thin film magnetic head using the spin-valve type thin film magnetic element will be described hereinafter with reference to the attached drawings.

First Embodiment

Figure 1:
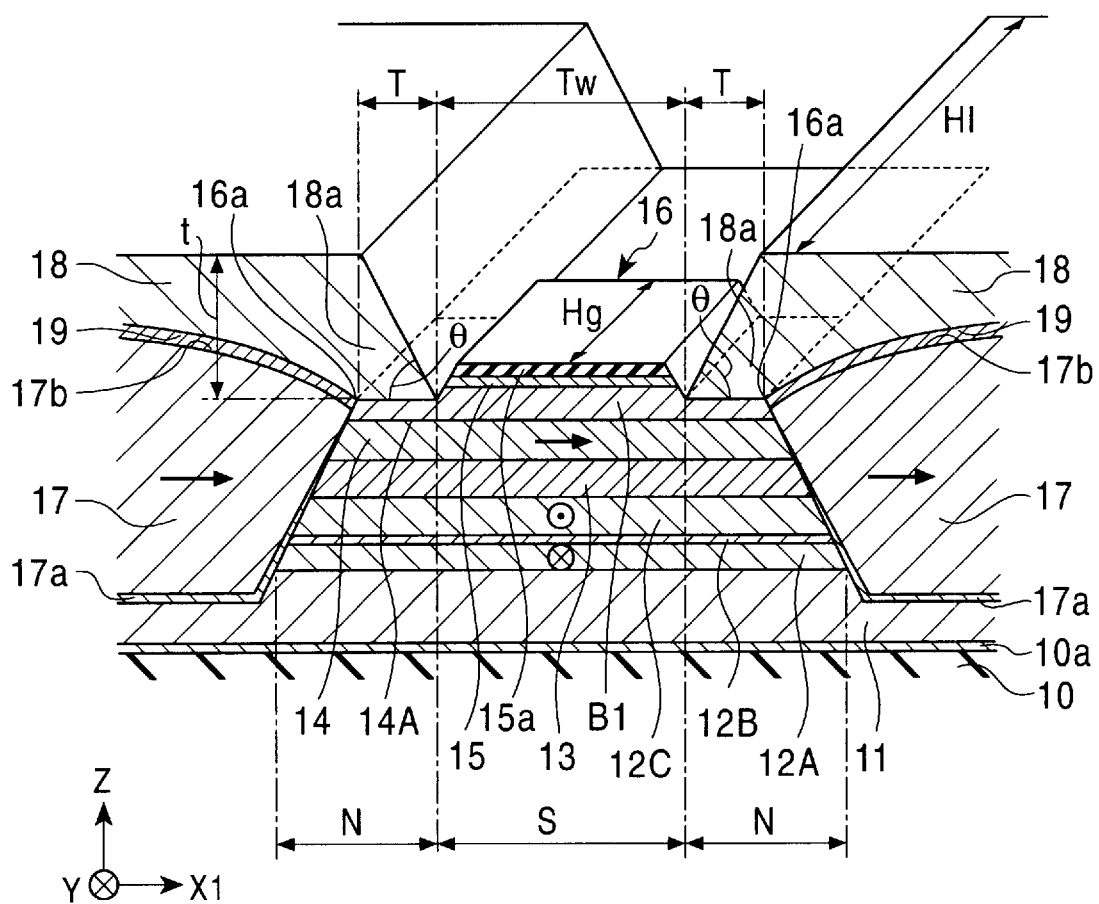
FIG. 1 is a cross section showing the structure of the spin-valve type thin film magnetic element according to the first embodiment of the present invention viewed from the opposed face side to the recording medium.

FIG. 1 is a cross section showing the structure of the spin-valve type thin film magnetic element according to the first embodiment of the present invention viewed from the opposed face side to the recording medium.

The spin-valve type thin film magnetic element according to the present invention is a kind of GMR (giant magnetoresistive) element taking advantage of a giant magnetoresistive effect. This spin-valve type thin film magnetic element is provided at the end of a trailing side of a floating type slider as will be described hereinafter, and functions to sense recording magnetic fields from, for example, a hard disk. The travel direction of the magnetic recording medium such as the hard disk is in the Z-direction shown in the drawing, and the direction of a leak magnetic field from the magnetic recording medium is in the Y-direction.

The spin-valve type thin film magnetic element according to the first embodiment of the present invention is a bottom type magnetic element formed by laminating, from the substrate side, an antiferromagnetic layer, two pinned magnetic layers, a non-magnetic conductive layer and a free magnetic layer in this order. The pinned magnetic layer comprises a first pinned magnetic layer and a second pinned magnetic layer. The second pinned magnetic layer is formed on the first pinned magnetic layer by being separated with a non-magnetic intermediate layer, and the direction of magnetization thereof is aligned in antiparallel relation to the direction of magnetization of the first pinned magnetic layer. Accordingly, this spin-valve type thin film magnetic element is a kind of single spin-valve type thin film magnetic elements in which the pinned magnetic layer is put into a synthetic ferrimagnetic state, or a thin film magnetic element comprising so-called synthetic ferrimagnetic pinned layers. A hard bias layer is provided as the bias layer.

In FIG. 1, the reference numeral 10 denotes the substrate. An underlayer 10a is provided on the substrate 10, an antiferromagnetic layer 11 is formed on the underlayer 10a, and pinned magnetic layers and a non-magnetic intermediate layer are further formed on the antiferromagnetic layer 11.

The pinned magnetic layers comprise a first pinned magnetic layer 12A and a second pinned magnetic layer 12C, which is formed on the first pinned magnetic layer 12A by being separated with a non-magnetic intermediate layer 12B, and the direction of magnetization of the second pinned magnetic layer 12C is aligned in an antiparallel direction to the direction of magnetization of the first pinned magnetic layer 12A.

A non-magnetic conductive layer 13 comprising, for example, Cu is formed on the second pinned magnetic layer 12C, and a free magnetic layer 14 is formed on the non-magnetic conductive layer 13. A backed layer B1 provided as a mean free path extension layer is formed on the free magnetic layer 14, and a protective layer 15 comprising, for example, Ta is formed on the backed layer B1. An oxide layer 15a comprising tantalum oxide (Ta oxide) is formed on the protective layer 15.

As shown in FIG. 1, a laminated body 16 having an approximately trapezoidal cross section is constructed of each layer from a part of the antiferromagnetic layer 11 to the oxide layer 15a.

The length vertically extending from an opposed face to a recording medium toward the inside of the magnetic element on the laminated body 16, or the elevation of the magnetic element Hg, is preferably in the range of 0.2 to 0.5 µm.

The sheet resistance Rsg of the laminated body 16 is preferably in the range of 15 to 25 $\Omega/M^2$.

The reference numerals 17 denotes a hard bias layer, and the reference numeral 18 denotes an electrode layer.

The hard bias layer 17 is formed on the antiferromagnetic layer 11 projecting at each sides (each side in the direction of the track width) of the laminated body 16 shown in FIG. 1 by being separated with a bias underlayer 17a. An electrode layers 18 is formed on the hard bias layer 17 by being separated with an intermediate layer 19 comprising Ta or Cr.

The bottom type spin-valve type thin film magnetic element shown in FIG. 1 in which the antiferromagnetic layer 11 is located at the bottom is able to reduce the resistance generated by a large resistivity of the antiferromagnetic layer 11 against a sense current supplied to the laminated body 16, thereby enabling the proportion of the shunt sense current to be reduced.

Consequently, side reading may be prevented to enable the magnetic head to comply with high density magnetic recording. A contact resistance may be further reduced by allowing an overlay portion 18a of the electrode 18 to contact the exposed backed layer B1, also enabling the shunt current component of the sense current flowing from the hard bias layer 17 into the lower side of the laminated body 16 to be further reduced.

More precisely, the underlayer 10a is preferably formed of Ta in the spin-valve type thin film magnetic element according to the first embodiment of the present invention.

Preferably, the antiferromagnetic layer 11 has a thickness of about 80 to 110 angstroms at the center of the laminated body 16, and is formed of a PtMn alloy. The PtMn alloy is superior in corrosion resistance to a NiMn alloy and FeMn alloy that have been used as the antiferromagnetic layer, and has a high blocking temperature and large exchange coupling magnetic field (exchange anisotropic magnetic field).

The antiferromagnetic layer may be formed of an alloy represented by a formula of X—Mn (X represents one of the element selected from Pd, Ru, Ir, Rh and Os) or an alloy represented by a formula of X'—Pt—Mn (X' represents at least one element selected from Pd, Ru, Ir, Rh, Os, Au, Ag, Cr, Ni, Ar, Ne, Xe and Kr), in place of the PtMn alloy.

Pt or X is desirably contained in the range of 37 to 63 atomic % (at %) in the PtMn alloy or the alloy represented by the formula X—Mn. More preferably, the content is in the range of 47 to 57 at %.

X+Pt is desirably in the range of 37 to 63 at % in the alloy represented by the formula X'—Pt—Mn. More preferably, the content is in the range of 47 to 57 at %. X' in the alloy represented by the formula X'—Pt—Mn is desirably in the range of 0.2 to 10 at %.

However, when X' is selected from at least one of Pd, Ru, Ir, Rh and Os, X' is desirably in the range of 0.2 to 40 at %.

The antiferromagnetic layer 11 generating a large exchange coupling magnetic field may be obtained by using an alloy having a proper composition range as described above and by subjecting the alloy to a heat-treatment. When the PtMn alloy is particularly used, an excellent antiferromagnetic layer 11 having an exchange coupling magnetic field of more than 800 Oe and a blocking temperature, a temperature when the exchange coupling magnetic field is lost, of quite as high as 380° C. may be obtained. One Oersted (Oe) corresponds to 80 A/m.

The first and second pinned magnetic layer 12A and 12C comprise a thin film of an antiferromagnetic material, for example Co, a NiFe alloy, a CoNiFe alloy, a CoFe alloy and a CoNi alloy, and preferably has a thickness of about 10 to 30 angstroms. The first pinned magnetic layer 12A comprises, for example, Co and its thickness is adjusted to 13 to 15 angstroms. The second pinned magnetic layer 12C also comprises, for example, Co and its thickness is adjusted to 20 to 25 angstroms.

The non-magnetic intermediate layer 12B is preferably made of an alloy comprising at least one of Ru, Rh, Ir, Cr, Re and Cu, and is usually formed into a thickness of about 8 angstroms.

The first pinned magnetic layer 12A is formed in contact with the antiferromagnetic layer 11, and generates an exchange coupling magnetic field (exchange anisotropic magnetic field) at the interface between the first pinned magnetic layer 12A and antiferromagnetic layer 11 by annealing (an annealing treatment) in a magnetic field, thereby the direction of magnetization of the first pinned magnetic layer 12A is fixed, for example, in the Y-direction as shown in FIG. 1. The direction of magnetization of the second pinned magnetic layer 12C facing the first pinned magnetic layer by being separated with the non-magnetic intermediate layer 12B is fixed to be antiparallel to the direction of magnetization of the first pinned magnetic layer 12A, or in an inverse direction to the Y-direction, when the direction of magnetization of the first pinned magnetic layer 12A is fixed to the Y-direction.

The larger the exchange coupling magnetic field is, the more securely the direction of magnetization of the first pinned magnetic layer 12A and the direction of magnetization of the second pinned magnetic layer 12C can be stabilized in an antiparallel state with each other. Since the PtMn alloy, having a high blocking temperature and being able to generate a large exchange coupling magnetic field (an exchange anisotropic magnetic field) at the interface with the first pinned magnetic layer 12A, is in particular used as the antiferromagnetic layer 11, heat-stable magnetization states of the first pinned magnetic layer 12A and second pinned magnetic layer 12C may be also maintained.

The exchange anisotropic coupling magnetic field (Hex) may be increased, and the direction of magnetization of the first pinned magnetic layer 12A and the direction of magnetization of the second pinned magnetic layer 12C may be maintained in a thermally stable antiparallel state (a ferrimagnetic state) with each other, by restricting the film thickness ratio between the first pinned magnetic layer 12A and second pinned magnetic layer 12C within an appropriate range. In addition, the rate of change of magnetoresistance (ΔR/R) may be also controlled in a level identical to the conventional ones. Properly controlling the magnitude and direction of the magnetic field during heat-treatment also enables the directions of magnetization of the first and second pinned magnetic layers 12A and 12C to be controlled in desired directions.

The non-magnetic conductive layer 13 comprises Cu (copper), and its thickness is adjusted to 20 to 25 angstroms.

The free magnetic layer 14 usually has a thickness of 20 to 50 angstroms, and is preferably formed of the same material as the material for the first and second pinned magnetic layers 12A and 12C.

The backed layer B1 comprises a metal such as Cu and a non-magnetic conductive material, may be constructed by a material selected from a group Au, Ag and Cu, and has a thickness of, for example, 12 to 20 angstroms.

The protective layer 15 comprises Ta, and the surface of Ta is oxidized to form an oxide layer 15a. The protective layer 15 is formed so that the both ends in the track width direction (the X1-direction in FIG. 1) is shorter than the upper face of the laminated body 16, and the backed layer B1 is exposed at the both ends of the upper face of the laminated body 16.

The bias underlayer 17a is an buffer layer or an oriented film, preferably made of Cr, and has a thickness of, for example, about 20 to 50 angstroms, preferably about 35 angstroms.

The intermediate layer 19 comprises, for example, Ta, and has a thickness of about 50 angstroms.

These bias underlayer 17a and intermediate layer 19 function as diffusion barriers to facilitate heat diffusion between the bias layer 17 and surrounding layers, thereby preventing magnetic characteristics of the hard bias layer 17 from being deteriorated, when the magnetic head is exposed to a high temperature in a hardening step (UV curing or hard baking) applied in the process for manufacturing an inductive head (a write head) as a post process.

The bias layer 17 usually has a thickness of about 200 to 500 angstroms, and is preferably formed of, for example, a Co—Pt alloy, a Co—Cr—Pt alloy and Co—Cr—Ta (cobalt-chromium-tantalum) alloy.

The direction of magnetization of the free magnetic layer 14 is aligned in the X1-direction, by magnetizing the hard bias layer 17 in the X1-direction. Consequently, the direction of the variable magnetization of the free magnetic layer 14 and the direction of the fixed magnetization of the second pinned magnetic layer 12C are made to be perpendicular with each other.

The bias layer 17 is disposed at the same elevation as the free magnetic layer 14, and preferably has a larger thickness than the thickness of the free magnetic layer 14 in the direction of thickness of the free magnetic layer 14. The upper face 17b of the hard bias layer 17 is disposed at a position being more remote from the substrate 10 than the upper face 14A of the free magnetic layer 14 (at the upper side in FIG. 1). The lower face 17a of the hard bias layer 17 is disposed at a position more close to the substrate 10 than the lower face of the free magnetic layer 14 (at the lower side in FIG. 1).

The junction point between the upper face 17b of the hard bias layer 17 and the side face of the laminated body 16 is preferably located at a position closer to the substrate 10 side than the upper end 16a of the laminated body 16 (lower side in FIG. 1), as well as at a lower side than the uppermost position of the hard bias layer 17 (at both end side of the upper face 17b of the hard bias layer 17 in FIG. 1) at a position remote from the laminated body 16. Flux control in the magnetic field acting on the free magnetic layer 14 from the hard bias layer 17 is facilitated, or the leak magnetic field from the hard bias layer 17 is absorbed in the layers such as the upper shield layer located at above the laminated body 16, thereby an effective magnetic field applied to the free magnetic layer 14 is hardly reduced. Consequently, the free magnetic layer 14 is readily put into a single magnetic domain state, and the magnetic domain of the free magnetic layer 14 may be favorably controlled.

Electric resistance of the electrode layer 18 can be reduced by forming it with a single layer film or a multilayer film comprising at least one of Cr, Au, Ta and W. Cr is selected herein as the material for the electrode layer 18, and its electrical resistance is reduced by allowing Cr to undergo epitaxial growth on the intermediate layer 19 comprising Ta.

The electrode layer 18 forms an overlay part 18a on the upper face of the laminated body 16 by being extended on the exposed backed layer B1, and the overlay part 18a is joined to the backed layer B1 by being deposited on the laminated body 16.

A zone (a sensitive zone S) that is substantially responsible for regeneration of the recording magnetic field from the magnetic recording medium, and a zone (a dead zone N) that is not substantially responsible for regeneration of the recording magnetic field from the magnetic recording medium are formed by allowing the overlay part 18a to join the laminated body 16. The width of the sensitive zone S serves as a magnetic track width of the spin-valve type thin film magnetic element, and enables the magnetic head to comply with narrow track width.

The proportions of the sensitive zone S and dead zone N in the laminated body 16 are determined by a micro-track profile method.

The Micro-track profile method will be described hereinafter with reference to FIG. 23.

Figure 23:
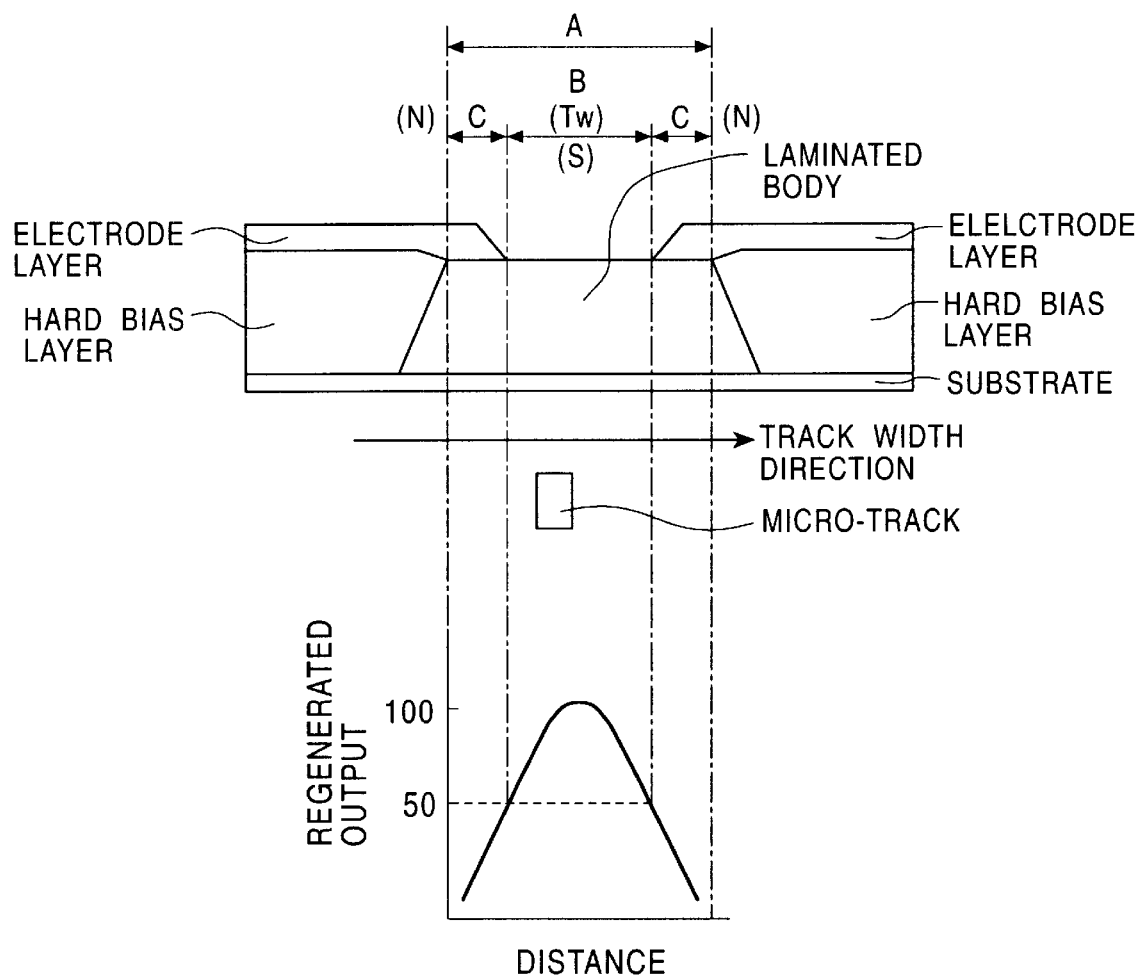
FIG. 23 illustrates a method for determining the sensitive zone and dead zone included in the laminated body of the spin-valve type thin film magnetic element.

As shown in FIG. 23, a spin-valve type thin film magnetic element according to the present invention, comprising a laminated body manifesting a magnetoresistive effect, hard bias layers formed at both sides of the laminated body, and overlay part extending on the surface of the laminated body, are formed on a substrate.

The width B of the upper face of the laminated body not covered with the electrode layers is measured with an optical microscope or an electron microscope. This width B is defined as a track width Tw measured by an optical method.

A given signal is recorded on the recording medium as a micro-track, and the relation between the width A of the laminated body and regenerative output is measured by allowing the spin-valve type thin film magnetic element to scan on the micro-track in the direction of the track width.

Alternatively, the relation between the width A of the laminated body and regenerative output may be measured by allowing the magnetic recording medium side on which the micro-track is formed to scan on the spin-valve type thin film magnetic element in the direction of the track width. The results are shown at the bottom of FIG. 23.

According to these measurement results, the regenerative output is higher in the vicinity of the center of the laminated body, and the regenerative output is lower at the side portions of the laminated body. These results show that, while a good magnetoresistive effect is displayed at near the center of the laminated body concern the regenerative functions, the regenerative output is low due to the poor magnetoresistive effect at both side portions, thereby lowering the regenerative functions.

In the present invention, the zone formed at a width B of the upper face of the laminated body where a regenerative output of 50% or more of the maximum regenerative output is generated is defined the sensitive zone, and the zone formed at a width C of the upper face of the laminated body where only a regenerative output of less than 50% of the maximum regenerative output is generated is defined as the dead zone.

As shown in FIG. 23, the sensitive zone S is a zone that substantially exhibit a magnetoresistive effect, and the width of the sensitive zone serves as the magnetic track width. The dimension of the surface of the laminated body in the track width direction (X1-direction in FIG. 1) where no overlay parts 18a are formed corresponds to an optical track width Tw (dimension B).

As shown in FIG. 23, the optical track width Tw (dimension B) and the magnetic track width S is controlled to be approximately the same size, or the magnetic track width S is adjusted to be a little wider than the optical track width Tw (dimension B).

The construction as described above permits the sense current flowing from the electrode layer 18 to the laminated body 16 to be hardly flows through the hard bias layers 17, and increases the proportion of the sense current that does not flow through the bias layers but directly flows in the laminated body. In addition, a junction resistance that does not contribute to the magnetoresistive effect may be reduced by increasing the junction area between the laminated body 16 and the electrode layer 18, thereby enabling regeneration characteristics of the element to be improved.

The spin-valve type thin film magnetic element having the structure shown in FIG. 1 satisfies the relation represented by the following equation, when the length vertically extending from an opposed face to an magnetic recording medium toward the inside of the electrode layer 18 is represented by H1, a sheet resistance of the electrode layer 18 is represented by Rs1, the length vertically extending from an opposed face to an magnetic recording medium toward the inside of the laminated body 16, or the elevation of the element, is represented by Hg, and the sheet resistance of the laminated body is represented by Rsg:

$$(Rs1/H1)/(Rsg/Hg) \leq 0.02$$

A value of (Rs1/H1)/(Rsg/Hg) exceeding 0.02 is not preferable, since an effect for increasing the proportion of the sense current flowing in from the overlay part 18a of the electrode layer 18 is not sufficiently obtained, thereby potentially generating side reading.

The relation among H1, Rs1, Hg and Rsg is preferably represented by the following equation:

$$(Rs1/H1)/(Rsg/Hg) \leq 0.01$$

The spin-valve type thin film element having the structure shown in FIG. 1 satisfies the relation represented by the following general equation, when the length vertically extending from an opposed face to an magnetic recording medium toward the inside of the electrode layer 18 is represented by H1, the sheet resistance of the electrode 18 is represented by Rs1, the length Hg vertically extending from an opposed face to an magnetic recording medium toward the inside of the laminated body 16, or the elevation of the element, is adjusted in the range of 0.2 to 0.5 µm, and the sheet resistance Rsg of the electrode layer is adjusted in the range of 15 to 25 $\Omega/M^2$:

$$(Rs1/H1) \leq 1 \ \Omega/\mu m$$

A value of (Rs1/H1) exceeding 1 $\Omega/\mu m$ is not preferable, since a sufficient effect for increasing the proportion of the sense current flowing in from the overlay part 18a of the electrode 18 cannot be obtained, thereby potentially generating side reading.

In the relation between H1 and Rs1, the following general equation is preferably satisfied when Hg is adjusted within the range of 0.2 to 0.5 µm and Rsg is adjusted within the range of 15 to 25 $\Omega/M^2$:

$$(Rs1/H1) \leq 0.5 \ \Omega/\mu m$$

The angle θ formed between the surface of the overlay part 18a of the electrode layer 18 and the surface of the laminated body 16 is preferably in the range of 45 to 70 degrees.

An angle θ of smaller than 45 degrees is not preferable, since only the tip of the overlay part 18a is thinned and the sheet resistance Rs1 of the tip part increases to increase the resistance against the sense current flowing in from the overlay part 18a, thereby potentially generating side reading.

An angle θ of larger than 70 degrees is also not preferable, since the step height between the upper face of the electrode layer and the upper face of the laminated body turns out to be too steep that the insulation film that serves as the upper gap deposited on the upper face of the spin-valve type thin film magnetic element can hardly cover the step height, thereby potentially forming an electrical short circuit between the upper shield and the spin-valve type thin film magnetic element.

In the spin-valve type thin film element having the structure shown in FIG. 1, a sense current flows from the electrode 18 to the laminated body 16. The direction of magnetization of the free magnetic layer 14 varies from the X1-direction to the Y-direction when a magnetic field is applied from the magnetic recording medium to the Y-direction as shown in FIG. 1. Then, electrical resistance changes at the interface between the non-magnetic conductive layer 13 and free magnetic layer 14, and at the interface between the non-magnetic conductive layer 13 and second pinned magnetic layer 12C by spin-dependent scattering of the conduction electrons due to the so-called GMR effect, thereby the leak magnetic field from the recording medium is sensed.

The mean free path of (+)-spin (up-spin) electrons that are responsible for the magnetoresistive effect can be extended by providing the backed layer B1 in the spin-valve type thin film magnetic element having the structure shown in FIG. 1. Consequently, a large rate of change of magnetoresistance (ΔR/R) is obtained in the spin-valve type thin film magnetic element due to a spin-filter effect, thereby enabling the magnetic element to comply with high density recording.

The spin filter effect will be described hereinafter.

Figure 7A:
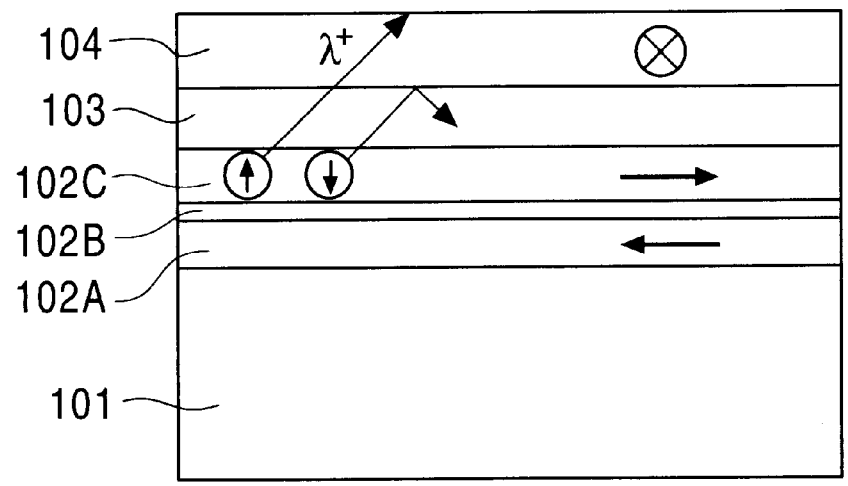
FIG. 7A is provided for illustrating the contribution of the backed layer to the spin-filter effect, and shows an example of a cross section of the spin-valve type thin film magnetic element having no backed layer.
Figure 7B:
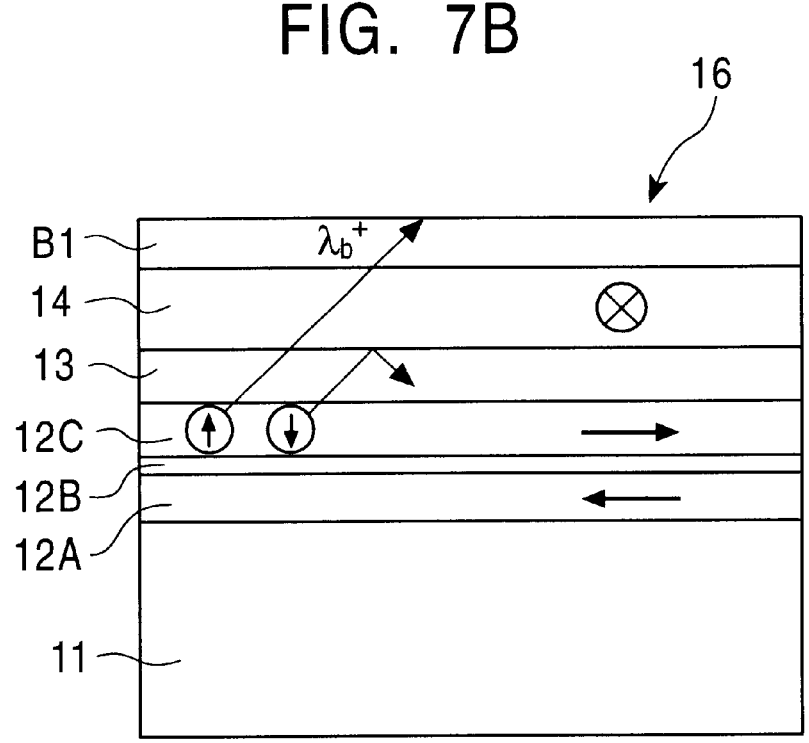
FIG. 7B is provided for illustrating the contribution of the backed layer to the spin-filter effect, and shows an example of a cross section of the spin-valve type thin film magnetic element according to the first embodiment of the present invention.

FIGS. 7A and 7B are provided for illustrating the contribution of the backed layer to the spin filter effect in the spin-valve type thin film element.

FIG. 7A is a cross section of an example of the spin-valve type thin film magnetic element having no backed layer, and FIG. 7B is a cross section of an example of the spin-valve type thin film magnetic element according to this embodiment.

Figure 24:
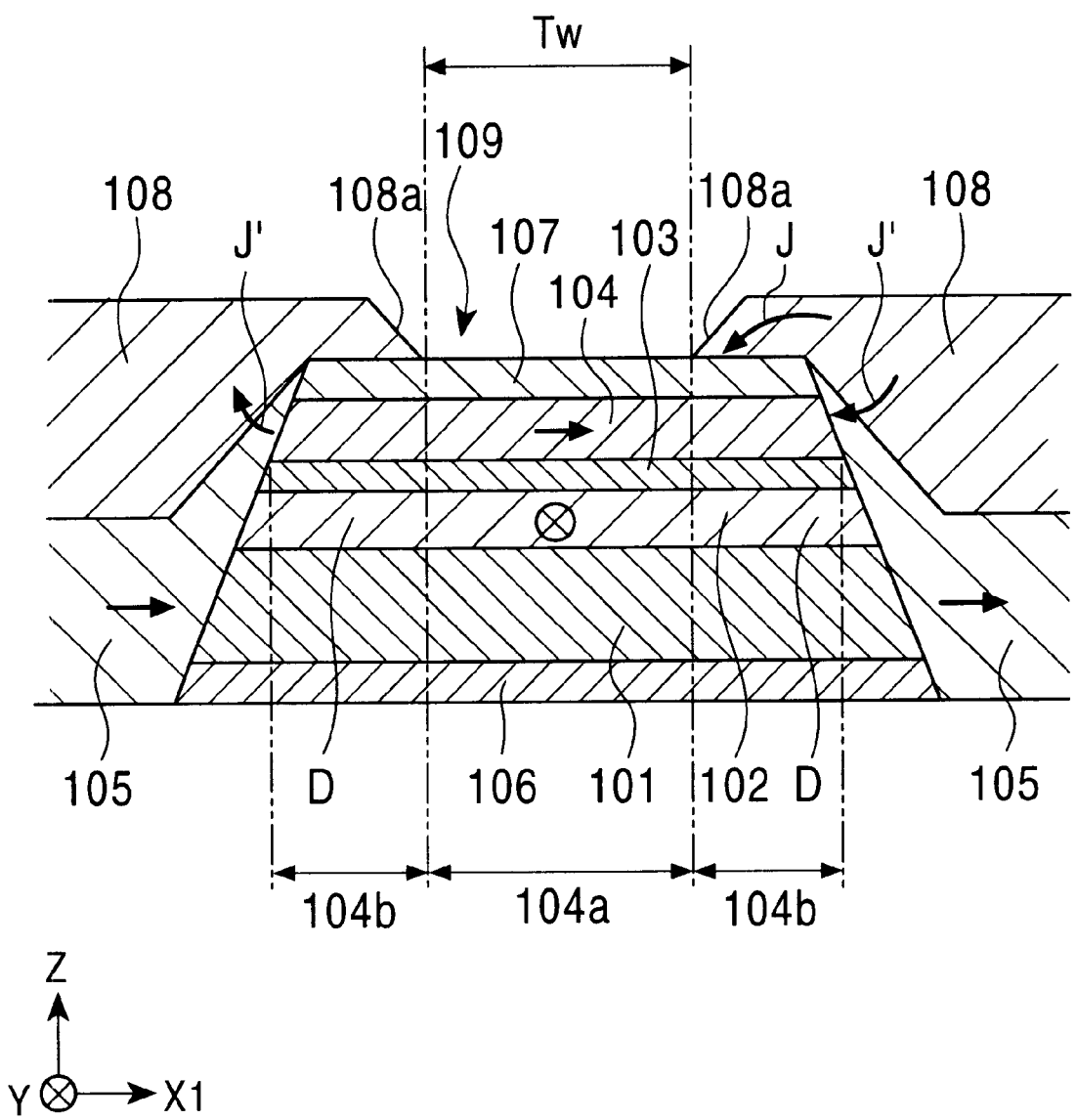
FIG. 24 is a cross section showing the structure of one example of the conventional spin-valve type thin film magnetic element viewed from the opposed face side to the recording medium.

In FIG. 7A, the reference numerals 101 to 104 correspond to the layers of the spin-valve type thin film element having no backed layer shown in FIG. 24, which is a so-called synthetic ferrimagnetic pinned layers having the first pinned magnetic layer 102A, non-magnetic intermediate layer 102B and second pinned magnetic layer 102C in place of the pinned magnetic layer 120 in FIG. 24.

The "spin-dependent scattering" of electrons is mainly responsible for the giant magnetoresistive (GMR) effect observed in the magnetic material. In other words, the GMR effect takes advantage of a difference between the mean free path ($\lambda^+$) of the conduction electrons having spins [for example (+)-spins (upward spins: up spins)] parallel to the direction of magnetization of the magnetic material, or the free magnetic layer 14 herein, and the mean free path ($\lambda^-$) of the conduction electrons having spins [for example (−)-spins (down-spins)] antiparallel to the direction of magnetization of the magnetic material. The conduction electrons having the up-spins are shown by an upward arrow, and the conduction electrons having the down-spins are shown by a downward arrow in FIG. 7.

Although the electrons having the (+)-spins parallel to the direction of magnetization of the free magnetic layer 14 are able to freely travel and pass through the free magnetic layer 14, the electrons having the (−)-spins will be immediately scattered in the free magnetic layer.

This is because, while the mean free path $\lambda^+$ of the (+)-spin electrons is, for example, about 50 angstroms, the mean free path $\lambda^-$ of the (+)-spin electrons is as small as $\frac{1}{10}$ of the mean free path $\lambda^+$ of the (+)-spin electrons, or only about 6 angstroms.

The thickness of the free magnetic layer 14 is larger than the mean free path $\lambda^-$ of the (−)-spin electrons of about 6 angstroms, and smaller than the mean free path $\lambda^+$ of the (+)-spin electrons of about 50 angstroms in this embodiment.

Accordingly, although the (−)-spin conduction electrons (minority carriers) are effectively blocked (or filtered-out) by the free magnetic layer 14 when they are passing through the free magnetic layer 14, the (+)-spin conduction electrons (majority carriers) are intrinsically transparent to the free magnetic layer 14 and can freely travel in the layer.

The minority carriers and majority carriers generated in the second pinned magnetic layer 12C, or the (+)-spin and (−)-spin electrons, travel to the free magnetic layer 14, and are responsible for charge transfer, or serve as carriers.

These tow kinds of carriers are scattered in different manners with each other when the direction of magnetization of the free magnetic layer 14 rotates. In other words, the GRM effect described above arises due to different manners for passing through the free magnetic layer 14 between the two kind of carries.

Although the electrons that travel from the free magnetic layer 14 to the second pinned magnetic layer 12C may also contribute to the GMR effect, descriptions of transfer of these electrons are omitted since an average between the number of the electrons that travel from the second pinned magnetic layer 12C to the free magnetic layer 14, and the number of the electrons that travel from the free magnetic layer 14 to the second pinned magnetic layer 12C eventually yield the same electron transfer as hitherto described. Transfer of the electrons generated in the non-magnetic conductive layer 13 is also omitted, since the numbers of the (+)-spin electrons and (−)-spin electrons are the same with each other, and the sum of the mean free paths of these two kinds of the electrons remain unchanged.

The number of the minority carriers generated in the second pinned magnetic layer 12C and pass through the non-magnetic conductive layer 13, or the number of (−)-spin electrons, is equal to the number of the (−)-spin electrons scattered at the interface between the second pinned magnetic layer 12C and the non-magnetic conductive layer 13. These (−)-spin electrons are scattered in the vicinity of the interface between the non-magnetic conductive layer 13 and second pinned magnetic layer 12C long before arriving at the interface of the free magnetic layer 14. Accordingly, the mean free path of these (−)-spin electrons are not changed when the direction of magnetization of the free magnetic layer 14 rotates, and remain shorter than the mean free path of the (+)-spin electrons, thereby giving no influence on the magnetoresistance that contributes to the rate of change of magnetoresistance responsible for the GMR effect.

Accordingly, only the behavior of the (+)-spin electrons may be taken into consideration for elucidating the GMR effect.

The majority carriers generated in the second pinned magnetic layer 12C, or the (+)-spin electrons, travel in the non-magnetic conductive layer 13 having a width shorter than the mean free path $\lambda^+$ of the (+)-spin electrons, and arrive at the free magnetic layer 14.

When no external magnetic field is applied to the free magnetic layer 14, and when the direction of magnetization of the free magnetic layer does not rotate, the majority carriers are able to freely pass through the free magnetic layer 14, because the (+)-spin electrons have (+)-spins parallel to the direction of magnetization of the free magnetic layer 14.

As shown in FIG. 7B, the (+)-spin electrons after passing through the free magnetic layer 14 are scattered in the backed layer B1 after traveling a distance corresponding to an additional mean free path $\lambda^+_b$ that is determined by the material of the backed layer B1. This means that, while the (+)-spin electrons travels in the free magnetic layer 14 with their intrinsic mean free path and are scattered at the upper face of the free magnetic layer 14 when no backed layer B1 is provided as shown in FIG. 7A, their mean free path is extended by the additional mean free path $\lambda^+_b$ as shown in FIG. 7B by providing the backed layer B1.

Accordingly, resistance of the spin-valve type thin film magnetic element is reduced by using a conductive material having a relatively low electrical resistance (or a relatively long mean free path).

Since the direction of magnetization of the magnetic material comes to a different state from the direction of the spins due to rotation of the direction of magnetization of the free magnetic field 14 in an applied external magnetic field, on the other hand, the (+)-spins are scattered in the free magnetic layer 14 to rapidly decrease the effective mean free path of the electrons, or electrical resistance of the free magnetic layer.

Consequently, a GMR effect having a large rate of change of magnetoresistance ($\Delta R/R$) can be observed, which enables regenerative output characteristics of the spin-valve type thin film element to be improved.

The direction of the variable magnetization of the free magnetic layer 14 that arises asymmetry in the out put magnetic field will be described with reference to the drawings.

Figure 8:
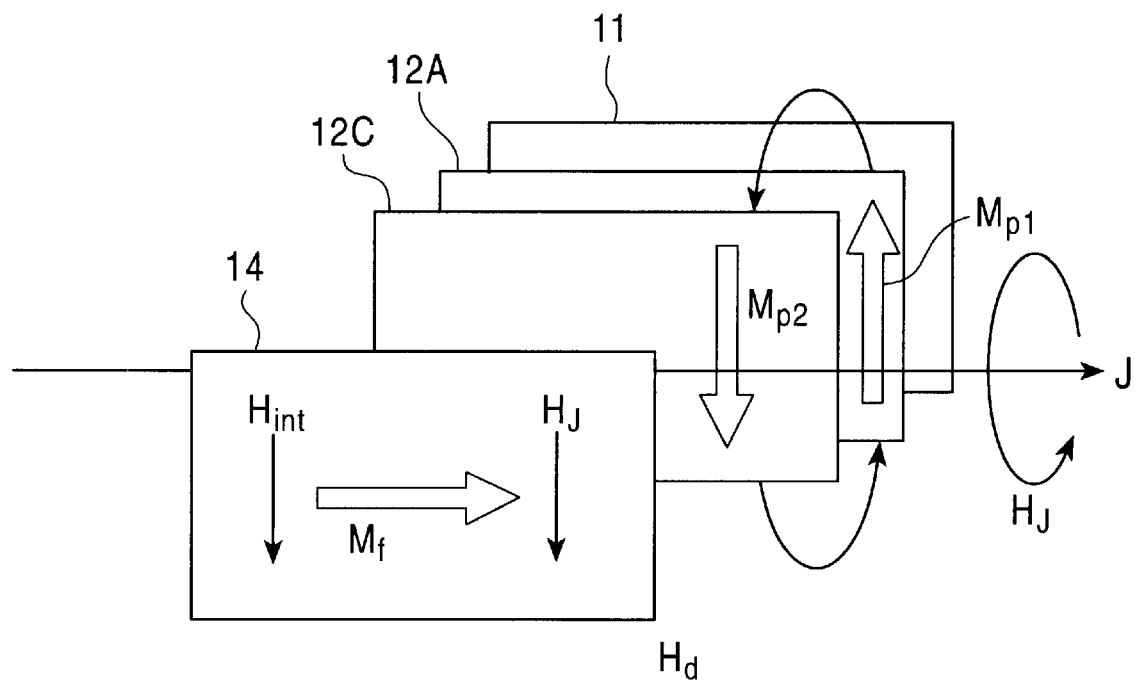
FIG. 8 illustrates how the direction of variable magnetization of the free magnetic layer according to the spin-valve type thin film magnetic element is restricted.

FIG. 8 schematically illustrates how the direction of variable magnetization $M_f$ of the free magnetic layer 14 is prescribed.

The direction of variable magnetization $M_f$ of the free magnetic layer 14 is affected by the following three magnetic fields, i.e., a sense current magnetic field $H_J$ by a sense current J, a demagnetizing field (dipole magnetic field) $H_d$ due to pinned magnetization of the pinned magnetic layers 12A and 12C, and an interaction magnetic field $H_{int}$ due to an interlayer interaction between the free magnetic layer 14 and pinned magnetic layers 12a and 12C. Asymmetry of the output magnetic field is relieved when these magnetic fields less affect variable magnetization $M_f$ of the free magnetic layer 14. In other words, it is desirable that the sum of $H_j$, $H_d$ and $H_{int}$ is zero when no external magnetic field is applied in order to reduce asymmetry of the output magnetic field.

In the spin-valve type thin film magnetic element according to this embodiment, the laminated body 16 comprises the first pinned magnetic layer 12A and the second pinned magnetic layer 12C to put the pinned magnetic layers into a synthetic ferrimagnetic state with each other, or to make the pinned magnetic layers so-called synthetic ferrimagnetic pinned layers, wherein the second pinned magnetic layer 12C is formed on the first pinned magnetic layer 12A by being separated with the non-magnetic intermediate layer 12B, and the direction of magnetization of the second pinned magnetic layer 12C is aligned in an antiparallel direction to the direction of magnetization of the first pinned magnetic layer 12A. As a result, as shown in FIG. 8, the demagnetizing field (dipole magnetic field) $H_d$ can be canceled by mutually quenching a static magnetic coupling magnetic field $M_{P1}$ of the first pinned magnetic layer 12A and a static magnetic coupling magnetic field $M_{P2}$ of the first pinned magnetic layer 12C.

Consequently, the demagnetization field (dipole magnetic field) that affects the direction of the variable magnetic field of the free magnetic layer 14 can be reduced to approximately zero ($H_d \approx 0$), and the contribution of the demagnetizing field (dipole magnetic field) $H_d$ arising from pinned magnetization of the pinned magnetic layer on variable magnetization $M_f$ of the free magnetic layer 14 can be remarkably reduced.

Reduction of the sense current magnetic field $H_J$ by the sense current J that affect asymmetry of the output magnetic field will be described below.

Figure 9A:
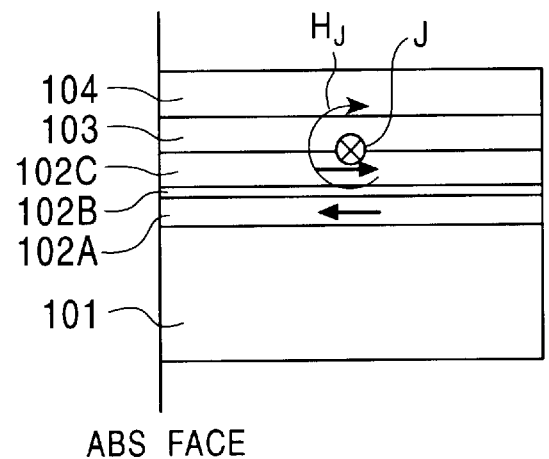
FIG. 9A is provided for describing how the contribution of the sense current to the variable magnetization M of the free magnetic layer decreases by the backed layer of the spin-valve type thin film magnetic element, and shows a transverse cross section perpendicular to the opposed face (ABS face) to the recording medium in an example of the spin-valve type thin film magnetic element having no backed layer.
Figure 9B:
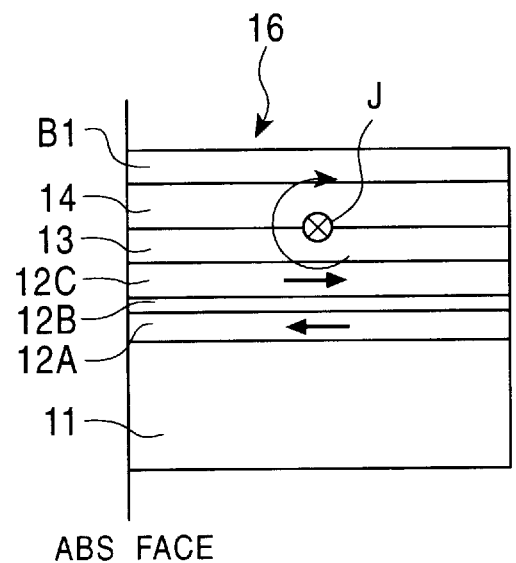
FIG. 9B is provided for describing how the contribution of the sense current to the variable magnetization M of the free magnetic layer decreases by the backed layer of the spin-valve type thin film magnetic element, and shows a transverse cross section perpendicular to the opposed face (ABS face) to the recording medium in the spin-valve type thin film magnetic element according to one embodiment of the present invention.
Figure 9C:
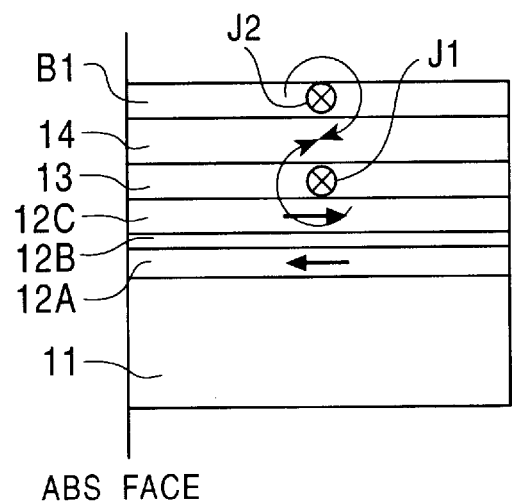
FIG. 9C is provided for describing how the contribution of the sense current to the variable magnetization M of the free magnetic layer decreases by the backed layer of the spin-valve type thin film magnetic element, and also shows a transverse cross section perpendicular to the opposed face (ABS face) to the recording medium in the spin-valve type thin film magnetic element according to one embodiment of the present invention.

FIGS. 9A, 9B and 9C describe how contribution of sense current magnetic field $H_J$ generated by the sense current J on the variable magnetization $M_f$ of the free magnetic field 14 will be reduced by providing the backed layer B1.

FIG. 9A shows a cross section perpendicular to the opposed face to the recording medium (ABS face) in an example of the spin-valve type thin film magnetic element having no backed layer. FIGS. 9B and 9C show cross sections perpendicular to the opposed face to the recording medium (ABS face) in the spin-valve type thin film magnetic element according to this embodiment.

In FIG. 9A, the reference numerals 101 to 104 corresponds to those of the conventional spin-valve type thin film magnetic element having no backed layer shown in FIG. 24, and has so-called synthetic ferrimagnetic pinned layers comprising the first pinned magnetic layer 102A, non-magnetic intermediate layer 102B and second pinned magnetic layer 102C in place of the pinned magnetic layer 102 in FIG. 24.

As shown in FIG. 9A, the sense current J tends to mainly flow at near the center of the laminated body in the bottom type spin-valve type thin film magnetic element having no backed layer, when the sense current flows into the laminated body comprising the antiferromagnetic layer 101, first pinned magnetic layer 102A, non-magnetic intermediate layer 102B, second pinned magnetic layer 102C, non-magnetic conductive layer 103 and free magnetic layer 104.

However, since the antiferromagnetic layer 101 having a large thickness lays under these layers, the sense current J tends to flow in the layers below the free magnetic layer 104 in which the sense current is desired to flow, or in the vicinity under the non-magnetic conductive layer 103 as shown in FIG. 9A.

As a result, the sense current magnetic field $H_J$ generated by the sense current J largely contributes toward the right side in the free magnetic field 104 as shown in FIG. 9A. Consequently, it has been difficult to correct the direction of the variable magnetization $M_f$ of the free magnetic layer 104 into a desired direction, in order to reduce asymmetry of the output magnetic field.

In the present embodiment, on the contrary, the position of center of the electric current in the laminated body 16 shifts at the free magnetic layer 14 side as shown in FIG. 9B by providing the backed layer B1 as an uppermost layer of the laminated body 16. Consequently, the center of the sense current J is located at almost the center of the free magnetic layer 14. Accordingly, a large contribution in the right and left direction from the sense current magnetic field $H_J$ in the free magnetic layer 14 as shown in FIG. 9A can be canceled, or the sense current magnetic field can be almost quenched ($H_J \approx 0$).

In other words, the sense current J shown in FIG. 9B is divided into a shunt current J1 and shunt current J2 in the same direction with each other in the non-magnetic conductive layer 13 and backed layer B1, respectively, as shown in FIG. 9C. This means that the clockwise magnetic field generated by the shunt current J1 and the counter-clockwise magnetic field generated by shunt current J2 can be offset with each other in the free magnetic layer 14, or the sense current magnetic field can be almost quenched ($H_J \approx 0$).

Accordingly, two magnetic fields having a large contribution among the three magnetic fields that affect the direction of the variable magnetic field $M_f$ of the free magnetic field 14 shown in FIG. 8—the sense current magnetic field $H_J$ by the sense current J, and demagnetizing field (dipole magnetic field) $H_d$ by the pinned magnetic fields of the pinned magnetic layers 12A and 12B—may be with each other.

From the discussions above, it can be understood that only the interaction magnetic field $H_{int}$ caused by an interlayer interaction among the free magnetic layer 14 and the pinned magnetic layers 12A and 12C, which have the smallest contribution under no applied external magnetic field, may be taken into account for reducing asymmetry of the output magnetic field.

Accordingly, The variable magnetization $M_f$ of the free magnetic layer 14 may be approximately aligned in the direction of X1 shown in FIG. 1 by the hard bias layers 17, when the spin-valve type thin film magnetic element is not operated, or when no sense current is applied and no sense current magnetic field $H_J$ is generated.

When no sense current J is applied, the variable magnetization $M_f$ of the free magnetic layer 14 prescribed by the hard bias layers 17 may be perpendicular to the pinned magnetization $M_p$ of the pinned magnetic layer 12C. The directions of magnetization of these layers are not required to be adjusted in advance by taking the contribution of the sense current J into consideration, so that these directions vertically intersect with each other after flowing the sense current J.

Consequently, the preference of the variable magnetization $M_f$ of the free magnetic field 14 to align in the opposite direction to the pinned magnetization $M_p$ of the second pinned magnetic layer 12C is extinguished, when no sense current J is applied and hence no sense current magnetic field $H_J$ is generated.

The spin-valve type thin film element shown in FIG. 1 has overlay parts 18a each formed by extending the electrode layer 18 formed on the hard bias layer 17 on the upper side of the laminated body 16. When a sense current J is applied from the electrode 18 into the second pinned magnetic layer 12, non-magnetic conductive layer 13 and free magnetic layer 14, most of the sense current J flows into the laminated body 16 through the overlay part 18a.

Consequently, a central part in which the sense current J flows in, and side parts in which few sense current flows in, are formed in the free magnetic layer 14.

Since the sense current magnetic field $H_J$ is very small throughout the entire free magnetic layer 14, no large differences of magnetic fields are caused between the central part in which the sense current J flows in, and side parts in which few sense current flows, thereby eliminating the possibility of arising a shift of the direction of magnetization in the entire free magnetic layer 14.

Accordingly, non-uniform magnetization can be prevented from arising by forming a magnetic barrier in the free magnetic layer 14 for preventing the free magnetic layer from being put into a single magnetic domain state. Therefore, Barkhausen noises are prevented from generating in the spin-valve type thin film element, thereby ensuring stable processing of signals from the magnetic recording medium.

The method for manufacturing the spin-valve type thin film magnetic element according to this embodiment will be described hereinafter with reference to drawings.

FIGS. 2 to 6 show cross sections for describing the method for manufacturing the spin-valve type thin film magnetic element according to this embodiment.

The method for manufacturing the spin-valve type thin film magnetic element according to this embodiment comprises, as brief descriptions, the following steps:

(1) forming a laminated film 16' comprising, on a substrate 10, an under layer 10a, an antiferromagnetic layer 11, a first pinned magnetic layer 12A, a non-magnetic intermediate layer 12B, a second pinned magnetic layer 12C, a non-magnetic conductive layer 13, a free magnetic layer 14, a backed layer B1, a protective layer 15 and an oxide layer 15a;

(2) forming a lift-off resist 72 having cut-off portions 72a on the lower face opposed to the laminated film 16' above the laminated film 16';

(3) forming an approximately trapezoidal laminated body 16 by removing the portions of the laminated film 16' not covered with the lift-off resist 72 except a part of the antiferromagnetic layer 11;

(4) forming hard bias layers 17 at both sides of the laminated body 16 so that the upper part of the bias layers 17 are disposed at the same elevation as the free magnetic layer 14; and (5) forming electrode layers 18 on the hard bias layers 17, and on the part of the laminated body 16 corresponding to the cut-off portions 72a of the lift-off resist 72.

Figure 2:
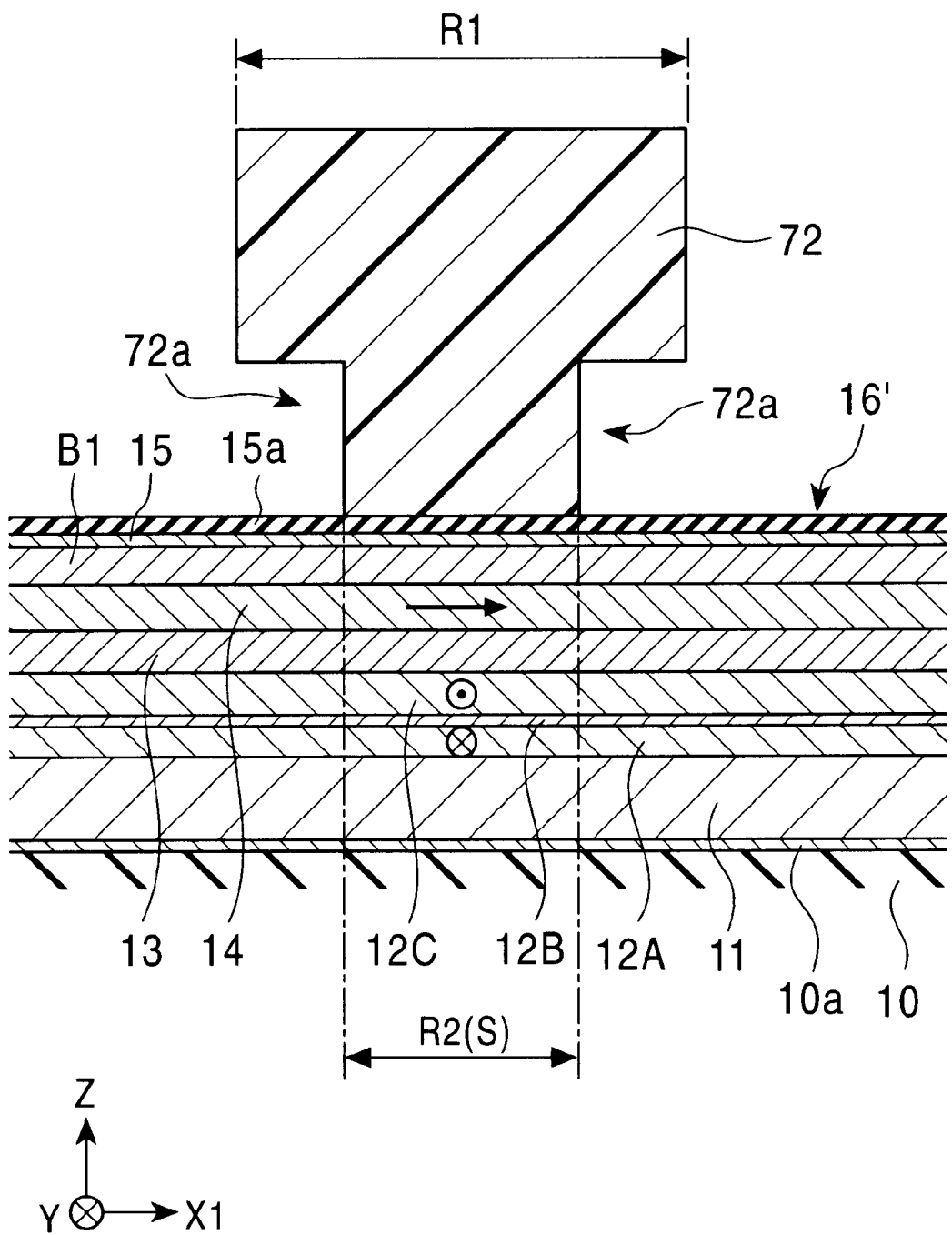
FIG. 2 is a cross section provided for illustrating the method for manufacturing the spin-valve type thin film magnetic element shown in FIG. 1, and shows a manufacturing step when a lift-off resist is formed on the laminated film on the substrate.
Figure 3:
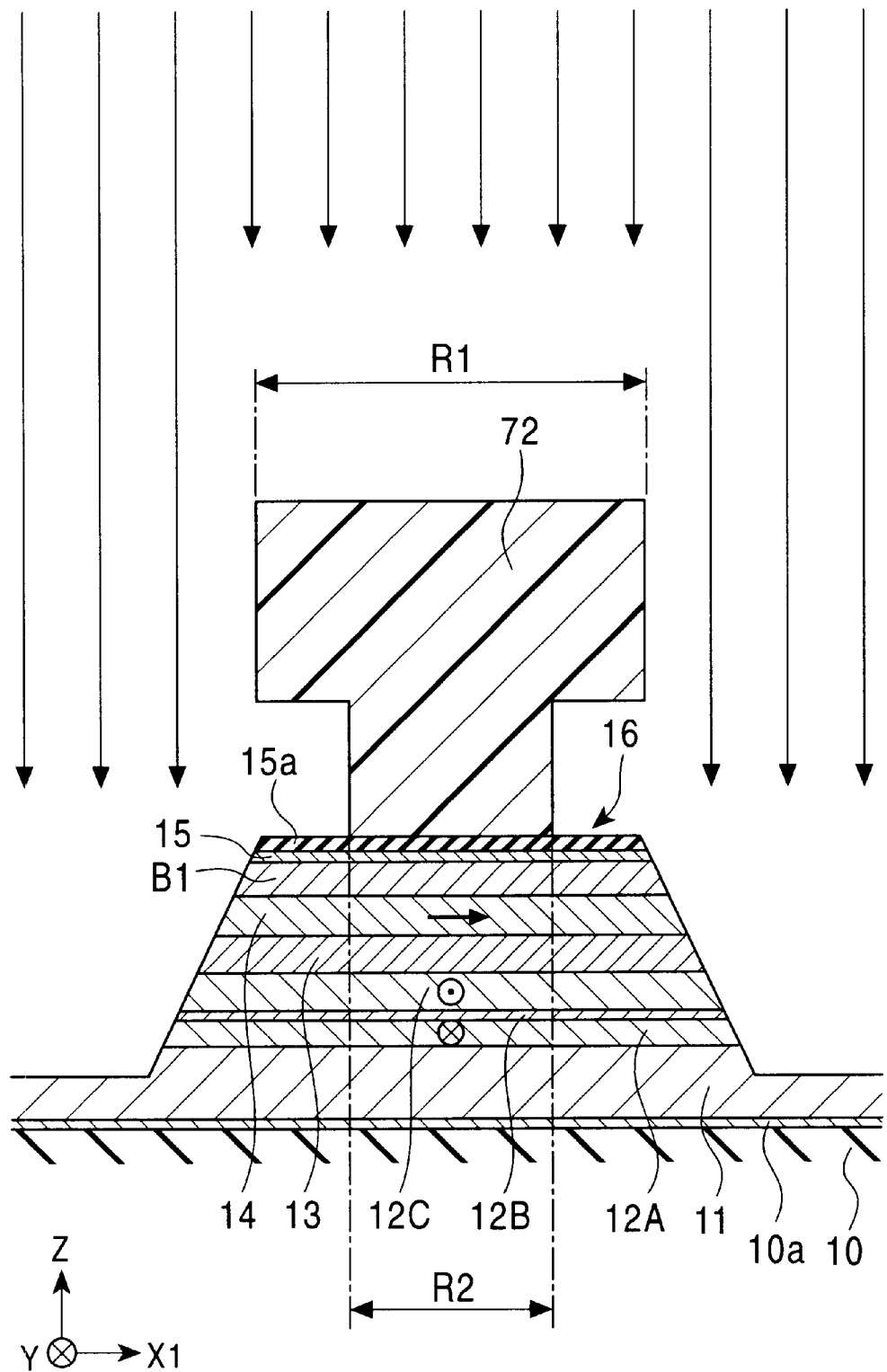
FIG. 3 is a cross section provided for illustrating the method for manufacturing the spin-valve type thin film magnetic element shown in FIG. 1, and shows a manufacturing step when a laminated body is formed.

In more detail, a laminated film 16' comprising the underlayer 10a, antiferromagnetic layer 11, first pinned magnetic layer 12A, non-magnetic intermediate layer 12B, second pinned magnetic layer 12C, free magnetic layer 14, backed layer B1, protective layer 15 and oxide layer 15a is at first formed on the substrate 10 as shown in FIG. 2. The first pinned magnetic layer 12A is formed in contact with the antiferromagnetic layer 11, and the direction of magnetization of this pinned magnetic layer is fixed by the exchange coupling magnetic field with the antiferromagnetic layer 11. The direction of magnetization of the second pinned magnetic layer 12C is aligned in the direction antiparallel to the direction of magnetization of the first pinned magnetic layer 12A. The free magnetic layer 14 is formed on the second pinned magnetic layer 12C by being separated with the non-magnetic conductive layer 13, and the direction of magnetization of the free magnetic layer 14 is designated to be aligned in the direction approximately perpendicular to the direction of magnetization of the second pinned magnetic layer 12C. The backed layer B1 comprises a non-magnetic conductive material.

The length of the laminated film 16' extending from the opposed face to the magnetic recording medium toward the inside thereof, or the elevation Hg of the element, is preferably in the range of 0.2 to 0.5 $\mu$m.

Then, the width of the sensitive zone S and dead zone N is determined by the micro-track profile method using a separate thin film magnetic head that has been previously manufactured. The lift-off resist 72 is formed on the laminated film 16' by taking the width of the dead zone N that has been determined into consideration.

The photoresist 72 is provided so as to cover the laminated film 16' with a width R1 in the track width direction (the X1-direction) on the plane view of the laminated film 16', and the cut-off portions 72a are formed on the lower face of the laminated film 16'. The cut-off portions 72a are formed above the dead zones in the laminated film 16'. The lift-off resist 72 completely covers the sensitive zone S with a width R2.

The track width on the upper face of the laminated body 16 to be formed hereinafter is determined by this width R2.

Then, the laminated body 16 is formed by shaving the both sides of the laminated film 16' by a dry-etching method such as ion-milling while leaving a part of the lower side of the antiferromagnetic layer 11. Bias underlayers 17a, hard bias layers 17 and intermediate layers 19 are deposited thereafter at both sides of the laminated body 16 as shown in FIG. 4.

The sputtering method to be used in deposition of the hard bias layers 17, and electrode layers 18 thereafter, is preferably either an ion-beam sputtering method, a long-throw sputtering method or a collimation sputtering method, or a combination thereof.

Figure 4:
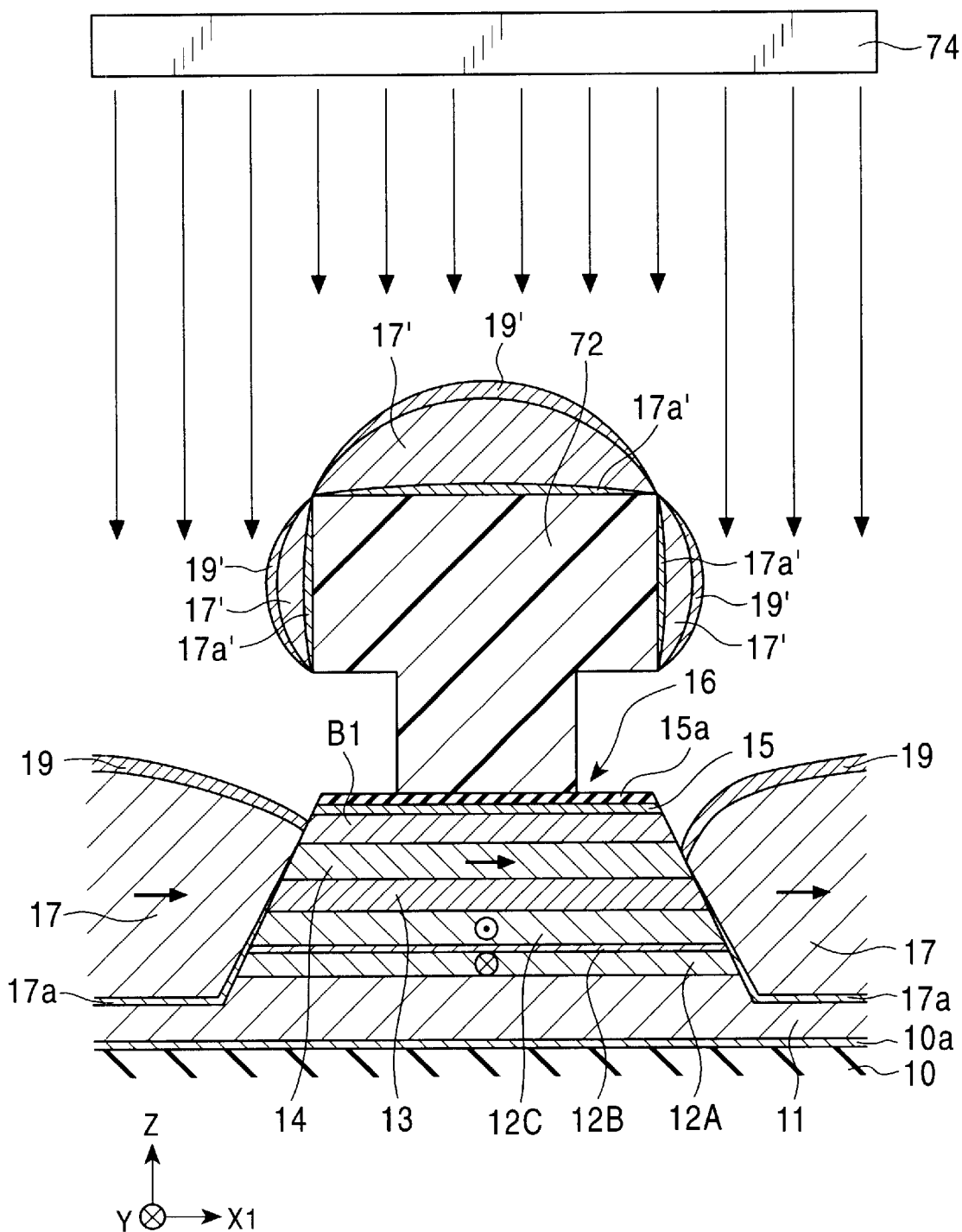
FIG. 4 is a cross section provided for illustrating the method for manufacturing the spin-valve type thin film magnetic element shown in FIG. 1, and shows a manufacturing step when a hard bias layer is formed.

As shown in FIG. 4, the substrate 10 on which the laminated body 16 has been formed is placed in a direction approximately perpendicular to the ion-beam emitted from a target 74 formed with the composition of the hard bias layer 17. The hard bias layers 17 can be deposited by sputtering the target from an approximately vertical direction to the laminated body 16 using, for example, the ion-beam sputtering method. Consequently, the hard bias layers 17 never invade into the cut-off portions 72a of the lift-off resist 72 formed on the laminated body 16, and deposit thereon. Layers 17a' and 19' having the same compositions as the underlayer 17a, hard bias layer 17 and intermediate layer 19, respectively, are also formed on the lift-off resist 72.

Figure 5:
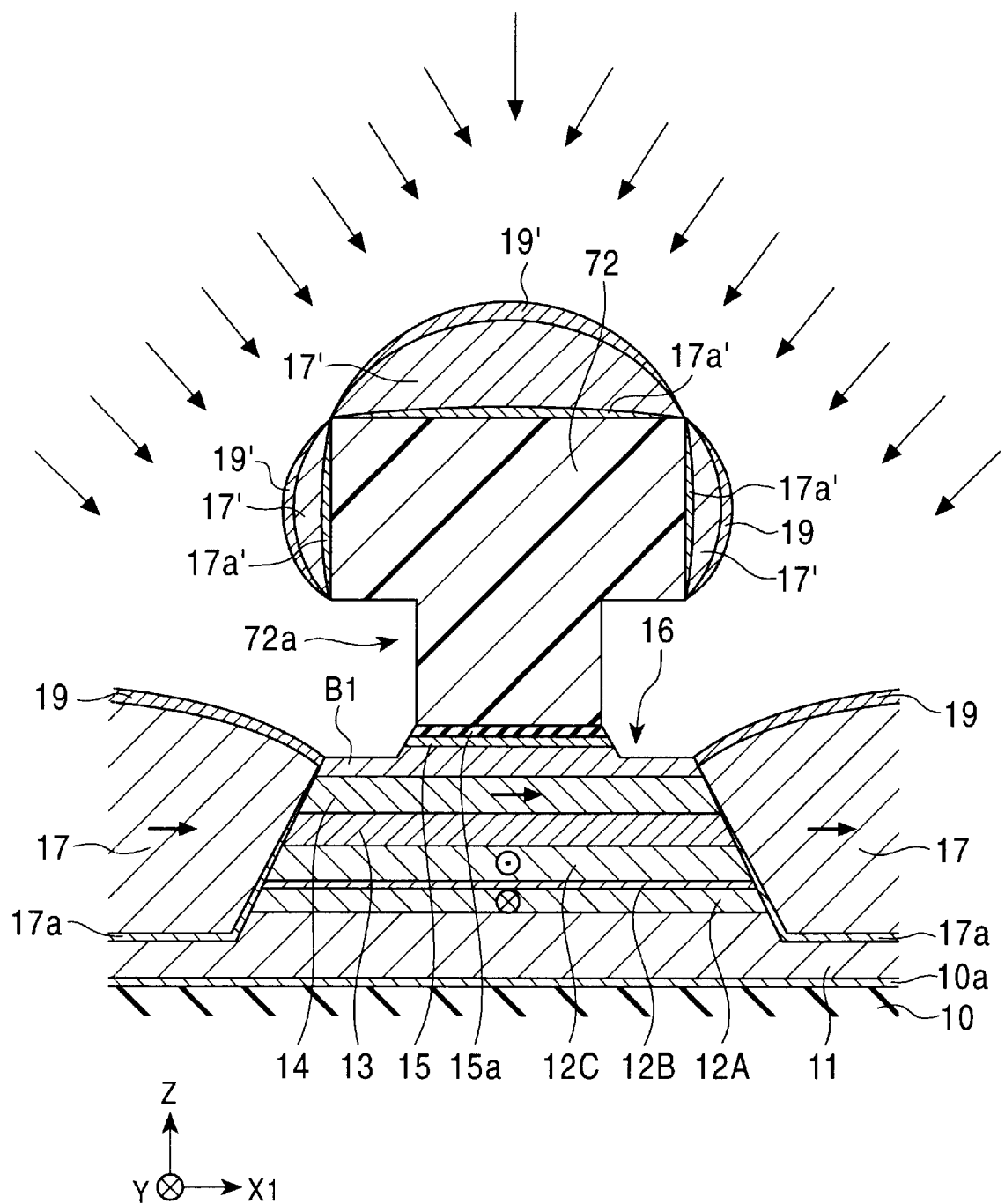
FIG. 5 is provided for illustrating the method for manufacturing the spin-valve type thin film magnetic element shown in FIG. 1, and shows a manufacturing step when a part of the surface of the laminated body is removed.

Then, as shown in FIG. 5, ion-milling and inverse-sputtering with Ar are applied to the laminated body 16 from inclined directions to remove a part of the surface of the laminated body corresponding to the inside of the cut-off portions 72a. A part each of the oxide layer 15a, protective layer 15 and backed layer B1 is removed by this process to form a portion where the electrode layers 18 directly contact the backed layer B1.

Figure 6:
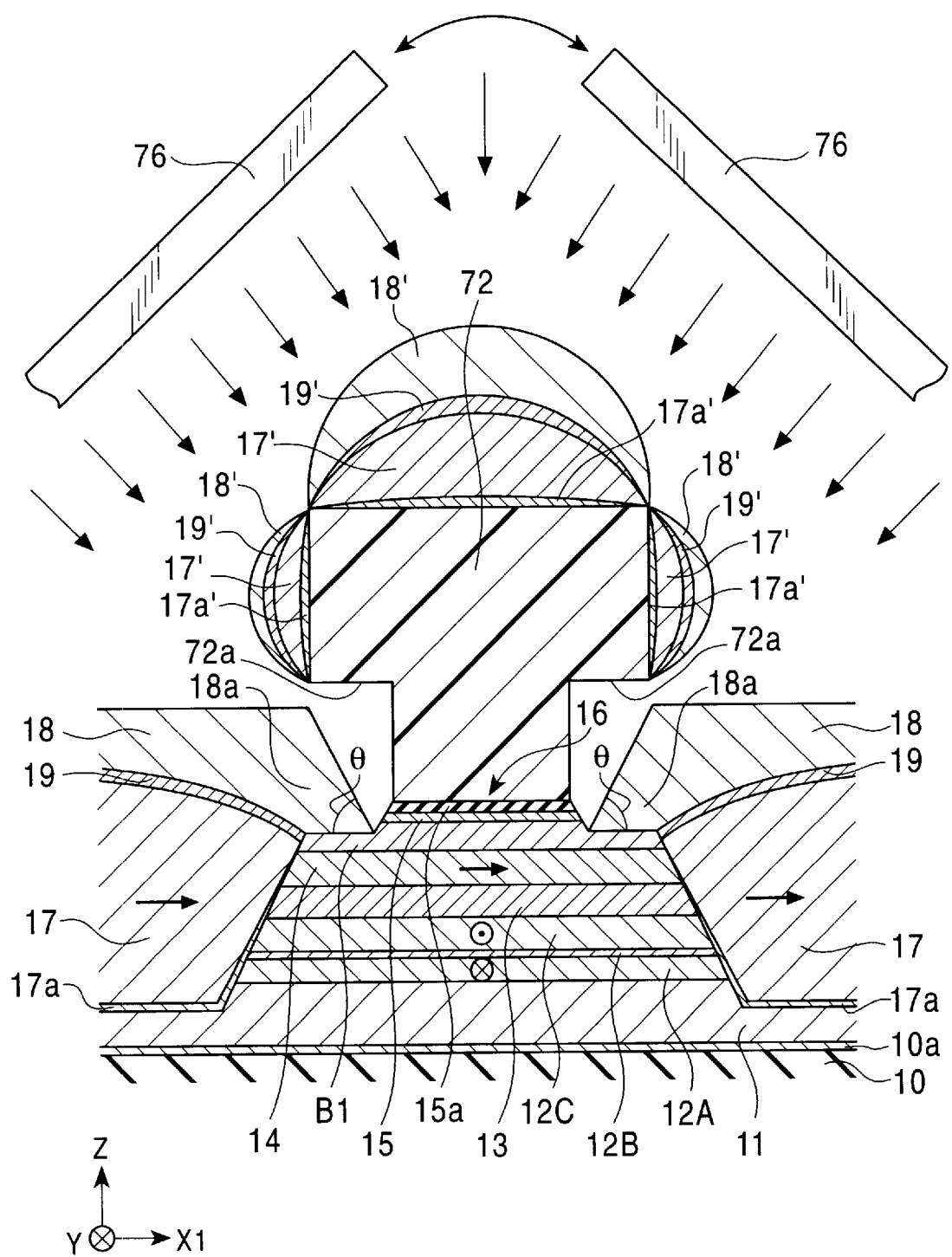
FIG. 6 is provided for illustrating the method for manufacturing the spin-valve type thin film magnetic element shown in FIG. 1, and shows a manufacturing step when electrode layers are formed.

Electrode layers 18 are further deposited on the respective hard bias layers 17 from inclined directions to the laminated body 16 as shown in FIG. 6. The electrode layers 18 are deposited into the cut-off portions 72a of the lift-off resist 72 provided on the laminated body 16.

Then, the electrode layers 18 are deposited on the hard bias layers 17 by the ion-beam sputtering method while a target 76 having the same composition as the electrode layer 18 is inclined relative to the substrate 10 on which the laminated body 16 is formed, and the target 76 is allowed to travel or rotate over the substrate 10.

The material for the electrode layers 18 sputtered from an inclined direction invades not only on the hard bias layer 17 but also into the cut-off portion 72a of the resist layer 72 formed on the laminated body 16 to form overlay part 18a. In other words, the overlay part 18a of the electrode 18 deposited in the cut-off part 72a is formed so as to cover the dead zone of the laminated body 16.

The angle θ formed between the overlay part 18a of the electrode 18 and the surface of the laminated body 16 is preferably in the range of 45 to 70 degrees.

While the substrate 10 is fixed and the target 76 is allowed to travel in an inclined direction or rotate relative to the substrate 10, the target 76 may be fixed while the substrate 10 is allowed to travel in an inclined direction or rotate relative to the target 76.

The angle formed between the surface of the target 76 and the substrate 10, or the angle that determines the irradiation direction of sputtering particles is preferably in the range of 20 to 50 degrees.

This angle may be defined, for example, by adjusting the angle formed between the surface of the sputtering target 76 and the substrate 10.

As shown in FIG. 6, a layer 18' having the same composition as the electrode layer 18 is formed on the layer 19' of the lift-off resist 72.

In the next step, the lift-off resist 72 shown in FIG. 6 is removed by lifting-off the resist using a resist exfoliation solution, thereby completing the spin-valve type thin film magnetic element shown in FIG. 1.

The length of the overlay part 18a of the electrode layer 18 in the track width direction may be adjusted to 0.03 $\mu$m to 0.10 $\mu$m by adjusting the width R1 of the lift-off resist 72 in the track width direction and the width R2 of the cut-off part 72a in the track width direction.

A width of the overlay part 72a in the direction of track width of smaller than 0.03 $\mu$m is not preferable, since the effect of forming the overlay part 18a cannot be sufficiently manifested. When the width of the overlay part 18a in the track width direction is larger than 0.10 $\mu$m, on the other hand, the electrode 18 should be deposited by sputtering by allowing the target 74 or 76 to be inclined with a large angle relative to the substrate 10. However, such troubles may be readily caused, as an electrode layer 18 having a sufficient thickness deep into the cut-off portion 72a cannot be formed, or the angle θ formed between surface of the overlay part 18a and the surface of the laminated body 16 turns out to be smaller than 45 degrees. The shunt sense current flowing into the laminated body 16 (GMR film) just under the overlay part 18a of the electrode layer 18 cannot be ignored, since non-preferable side reading may arise.

In the method for manufacturing the spin-valve type thin film magnetic element according to this embodiment, the laminated body 16, hard bias layer 17 and electrode layer 18 can be formed into a desired shape by forming the lift-off resist 72 only once. In addition, the hard bias layer 17 and electrode layer 18 are formed into desired shapes by a sputtering method in which the target 74 and the substrate 10 are faced to one another with or without an inclined angle between them. Consequently, the spin-valve type thin film magnetic element can be easily obtained with a few manufacturing steps.

The central portion of the laminated body 16 serves as a sensitive zone, since the spin-valve type thin film magnetic element manufactured as described above has the electrode layers 18 comprising the overlay parts 18a extending on the surface of the laminated body 16 from the both sides of the laminated body 16 toward the center of the laminated body 16. On the other hand, both side portions of the laminated body 16 located at under the overlay parts 18a serve as the dead zones. Accordingly, the width of the sensitive zone may be utilized as the track width, thereby enabling the magnetic head to comply with narrow track-width for high density recording.

The relation of $(Rs1/H1)/(Rsg/Hg) \leq 0.02$ is valid in the spin-valve type thin film magnetic element according to this embodiment, when the length vertically extending from the opposed face to the magnetic recording medium toward the inside of the electrode 18 is represented by H1, the sheet resistance of the electrode layer 18 is represented by Rs1, the length vertically extending from the opposed face to the recording medium toward the inside of the laminated body 16, or the elevation of the element, is represented by Hg, and the sheet resistance of the laminated body is represented by Rsg. This means that resistance flowing in from the overlay part 18a can be reduced to reduce the shunt sense current flowing through the hard bias layer 17. As a result, the sense current flowing into the dead zone N located under the overlay part 18a is reduced to prevent voltage changes in the dead zone from appearing. Consequently, side-reading of the spin-valve type thin film magnetic element can be prevented from occurring.

Reducing the shunt sense current while converging the sense current into the sensitive zone S locating at the central portion of the laminated body 16 increases voltage changes in the sensitive zone S, thereby enabling output characteristics of the spin-valve type thin film magnetic element to be improved.

Since the relation of $(Rs1/H1)/(Rsg/Hg) \leq 0.01$ is valid among H1, Rs1, Hg and Rsg in the spin-valve type thin film magnetic element according to this embodiment, resistance against the sense current flowing in from the overlay parts 18a can be more reduced, thereby allowing the shunt sense current flowing in through the hard bias layer 17 to be further reduced.

The resistance per unit length in the X1-direction of the electrode layer 18 is represented by the relation of $(Rs1/H1) \leq 1 \, \Omega/\mu m$ in the spin-valve type thin film magnetic element according to the present invention, when the length vertically extending from the opposed face to the magnetic recording medium toward the inside of the electrode 18 is represented by H1, the sheet resistance of the electrode layer 18 is represented by Rs1, the length vertically extending from the opposed face to the recording medium toward the inside of the laminated body 16, or the elevation of the element Hg, is adjusted within the range of 0.2 to 0.5 $\mu$m, and the sheet resistance Rsg of the laminated body 16 is adjusted within the range of 15 to 25 $\Omega/M^2$. Therefore, the resistance against the sense current flowing in from the overlay part 18a can be reduced, thereby enabling the shunt sense current flowing in through the hard bias layer 17 to be reduced.

Furthermore, the relation between the H1 and Rs1 is represented by the equation of (Rs1/H1)≦0.5 Ω/μm in the spin-valve type thin film magnetic element according to the present invention, when Hg is adjusted in the range of 0.2 to 0.5 μm, and Rsg is adjusted in the range of 15 to 25 Ω/M². Therefore, the resistance against the sense current flowing in from the overlay part 18a can be reduced, thereby enabling the shunt sense current flowing in through the hard bias layer 17 to be reduced.

In addition, the angle formed between the surface of the overlay part 18a and the surface of the laminated body 16 is restricted in the range of 45 to 70 degrees in the spin-valve type thin film magnetic element according to this embodiment. Therefore, the resistance against the sense current flowing in from the overlay part 18a can be reduced, thereby enabling the shunt sense current flowing in through the hard bias layer 17 to be reduced.

The shunt sense current flowing in through the hard bias layer 17 may be reduced in the spin-valve type thin film magnetic element according to this embodiment, thereby more effectively preventing side reading of the spin-valve type thin film magnetic element. Moreover, the output characteristics of the spin-valve type thin film magnetic element is further improved by improving sensitivity and voltage changes against very weak external magnetic field in the sensitive zone S.

The second embodiment of the present invention will be described hereinafter with reference to the drawings.

Second Embodiment

Figure 10:
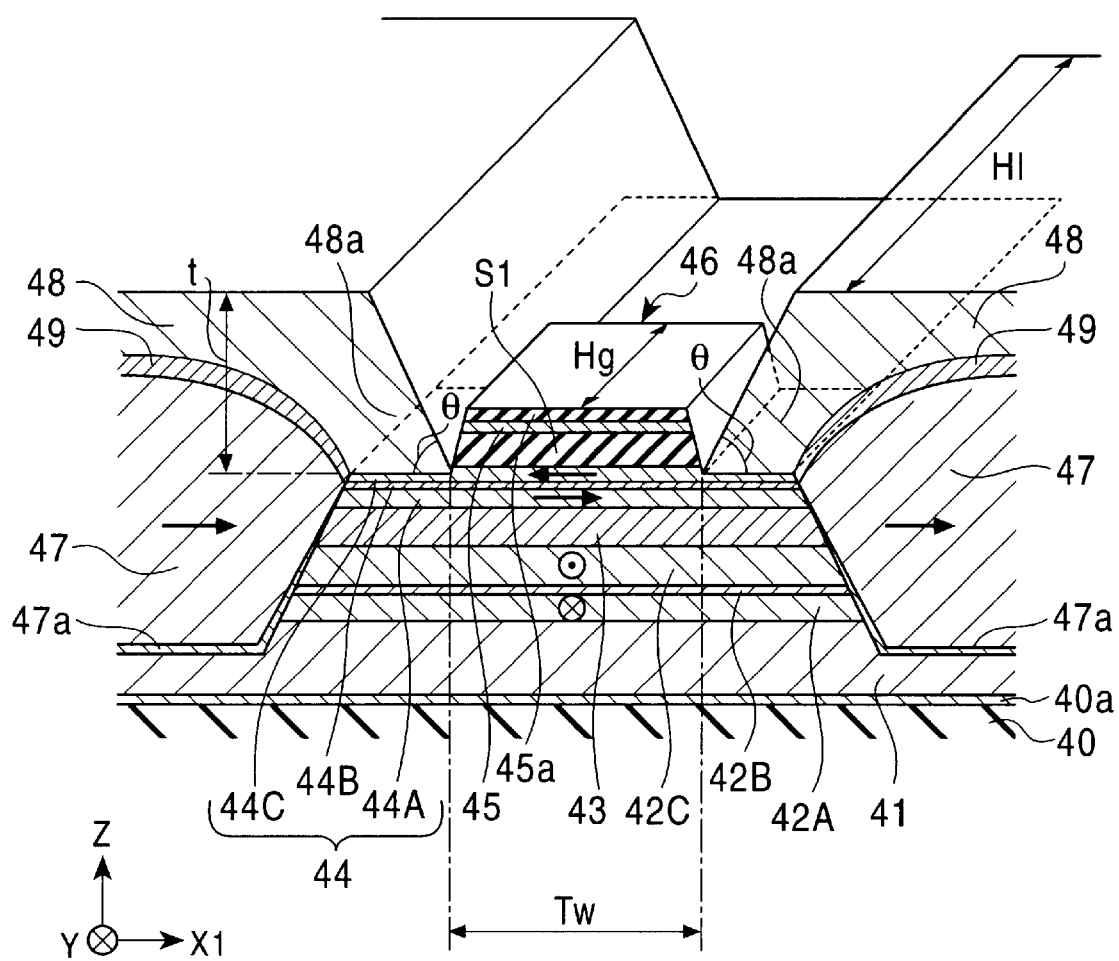
FIG. 10 is a cross section showing the structure of the spin-valve type thin film magnetic element according to the second embodiment of the present invention viewed from the opposed face side to the recording medium.

FIG. 10 is a cross section showing the structure of the spin-valve type thin film magnetic element viewed from the opposed face side to the recording medium.

As shown in FIG. 10, the spin-valve type thin film magnetic element according to the second embodiment of the present invention comprises bottom type synthetic ferrimagnetic pinned spin-valves as in the spin-valve type thin film magnetic element according to the first embodiment of the present invention.

The spin-valve type thin film magnetic element in the second embodiment shown in FIG. 10 is different from that in the first embodiment in that the structure of the free magnetic layer is the synthetic ferrimagnetic pinned spin-valve type layer, and a specular layer is provided as a mean free path extension layer in place of the backed layer.

The reference numeral 40 in FIG. 10 shows a substrate. An underlayer 40a is provided on the substrate 40, an antiferromagnetic layer 41 is provided on the underlayer 40A, and pinned magnetic layers 42A and 42C are provided on the antiferromagnetic layer 41.

The pinned magnetic layer comprises a first pinned magnetic layer 42A, and a second pinned magnetic layer 42C formed on the first pinned magnetic layer 42A, and the direction of magnetization of the second pinned magnetic layer 42C is aligned in the direction antiparallel to the direction of magnetization of the first pinned magnetic layer 42A.

A non-magnetic conductive layer 43 comprising Cu is formed on the second pinned magnetic layer 42C, and a free magnetic layer 44 is formed on the non-magnetic conductive layer 43. This free magnetic layer 44 is divided into a first and second free magnetic layers 44A and 44C by being separated with a non-magnetic intermediate layer 44B. The directions of magnetization of the second and first free magnetic layers 44A and 44C are put into a ferrimagnetic state with their directions of magnetization being different by 180° with each other. A specular layer S1 is provided on the second free magnetic layer 44A, a protective layer 45 made of Ta is provided on the specular layer S1, and an oxide layer 45a made of tantalum oxide is formed on the specular layer.

As shown in FIG. 10, a laminated body 46 having an approximately trapezoidal cross section comprises each layer of a part of the antiferromagnetic layer 41 to the oxide layer 45a.

The reference numeral 47 denotes a hard bias layer, the reference numeral 48 denotes an electrode layer, and the reference numeral 49 denotes an intermediate layer.

The hard bias layer 47 is formed on each portion of the antiferromagnetic layer 41 projecting at both sides of the laminated body 46 by being separated with a bias underlayer 47a. The electrode layer 48 is formed on the hard bias layer 47 by being separated with the intermediate layer 49 comprising Ta.

The underlayer 40a, antiferromagnetic layer 41, first pinned magnetic layer 42A, non-magnetic intermediate layer 42B, second pinned magnetic layer 42C, non-magnetic conductive layer 43, free magnetic layer 44, protective layer 45, laminated body 46, and each of the hard bias layer 47, electrode layer 48, overlay part 48a and intermediate layer 49 correspond to the underlayer 10a, antiferromagnetic layer 11, first pinned magnetic layer 12A, non-magnetic intermediate layer 12B, second pinned magnetic layer 12C, non-magnetic conductive layer 13, free magnetic layer 14, protective layer 15, laminated body 16, and each of the hard bias layer 17, electrode layer 18, overlay part 18a and intermediate layer 19, respectively, in the first embodiment shown in FIGS. 1 to 6.

The second free magnetic layer 44A and the first free magnetic layer 44C comprises the same material as in the free magnetic layer 14 in the first embodiment, for example a NiFe alloy, CoFe alloy or CoNiFe alloy. The non-magnetic intermediate layer 44B preferably comprises at least one of Ru, Rh, Ir, Cr, Re and Cu.

Each of the first free magnetic layer 44C and the second free magnetic layer 44A comprise two layers. Co layers are formed at the side in contact with the non-magnetic intermediate layer 44B and specular layer S1 of the first free magnetic layer 44C and second free magnetic layer 44A, respectively. As a result, an antiparallel coupling between the first and second free magnetic layers, while preventing diffusion between the non-magnetic intermediate layer 44B and specular layer S1. The rate of change of magnetoresistance may be also increased by providing a Co layer at the side in contact with the non-magnetic conductive layer 43.

In the free magnetic layer 44, the direction of magnetization of the second free magnetic layer 44A is fixed in the X1-direction by the magnetic flux of the hard bias layer 47, and the direction of magnetization of the first free magnetic layer 44C is fixed in the opposite direction to the X1-direction. The first free magnetic layer 44C is magnetically coupled with the second free magnetic layer 44A by an exchange coupling magnetic field (RKKY) interaction, and is magnetized in the opposite direction to the X1-direction. Magnetization of the second free magnetic layer 44A and magnetization of first free magnetic layer 44B are able to freely rotate by being affected by an external magnetic field while maintaining a ferrimagnetic state between them.

The second free magnetic layer 44A has a different thickness from the thickness of the first free magnetic layer 44C, or the thickness of the second free magnetic layer 44A is larger than the thickness of the second free magnetic layer 44A. Therefore, the magnetic moment represented by a product of the magnitude of magnetization and thickness of the layer turns out to be larger in the second free magnetic layer 44A. Consequently, Magnetization of the overall free magnetic layer is aligned in the direction of the synthetic moment between the magnetic moments of the second and first free magnetic layer 44C and 44C, or in the X1-direction.

Therefore, the thickness of the second free magnetic layer 44A that contributes to GMR may be increased to prevent deterioration of output due to the reduced film thickness as compared with a monolayer free magnetic layer, thereby enabling the synthetic magnetic moment of the overall free magnetic layer to be reduced. Accordingly, it is possible to increase the rate of change of magnetoresistance in a weak magnetic field by improving rotational reactivity of the direction of magnetization against the applied external magnetic field, or to improve sensitivity against the magnetic field.

A specular layer S1 is provided on the second free magnetic layer 44A as a mean free path extending layer in this embodiment.

The thickness of the specular layer S1 may be adjusted in the range of 5 to 500 angstroms. A thickness of this specular layer S1 of less than 5 angstroms is not preferable, since a sufficient specular effect cannot be obtained.

It is also not preferable that the thickness of the specular layer S1 is larger than 500 angstroms, since the shield distance as a regenerative gap becomes too wide that resolution of the head decreases.

The construction of the specular layer as described above permits the specular layer S1 to serve as a potential barrier in the vicinity of the interface between the free magnetic layer 44 and specular layer S1, and up-spin conduction electrons traveling in the free magnetic layer 44 to be reflected while conserving the spin state in the vicinity of the interface between the free magnetic layer 44 and specular layer S1. Consequently, the mean free path of the up-spin conduction electrons is further extended to manifest the so-called specular effect as will be described hereinafter.

It is effective to form the potential barrier at the interface between the free magnetic layer 44 and specular layer S1 for reflecting the conduction electrons while conserving their sin state, or that the specular layer S1 is an insulator in contrast to the free magnetic layer 44 as a good conductor.

The materials that satisfies these conditions include an oxide film such as α-$Fe_2O_3$, NiO, CoO, Co—Fe—O, Co—Fe—Ni—O, $Al_2O_3$, Al—Q—O (Q represents at least one of B, Si, N, Ti, V, Cr, Mn, Fe, Co and Ni) and R—O (R represents at least one of Ti, V, Cr, Zr, Nb, Mo, Hf, Ta and W), and a nitride film such as Al—N, AL—Q—N (Q represents at least one of B, S1, O, Ti, V, Cr, Mn, Fe, Co and Ni) and R—O (R represents at least one of Ti, V, Cr, Zr, Nb, Mo, Hf, Ta and W). The specular layer S1 may be constructed with these insulation materials.

It is possible in this embodiment to extend the mean free path of the (+)-spins (up-spins) that contribute to the magnetoresistive effect by providing the specular layer, and to obtain a large rate of change of magnetoresistance (ΔR/R) by the specular effect in the spin-valve type thin film magnetic element, thereby enabling to comply with high density recording.

The specular effect will be described hereinafter.

Figure 11A:
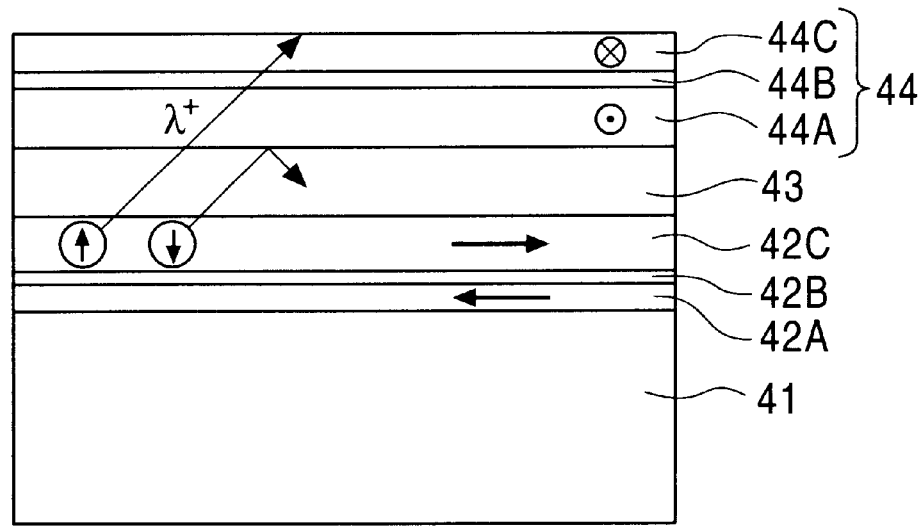
FIG. 11A is provided for illustrating the contribution of the specular layer to the specular effect in the spin-valve type thin film magnetic element, and shows a cross section of one example of the spin-valve type thin film magnetic element having no specular layer.
Figure 11B:
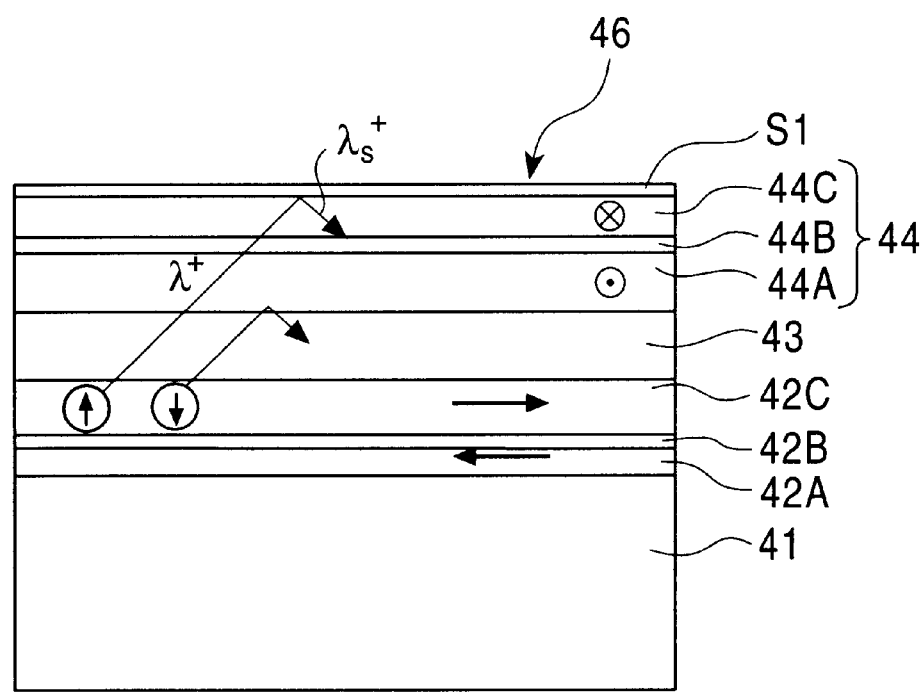
FIG. 11B is provided for illustrating the contribution of the specular layer to the specular effect in the spin-valve type thin film magnetic element, and shows a cross section of one example of the spin-valve type thin film magnetic element according to the second embodiment of the present invention.

FIGS. 11A and 11B illustrate the contribution of the specular layer on the specular effect in the spin-valve type thin film magnetic element.

FIG. 11A is a cross section showing an example of the spin-valve type thin film magnetic element having no specular layer, and FIG. 11B is a cross section of the spin-valve type thin film magnetic element in this embodiment.

As has been described in the spin-filter effect, the behavior of the (+)-spins (up-spins) restricted by the direction of pinned magnetization of the second pinned magnetic layer 42C may be considered for elucidating the GMR effect.

When no external electric field is applied, the electrons arrive at the free magnetic layer 44 through the non-magnetic conductive layer 43, travel in the free magnetic layer 44 (pass through the second free magnetic layer 44A non-magnetic intermediate layer 44B and first free magnetic layer 44C in this order in the present embodiment), and arrive at near the interface between the free magnetic layer 44 and specular layer S1.

As shown in FIG. 11A, the (+)-spin electrons travel in the free magnetic layer 44 and are reflected at the upper face of the free magnetic layer when no specular layer is provided. Therefore, the mean free path is represented by $\lambda^+$ as shown in FIG. 11A.

When the specular layer S1 is provided as shown in FIG. 11B, on the other hand, the (+)-spin electrons are reflected (specular reflection) at near the interface between the free magnetic layer 44 and specular layer S1, since a potential barrier is formed in the vicinity of the interface between the free magnetic layer 44 and specular layer S1.

The spin states (energy state, quantum state and the like) of the electrons are usually changed by scattering of the conduction electrons. However, the (+)-spin electrons have a high probability to be reflected while their spin states such as energy and quantum stets are conserved when they are scattered at the specular layer, and again travel through the free magnetic layer 44. In other words, the spin states of the conduction electrons are not changed by specular reflection, and the electrons travel in the free magnetic layer 44 as if they haven't been scattered.

This means that the (+)-spin electrons acquired an additional mean free path $\lambda^+_s$ corresponding to specular reflection as shown in FIG. 11B.

The mean free path of the (+)-spin electrons are largely extended by providing the specular layer S1, since the reflection mean free path $\lambda^+_s$ is added to the existing mean free path.

Accordingly, resistance of the spin-valve type thin film magnetic element is reduced by providing the specular layer S1, since resistance of the free magnetic layer is relatively reduced (or has a relatively long mean free path).

When an external magnetic layer is applied to rotate the direction of magnetization of the free magnetic layer 44, the (+)-spin electrons are scattered in the free magnetic layer 44 due to different spin directions from the direction of magnetization of the magnetic material. In other words, the probability that makes the (+)-spin electrons to have a mean free path equivalent to the mean free path of the (−)-spin electrons (down-spin conduction electrons) increases. Consequently, the effective mean free path rapidly decreases, or the electrical resistance rapidly increases.

The GMR effect can be observed as a result of electrical resistance changes in the spin-valve type thin film magnetic element caused by the applied external magnetic field.

Since the spin-valve type thin film magnetic element comprises the specular layer S1, the specular effect can be manifested to greatly extend the mean free path of the up-spin conduction electrons. Therefore, the rate of change of magnetoresistance of the spin-valve type thin film magnetic element can be largely improved by increasing the mean free path difference between the up-spin and down-spin conduction electrons.

While a part of the up-spin conduction electrons are scattered in the non-magnetic intermediate layer 44B and second free magnetic layer 44A in this embodiment, the specular effect may be more effectively expressed by forming the free magnetic layer into a single layer structure as in the first embodiment.

The spin-valve type thin film magnetic element in this embodiment can be manufactured by the same method as in the first embodiment, except that the laminated body 46 is formed by sequentially laminating the first pinned layer 42A, non-magnetic layer 42B, second pinned magnetic layer 42C, non-magnetic conductive layer 43, second free magnetic layer 44A, non-magnetic intermediate layer 44B, first free magnetic layer 44C, specular layer S1 and protective layer 45 on the antiferromagnetic layer 41.

The following effects can be obtained in the spin-valve type thin film magnetic element according to this embodiment, in addition to the similar effects in the spin-valve type thin film magnetic element according to the first embodiment shown in FIG. 1.

Since the free magnetic layers are made to be synthetic ferrimagnetic free spin valve type layers, magnetization of the free magnetic layer can be sensitively rotate in a weak magnetic field while enabling a large rate of change of magnetoresistance (ΔR/R) to be obtained.

Since the non-magnetic intermediate layer 44B and first free magnetic layer 44C are able to shift the central position for allowing the sense current J to flow toward the free magnetic layer side, as in the case of providing the backed layer B1 described in the first embodiment with reference to FIG. 9, an effect for weakening the sense current magnetic field $H_j$ can be obtained in the free magnetic layer.

Since the up-spin conduction electrons are reflected by specular reflection in the vicinity of the interface between the free magnetic layer 44 and specular layer S1, the mean free path of the up-spin conductive electrons may be extended. Consequently, the specular effect may be expressed to increase the mean free path of the spin-dependent conduction electrons, thereby enhancing the rate of change of magnetoresistance.

Therefore, improved sensitivity against the external magnetic field by the synthetic ferrimagnetic free layer (free magnetic layer 44), as well as improved rate of change of magnetoresistance by the specular effect of the specular layer S1, may be simultaneously expressed.

The third embodiment of the present invention will be described hereinafter with reference to the drawings.

Third Embodiment

Figure 12:
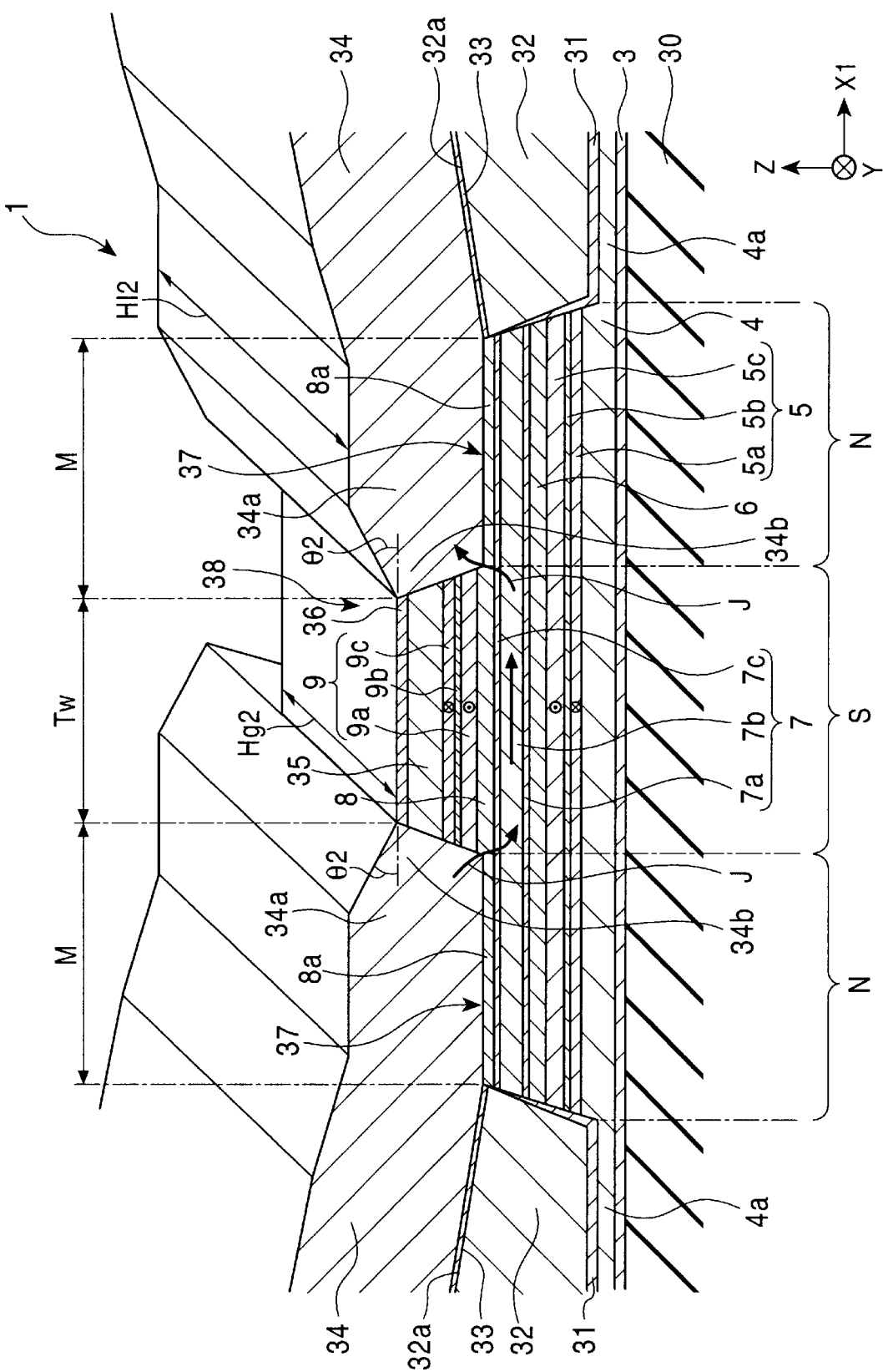
FIG. 12 is a cross section showing the spin-valve type thin film magnetic element according to the third embodiment of the present invention viewed from the opposed face side to the recording medium.

FIG. 12 is a cross section showing the structure of the spin-valve type thin film magnetic element according to the third embodiment of the present invention as viewed from the opposed face side to the recording medium.

As shown in FIG. 12, the spin-valve type thin film magnetic element according to the third embodiment of the present invention is a so-called dual spin-valve type thin film magnetic element in which one layer each of the non-magnetic conductive layers, pinned magnetic layers and antiferromagnetic layers are laminated in the direction of thickness of a free magnetic layer as a center of the laminated body.

Since two pairs of three layer combinations of "free magnetic layer/non-magnetic layer/pinned magnetic layer" are present in the dual spin-valve type thin film magnetic element 1, a large rate of change of magnetoresistance may be expected as compared with the single spin-valve type thin film magnetic element comprising one combination of "free magnetic layer/non-magnetic layer/pinned magnetic layer", thereby enabling the magnetic element to comply with high density recording. This spin-valve type thin film magnetic element also comprises a hard bias layer as a bias layer.

The spin-valve type thin film magnetic element 1 mainly comprises, on a substrate 30, a laminated body 38 formed by sequentially laminating an underlayer 3 comprising Ta, a first antiferromagnetic layer 4, a first pinned magnetic layer 5, a first non-magnetic conductive layer 6 comprising Cu, a free magnetic layer 7, a second pinned magnetic layer (partly a narrow non-magnetic conductive layer) 8 comprising Cu, a second pinned magnetic layer (a narrow pinned magnetic layer) 9, a second antiferromagnetic layer (a narrow antiferromagnetic layer) 35 and a protective layer 36 comprising Ta, a pair of hard bias layers 32 formed at both sides of the laminated body 38 and comprising a CoPt alloy for aligning magnetization of the free magnetic layer 7, and a pair of lead layers (electrode layers) 34 formed on the bias layers 32 and comprising Cu, Au, Ta, Cr or W for flowing a sense current in the laminated body 38.

The length Hg vertically extending from the opposed face to the recording medium toward the inside of the laminated body 38 shown in FIG. 12, or the elevation of the element, is preferably in the range of 0.2 to 0.5 μm.

The sheet resistance of the laminated body 38 is preferably in the range of 15 to 25 Ω/M².

The free magnetic layer 7 is constructed by laminating a first diffusion preventive layer 7a comprising Co, a ferromagnetic free layer 7b comprising a NiFe alloy, and a second diffusion preventive layer 7c comprising Co. The first and second diffusion preventive layers 7a and 7c prevent mutual diffusion with adjoining first and second non-magnetic magnetic conductive layers 6 and 8.

The thickness of each of the first and second diffusion preventive layers 7a and 7c is preferably in the range of 0.3 to 1.0 nm, and the thickness of the ferromagnetic free layer is preferably in the rage of 1 to 3 nm.

The direction of magnetization of the free magnetic layer 7 is aligned in the X1-direction by a bias magnetic field from the hard bias layers 32. Putting the free magnetic layer 7 into a single domain state enables Barkhausen noises of the spin-valve type thin film magnetic element 1 to be reduced.

The first pinned magnetic layer 5 is constructed by laminating a first ferromagnetic pinned layer 5a, a first non-magnetic intermediate layer 5b, and a second ferromagnetic pinned layer 5c. The second ferromagnetic pinned layer 5c has a larger thickness than the thickness of the first ferromagnetic pinned layer 5a.

The direction of magnetization of the first pinned magnetic layer 5a is fixed in the Y-direction by the exchange coupling magnetic field with the first antiferromagnetic layer 4. The second pinned ferromagnetic layer 5c undergoes antiferromagnetic coupling with the first ferromagnetic pinned layer 5a to fix its direction of magnetization in the direction opposed to the Y-direction.

Since the direction of magnetization of the first ferromagnetic pinned layer 5a is antiparallel to the direction of magnetization of the second ferromagnetic pinned layer 5c, the magnetic moments in respective layers are in a relation to offset with each other. However, a slight magnitude of magnetization (magnetic moment) of the second ferromagnetic pinned layer 5c is let behind since the second ferromagnetic pinned layer 5c has a larger thickness than the first ferromagnetic pinned layer 5a. As a result, the direction of net magnetization of the overall first pinned magnetic layer 5 is fixed in the direction opposite to the Y-direction.

The thickness of the second ferromagnetic layer 5c may be smaller than the thickness of the second ferromagnetic layer 5a.

The second pinned magnetic layer 9 is constructed by laminating a third ferromagnetic pinned layer 9a, a second non-magnetic intermediate layer 9b, and a fourth ferromagnetic pinned layer 9c. The third ferromagnetic pinned layer 9a has a larger thickness than the fourth ferromagnetic pinned layer 9c.

The direction of magnetization of the fourth ferromagnetic pinned layer 9c is fixed in the Y-direction by the exchange coupling magnetic field with the second antiferromagnetic layer 35. The third ferromagnetic pinned layer 9a undergoes antiferromagnetic coupling with the fourth ferromagnetic pinned layer 9c, and its direction of magnetization is fixed in an opposite direction to the Y-direction.

While the magnetic moments of the third and fourth ferromagnetic pinned layers 9a and 9c are in a relation to offset with each other as in the first pinned magnetic layer 5, a slight magnitude of magnetization (magnetic moment) of the third ferromagnetic pinned layer 9a is left behind because the third ferromagnetic pinned layer 9a has a larger thickness than the forth ferromagnetic pinned layer 9c. Consequently the direction of net magnetization of the overall second pinned magnetic layer 9 is fixed in an opposite direction to the Y-direction.

The thickness of the third ferromagnetic pinned layer 9a may be smaller than the thickness of the fourth ferromagnetic pinned layer 9c.

The first to fourth ferromagnetic pinned layers 5a, 5c, 9a and 9c undergo antiferromagnetic coupling with each other in the fist and second pinned magnetic layers 5 and 9, and each of the second and third ferromagnetic pinned layers 5c and 9a retain residual magnetization. Therefore, these layers serve as synthetic ferrimagnetic pinned layers.

The direction of magnetization of the free magnetic layer 7 intersects the directions of magnetization of the first and second pinned magnetic layers 5 and 9.

The first to fourth ferromagnetic pinned layers 5a, 5c, 9a and 9c are formed of a NiFe alloy, Co, a CoNiFe alloy, a CoFe alloy or a CoNi alloy, and Co is preferable among them. The first to fourth ferromagnetic pinned layers 5a, 5c, 9a and 9c are preferably formed of the same material. The first and second non-magnetic intermediate layers 5b and 9b preferably comprise at least one of Ru, Rh, Ir, Cr, Re and CU, or an alloy thereof, and particularly formed of Ru.

Each of the first and fourth ferromagnetic pinned layers 5a and 9c preferably has a thickness in the range of 1 to 2 nm, and each of the second and third ferromagnetic pinned layers 5c and 9a preferably has a thickness in the range of 2 to 3 nm.

The thickness of each of the first and second non-magnetic intermediate layers 5b and 9b is preferably in the range of 0.7 to 0.9 nm.

While each of the first and second pinned magnetic layers 5 and 9 is composed of two ferromagnetic layers (the first and second ferromagnetic pinned layers 5a and 5c, or the third and fourth 9a and 9c), the construction is not restricted thereto, and may be composed of two or more of the ferromagnetic layers. It is preferable that, not only the non-magnetic intermediate layer is inserted between the corresponding ferromagnetic layers, but respective directions of magnetization between adjoining ferromagnetic layers are in opposed directions with each other to put the entire layer in a ferrimagnetic state.

Since the first and second pinned magnetic layers serve as synthetic ferrimagnetic pinned layers, the first and second pinned magnetic layers 5 and 9 may be stabilized by tightly fixing the direction of magnetization of the first and second pinned magnetic layers 5 and 9.

The first and second non-magnetic conductive layers 6 and 8 are provided in order to reduce magnetic coupling among the free magnetic layer 7, and first and second pinned magnetic layers 5 and 9, and a sense current flows through these layers. The layers are preferably formed of a conductive non-magnetic material represented by Cu, Cr, Au and Ag, and Cu is preferable among them.

The thickness of each of the first and second non-magnetic conductive layers 6 and 8 is preferably in the range of 2 to 2.5 nm.

Preferably, the first and second antiferromagnetic layers 4 and 35 are made of the PTMn alloy. The PtMn alloy is superior to the NiMn alloy and FeMn alloy that have been used as the antiferromagnetic layer while having a high blocking temperature and large exchange coupling magnetic field.

Otherwise, the first and second antiferromagnetic layers 4 and 35 may be formed of either a X—Mn alloy or X'—Pt—Mn alloy (in the composition formula, X represents one element selected from Pt, Pd, Ir, Rh, Ru and Os, and X' represents at least one element selected from Pd, Cr, Ru, Ni, Ir, Rh, Os, Au, Ag, Ne, Ar, Xe and Kr).

The PtMn alloy and the alloy represented by the formula X—Mn desirably contain Pt or X in the range of 37 to 63 at %, more preferably in the range of 44 to 57 at %.

The alloy represented by the formula X'—Pt—Mn desirably contains X'+Pt in the range of 37 to 63 at %, more preferably in the range of 44 to 57 at %.

Each of the first and second antiferromagnetic layer 4 and 35 preferably has a thickness in the range of 8 to 11 nm.

The first and second antiferromagnetic layer 4 and 35 generating a large exchange coupling magnetic field may be obtained by using the alloys having a proper composition range described above in the first and second antiferromagnetic layers 4 and 35, and by heat-treating the alloy. The directions of magnetization of the of the first and second pinned magnetic layer 5 and 9 are tightly fixed in the direction of magnetization by the exchange coupling magnetic field described above. When the PtMn alloy is particularly used, the first and second antiferromagnetic layers 4 and 35 having an exchange coupling magnetic field exceeding $6.4 \times 10^4$ A/m and a blocking temperature of as high as 653K (380° C., a temperature where the exchange coupling magnetic field disappears) can be obtained.

The first antiferromagnetic layer 4 is formed by being projected at both sides of the X1-direction from the first pinned magnetic layer 5 and free magnetic layer 7. The bias layer 32 and lead layer 34 are sequentially laminated on each of the these projections 4a of the first antiferromagnetic layer 4.

A bias underlayer 31 comprising Ta or Cr is laminated between each of the projections 4a of the first antiferromagnetic layer 4 and bias layers 32. When a hard bias layer 32 is formed on the bias underlayer 31 comprising Cr that is a non-magnetic metal and having a body-centered cubic structure (a bcc structure), for example, the coercive force and remanence ratio of the hard bias layer 32 are increased to enable the bias magnetic field required for putting the free magnetic layer 7 into a single magnetic domain state to be increased.

An intermediate layer 33 comprising Ta or Cr is laminated between the hard bias layer 32 and lead layer 34. Providing the intermediate layer 33 made of Ta permits it to function as a diffusion barrier in the heat process such as a resist curing process in the post processing when Cr is used for the lead layer 34, while preventing magnetic characteristics of the bias layer 32 from being deteriorated. Providing the intermediate layer 33 made of Cr provokes an effect for making the Ta crystal deposited on Cr to readily take a body-centered cubic structure having low resistance when Ta is used for the lead layer 34.

A pair of cut-off portions are formed at both sides in the X1-direction of the laminated body 38 and remote from the substrate 30, where a pair of lead junctions 37 are formed.

The lead junction 37 is formed at each side of the second pinned magnetic layer 9 and second antiferromagnetic layer 35 in the X1 direction, and at each side of a part of the second non-magnetic conductive layer 8 in the X1-direction.

The widths of the second antiferromagnetic layer 35 and second pinned magnetic layer 9 in the X1-direction (track width direction) are narrower than the width of the free magnetic layer 7.

The width of the second pinned magnetic layer 9 side of the second non-magnetic conductive layer 8 is also narrower than the width of the free magnetic layer 7.

The width of the free magnetic layer 7 side of the second non-magnetic conductive layer 8 is almost equal to the width of the free magnetic layer 7, and the second non-magnetic conductive layer 8 has projections 8a at both sides in the X1 direction.

A lead layer 34, an overlay part 34a of the lead layer 34 are connected to the lead junction 37.

Each of the lead layer 34 is extended in the X1-direction from each side of the laminated body 38 toward the center of the laminated body 38 on the hard bias layer 32, and is bonded to each side of the laminated body 38 in the X1 direction. The overlay potion 34a is connected to the lead junction 37.

The overlay portions 34a are disposed on the lead junctions 37 with a space Tw apart with each other. This space Tw corresponds to the optical track width of the spin-valve type thin film magnetic element 1.

Accordingly, the projection 8a of the second non-magnetic conductive layer 8 is extended in the X1 direction in the lead junction 37. Consequently, the overlay portion 34a is directly joined to the projection 8a of the second non-magnetic conductive layer 8 without being mediated with the second antiferromagnetic layer 35. The overlay portion 34a is separated from the free magnetic layer 7 by the projection 8a.

The preferable width M of each lead junction 37 in the X1 direction is in the range of 0.03 to 0.5 $\mu$m. With this width M, the junction area between the lead layer 34 of the lead junction 37 and the laminated body 38 can be increased to reduce junction resistance that does not contribute to the magnetoresistive effect, thereby enabling the sense current to be efficiently flown in the laminated body 38 and regenerative characteristics to be improved.

Since a part of the second non-magnetic conductive layer 8 is cut off to form the lead junction 37, and the lead layer 34 is connected so as to be inserted into this cut-off portion, the step height between the laminated body 38 and lead layer 34 is reduced, thereby reducing the gap width on the spin-valve type thin film magnetic element 1. Insulation property of the spin-valve type thin film magnetic element 1 can be enhanced by laminating an upper insulation layer on the spin-valve type thin film magnetic element 1, without any possibility of generating pin-holes on the upper insulation layer.

A pair of hard bias layers 32 comprising, for example, a CoPt (cobalt-platinum) alloy are formed at both side in the X1-direction of the laminated body 38, or at both side in the track width direction. The hard bias layer 32 adjoins the free magnetic layer 7 at the same elevation as the free magnetic layer 7. The upper face 32a of the hard bias layer 32 is joined to the laminated body 38 at the position closer to the substrate 30 from the lead junction 37.

An intermediate layer 33 is formed between the hard bias layer 32 and lead layer 34. The intermediate layer 33 abuts against the projection 8a from each side of the second non-magnetic conductive layer 8 in the X1-direction.

Accordingly, only the lead layer 34 is connected to the lead junction 37.

The relation represented by the following general equation is valid in the structure of the spin-valve type thin film magnetic element 1 shown in FIG. 1, when the length of the lead layer 34 vertically extending from the opposed face to the recording medium toward the inside of the element is defined as H12, the sheet resistance of the lead layer 34 is defined as Rs12, the length of the laminated body 38 vertically extending from the opposed face to the magnetic recording medium toward the inside of the element, or the elevation of the element, is defined as Hg2, and the sheet resistance of the laminated body 38 is defined as Rsg2:

$$(Rs12/H12)/(Rsg2/Hg2) \leq 0.02$$

It is not preferable that the value of (Rs12/H12)/(Rsg2/Hg2) exceeds 0.02, because the effect of increasing the proportion of the sense current flowing in from the overlay part 34a of the lead layer 34 is not sufficiently manifested to potentially generate side reading.

More preferably, the relation represented by the following general formula is valid among H12, Rs12, Hg2 and Rsg2:

$$(Rs12/H12)/(Rsg2/Hg2) \leq 0.01$$

The relation represented by the following general equation is valid in the structure of the spin-valve type thin film magnetic element 1 shown in FIG. 1, when the length of the lead layer 34 vertically extending from the opposed face to the recording medium toward the inside of the element is defined as H12, the sheet resistance of the lead layer 34 is defined as Rs12, the length of the laminated body 38 vertically extending from the opposed face to the magnetic recording medium toward the inside of the element, or the elevation of the element Hg2, is adjusted in the range of 0.2 to 0.5 $\mu$m, and the sheet resistance Rsg2 of the laminated body 38 is adjusted in the range of 15 to 25 $\Omega/M^2$:

$$(Rs12/H12) \leq 1 \ \Omega/\mu m$$

It is not preferable that the value of (Rs12/H12) exceeds 1 $\Omega/\mu$m, since the effect for increasing the proportion of the sense current flowing in from the overlay part 34a of the lead layer 34 cannot be sufficiently manifested to potentially generate side reading.

Preferably, the relation represented by the following general equation is valid between H12 and Rs12, when Hg2 is adjusted in the range of 0.2 to 0.5 /$\mu$m and Rsg2 is adjusted in the range of 15 to 25 $\Omega/M^2$:

$$(Rs12/H12) \leq 0.5 \ \Omega/\mu m$$

The angle $\theta_2$ formed between the surface of the overlay part 34a of the lead layer 34 and the surface of the laminated body 38 is preferably in the range of 45 to 70 degrees.

It is not preferable that the angle $\theta_2$ is smaller than 45 degrees, since the tip of the overlay part 34a is thinned and the resistance Rs12 of the tip increases to increase the resistance against the sense current flowing in from the overlay part 34a, thereby potentially generating side reading.

It is also not preferable that the angle $\theta_2$ is larger than 70 degrees, since the step height between the upper face of the electrode layer and the upper face of the laminated body becomes so steep that the insulation film that serves as the upper gap deposited on the surface of the spin-valve type thin film magnetic element can hardly cover the step height. Thereby potentially forming short circuits between the upper shield and the spin-valve type thin film magnetic element.

The sense current J (the arrow J) mainly flows from near the tip 34b of the overlay part 34a to the laminated body 38 in the spin-valve type thin film magnetic element 1.

Accordingly, the area where the sense current most easily flows in the laminated body 38 is the center of the laminated body 38, or the area where the overlay part 34a is not joined. Since the sense current is converged on this area, the magnetoresistive (MR) effect is substantially increases to enhance sensitivity for sensing the leak magnetic field from the magnetic recording medium. Therefore, the area where the overlay part 34a is not joined is termed as a sensitive zone S as shown in FIG. 1.

The magnitude of the sense current is extremely reduced at the area where the overlay part 34a is joined, thereby the magnetoresistive effect is substantially reduced to decrease sensitivity for sensing the leak magnetic field from the recording medium. The area where the overlay part 34a is joined is named as a dead zone.

The area that substantially contribute to regeneration of the recording magnetic field from the magnetic recording medium (the sensitive zone S), and the area that doe not contribute to regeneration of the recording magnetic field from the magnetic recording medium (the dead zone N) are formed, by joining a part of the lead layer 34 (the overlay part 34a) to the lead junction 37 located on each end in the track width direction of the laminated body 38. Consequently, the width of the sensitive zone S serves as a magnetic track width of the spin-valve type thin film magnetic element 1, thereby enabling the magnetic head to comply with narrowing of the track width.

Since the overlay part 34a is directly joined to the projection 8a of the second non-magnetic conductive layer 8 comprising Cu having low resistivity without passing through the second antiferromagnetic layer 35 having high resistivity, the component of the sense current that flows in the laminated body 38 through the lead junction 37 may be increased, and the shunt component is largely reduced.

The sense current flowing in the dead zone is in particular reduced, since the shunt component flowing in from the lead layer 34 through the hard bias layer 32, and flowing from the second antiferromagnetic layer 35 to the laminated body at the substrate side, is largely reduced.

Accordingly, the sense current may be converged on the sensitive zone to which the lead layer 34 is not joined, thereby improving voltage variation at the sensitive zone S as well as output characteristics of the spin-valve type thin film magnetic element 1.

The magnetoresistive effect is not substantially expressed in the dead zone N where the lead layer 34 is not joined because the shunt component of the sense current is reduced, thereby sensing no leak magnetic field from the recording track of the magnetic recording medium. Consequently, side reading of the spin-valve type thin film magnetic element 1 may be prevented.

The area of the sensitive zone S of the laminated body 38 can be determined by a micro-track profile method.

The micro-track profile method will be described hereinafter.

Figure 13:
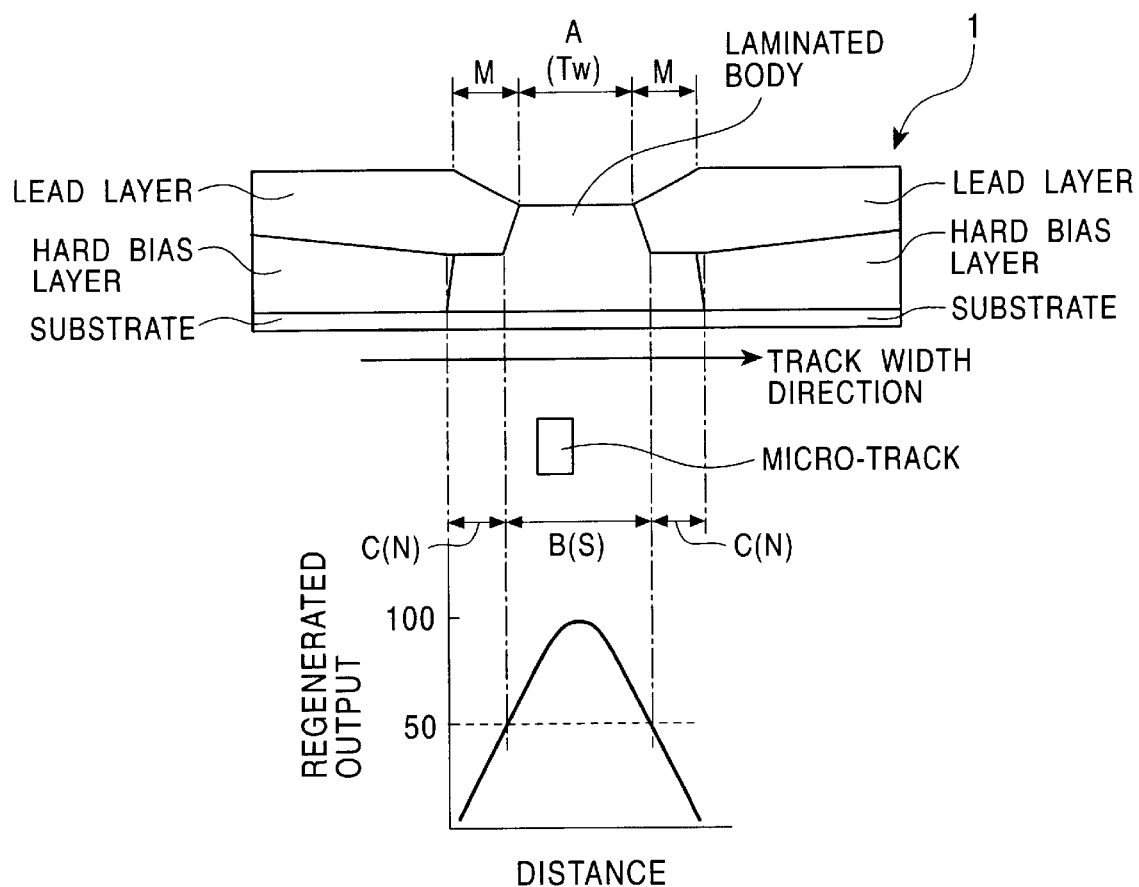
FIG. 13 illustrates a measuring method by a micro-track profile method.

As shown in FIG. 13, the spin-valve type thin film magnetic element 1 according to the present invention comprising a laminated body that manifests the magnetoresistive effect, a hard bias layer formed at each side thereof, and a lead layers formed on the hard bias layer is formed on the substrate.

Then, the width A of the upper face of the laminated body not covered with electrode layers is measured with an optical microscope or electron microscope. This width a is defined as a track width Tw measured by an optical method.

Subsequently, a given signal is recorded as a micro-track, and the relation between the width A and regenerative output is measured by scanning the spin-valve type thin film magnetic element 1 on this micro-track in the track width direction. Or, the relation between the width A and regenerative output may be measured by scanning the magnetic recording medium side on which the micro-track is formed on the spin-valve type thin film magnetic element in the track width direction. The results of measurements are shown at the bottom in FIG. 13.

The results of measurements show that the regenerative output is high at near the center of the laminated body, while the regenerative output is low at near the side portion of the laminated body. These results indicate that a good magnetoresistive effect that is related to regenerative functions is manifested at near the center of the laminated body, while the regenerative output is low due to a poor magnetoresistive effect at near each side thereof to deteriorate regenerative functions.

The area formed with a width B in the laminated body where a regenerative output of 50% or more relative to the maximum regenerative output is obtained is defined as the sensitive zone S, and the area formed with a width C in the laminated body where a regenerative output of less than 50% relative to the maximum regenerative output is obtained is defined as the dead zone N in the present invention.

As shown in FIG. 13, the sensitive zone S corresponds to the area substantially manifesting the magnetoresistive effect, and the width B of the sensitive zone S serves as a magnetic track width.

While the track width (the width B) of the sensitive zone S is a little larger than the optical track width Tw (a dimension of A), the difference is quite small, or may be considered to be substantially equal, in view of the total width of the laminated body of several $\mu$m below the decimal point.

The method for manufacturing the spin-valve type thin film magnetic element 1 as hitherto described will be described hereinafter with reference to the drawings.

The manufacturing method comprises the steps of forming a laminated film, forming a lift-off resist, forming a laminated body having an approximately trapezoidal cross section, laminating a bias layer, forming a lead junction, and forming a lead layer.

Figure 14:
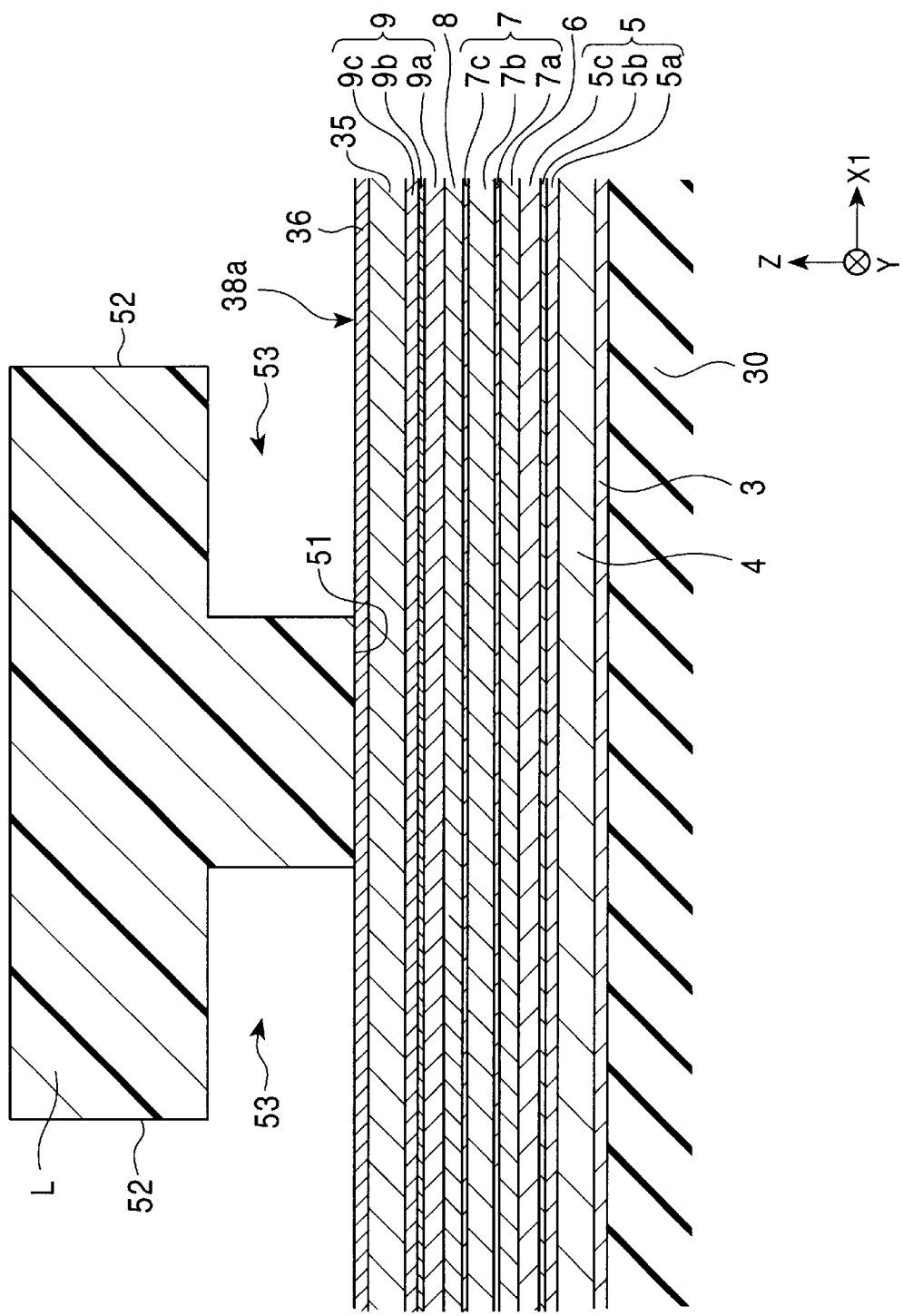
FIG. 14 is provided for describing a method for manufacturing the spin-valve type thin film magnetic element shown in FIG. 12, and shows the steps for forming the laminated films and a resist film.

The laminated film 38a is at first formed in the laminated film deposition step by sequentially laminating, on the substrate 30, an underlayer 3, a first antiferromagnetic layer 4, a first ferromagnetic pinned layer 5a, a first non-magnetic intermediate layer 5b, a second ferromagnetic layer 5c, a first non-magnetic conductive layer 6, a first diffusion preventive layer 7a, a ferromagnetic free layer 7b, a second diffusion preventive layer 7c, a second non-magnetic conductive layer 8, a third ferromagnetic pinned layer 9a, a second non-magnetic intermediate layer 9b, a fourth ferromagnetic pinned layer 9c, a second antiferromagnetic layer 35 and a protective layer 36 as shown in FIG. 14.

Then, a lift-off resist L is formed on the laminated film 38a in the resist forming step as shown in FIG. 14. The lift-off resist L comprises an abutting face 51 in contact with the laminated film 38a, and both side faces 52 facing with each other across the abutting face 51. A pair of cut-off portions 53 are provided at both sides of the abutting face 51 in the track width direction, and at both sides between the abutting face and each of the side faces 52.

Figure 15:
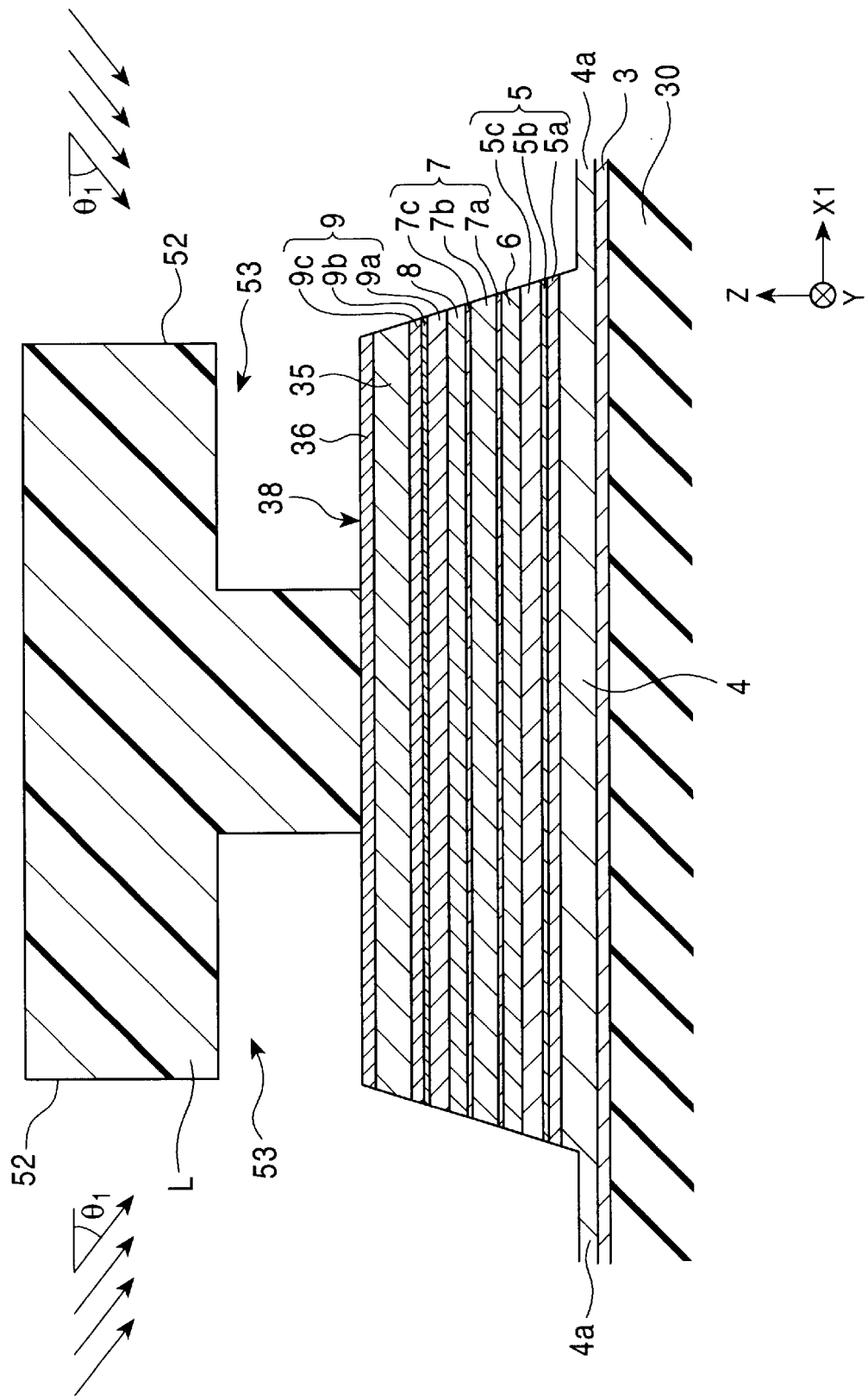
FIG. 15 is provided for describing a method for manufacturing the spin-valve type thin film magnetic element shown in FIG. 12, and shows the step for forming the laminated body.

In the next step for forming the laminated body, an ion-beam of an inert gas such as Ar is irradiated to the laminated film 38*a* from a direction inclined by an angle $\theta_1$ relative to the substrate 30 as shown in FIG. 15, and the laminated film 38*a* laying at the outside of each side face 52 of the lift-off resist L in the X1 direction (outside in the track width direction) is etched until a half-height of the first antiferromagnetic layer 4.

A laminated body 38 with an approximately trapezoidal cross section is formed as described above. A part of the first antiferromagnetic layer 4 of the laminated body 38 is left behind by etching this antiferromagnetic layer until the half-height thereof, and the antiferromagnetic layer finally has an extending part 4*a* extending in the X1 direction at each side face.

Ion-milling using Ar and reactive ion etching (RIE) are preferably used for etching. These methods are excellent in linearity of the orbit of etching particles, which may be irradiated from a specified direction.

The angle $\theta_1$ that determined the irradiation direction of the etching particle beam such as the ion beam is preferably in the range of 60 to 85°.

The angle $\theta_1$ may be determined, for example, by adjusting the angle formed between the surface of the ion-gun grid and substrate 30.

An anisotropic etching may be applied to the laminated film 38*a* by irradiating the etching particles at the angle $\theta_1$, and the laminated body 38 having an approximately trapezoidal cross section can be formed by etching a part of the laminated film 38*a* at the outside of each side face 52 of the lift-off resist L.

Figure 16:
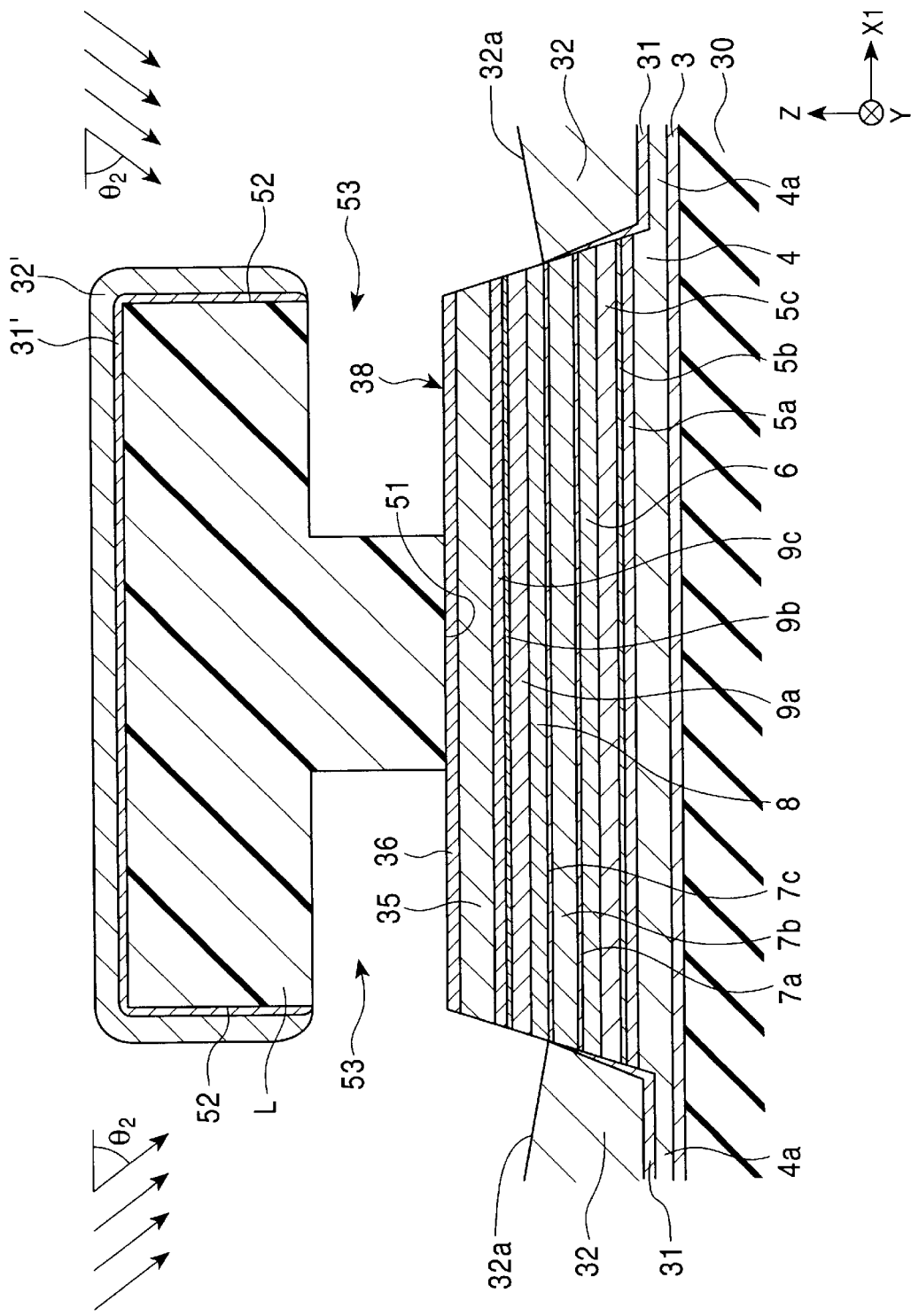
FIG. 16 is provided for describing a method for manufacturing the spin-valve type thin film magnetic element shown in FIG. 12, and shows the step for forming the bias layer.

As shown in FIG. 16, the sputtering particles are deposited on both sides of the laminated body 38 from a direction with an angle of $\theta_2$ ($\theta_2 > \theta_1$) relative to the substrate 30 in the step for forming the bias layer, thereby depositing the bias underlayer 31 and bias layer 32. The bias underlayer 31 and bias layer 32 are deposited at both sides of the laminated body 38 and on each extension part 4*a* of the first antiferromagnetic layer 4. The hard bias layer 32 is preferably laminated up to the same elevation as the free magnetic layer 7. In FIG. 16, the hard bias layer 32 is laminated so that the upper face 32*a* of the hard bias layer 32 comes to the same elevation as the junction between the free magnetic layer 7 and second non-magnetic conductive layer 8.

The sputtering particles are also deposited on the lift-off resist L in the sputtering particle deposition step, and layers 31' and 32' having the same composition as the bias underlayer 31 and hard bias layer 32 are formed.

Figure 17:
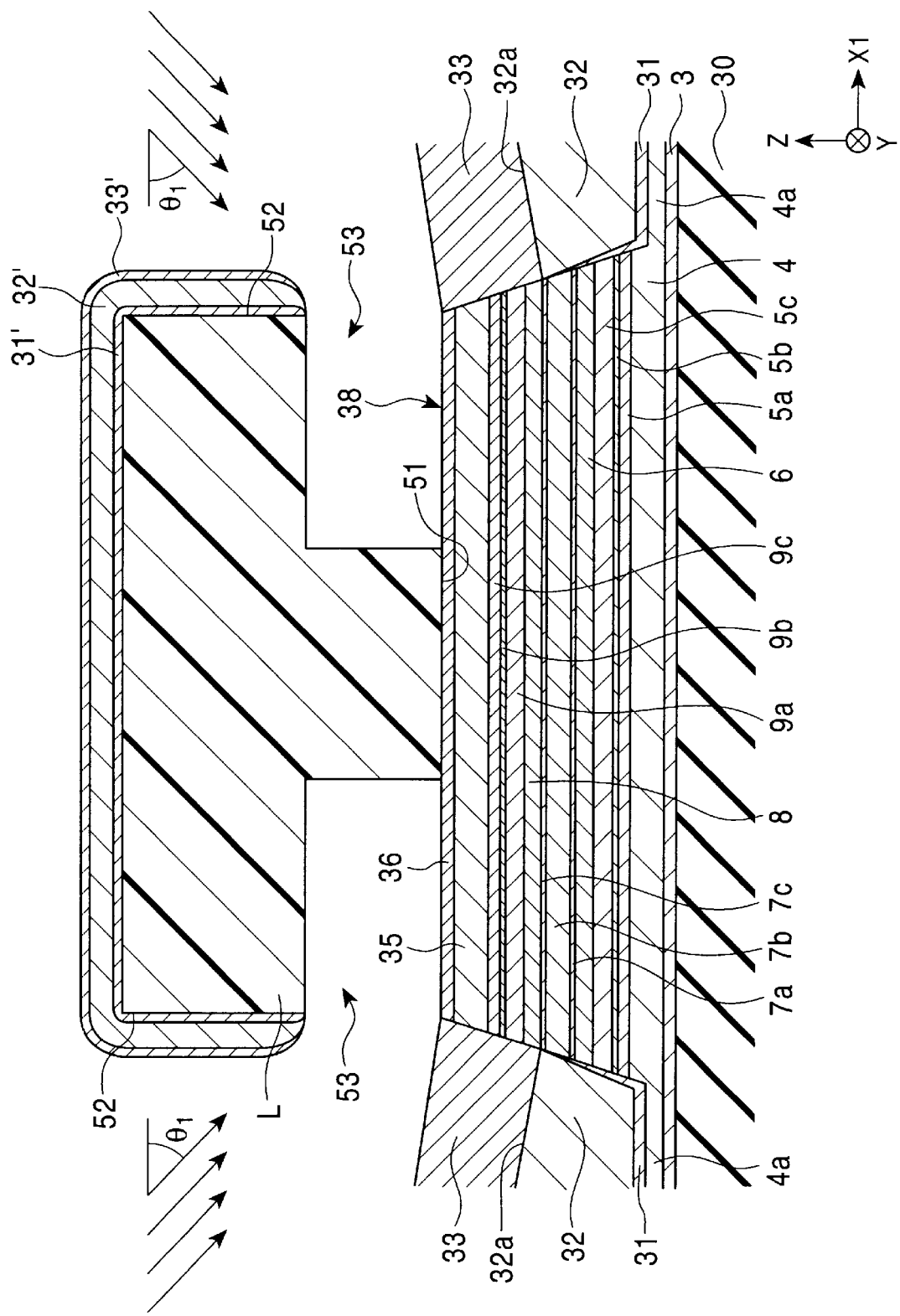
FIG. 17 is provided for describing a method for manufacturing the spin-valve type thin film magnetic element shown in FIG. 12, and also shows the step for forming the bias layer.

Then, the sputtering particles are deposited on each hard bias layers 32 from the direction with the angle $\theta_1$ relative to the substrate 30 as shown in FIG. 17, thereby depositing an intermediate layer 33. The intermediate layer 33 is preferably deposited at the same elevation as the protective layer 36. The upper face of the intermediate layer 33 has the same elevation as the surface of the protective layer 36 of the laminated body 38.

The sputtering particles are also deposited on the lift-off resist L in the sputtering particle deposition step, and a layer 33' having the same composition as the intermediate layer 33 is formed.

Preferably, the sputtering particles are deposited by either an ion-beam sputtering method, a long throw spattering method or a collimation, or by a combination of these methods. These methods are excellent in linearity of the orbit of etching particles, which may be irradiated from a specified direction.

The angle $\theta_2$ is preferably within the range of 70 to 90°.

It is preferable that the angle $\theta_2$ is larger than the angle $\theta_1$, or the angle $\theta_2$ is less acute than the angle $\theta_1$ relative to the surface of the substrate 30.

The angles $\theta_1$ and $\theta_2$ can be determined by adjusting the angle formed between the surface of the sputtering target and the substrate 30.

As hitherto described, the bias underlayer 31 and hard bias layer 32 may be deposited only on the outside of each cut-off portion 53 in the X1-direction, by depositing the sputtering particles at an angle $\theta_2$. The hard bias layer 32 can be formed at the same elevation as the free magnetic layer 7 without forming on each side face of the laminated body 38.

The intermediate layer 33 can be also formed at the same elevation as the upper face of the protective layer 36 on the laminated body 38, by depositing the sputtering particles at an angle $\theta_1$.

Subsequently, etching particles from a different ion beam are irradiated on the substrate 30 at an angle $\theta_3$ ($\theta_2 > \theta_3$) in the step for forming the lead junction. As a result, the protective layer 36 located at the position corresponding to each cut-off part 53, the second antiferromagnetic layer 35, the second pinned magnetic layer 9 and a part of the second non-magnetic conductive layer 8 are etched to cut off each side face of the laminated body 38, thereby forming a pair lead junctions 37.

An extension part 8*a* extending at each side in the track width direction is also formed by etching a part of the second non-magnetic conductive layer 8.

The intermediate layer 33 is simultaneously etched until the upper face thereof comes to the same elevation as the upper face of the extension part 8*a* of the second non-magnetic conductive layer 8.

Ion-milling using Ar and reactive ion etching (RIE) are preferably used for etching. These methods are excellent in linearity of the orbit of etching particles, which may be irradiated from a specified direction.

Preferably, the angle $\theta_3$ for determining the irradiation direction of the etching particles is in the range of 40 to 70°.

Preferably, the angle $\theta_3$ is smaller than the angles $\theta_1$ and $\theta_2$, or the angle $\theta_3$ is more acute than the angles $\theta_1$ and $\theta_2$.

The angle $\theta_3$ can be determined, for example, by adjusting the angle formed between the surface of the ion-gun grid and the substrate.

The ion-beam can be irradiated deep into the laminated body 38 located at each cut-off part 53 of the lift-off resist L, by irradiating the etching particles such as the ion beam at an angle $\theta_3$ more acute than the angles $\theta_1$ and $\theta_2$. Consequently, the lead junction 37 can be formed by providing a cut-off part at a part of the laminated body 38.

Figure 18:
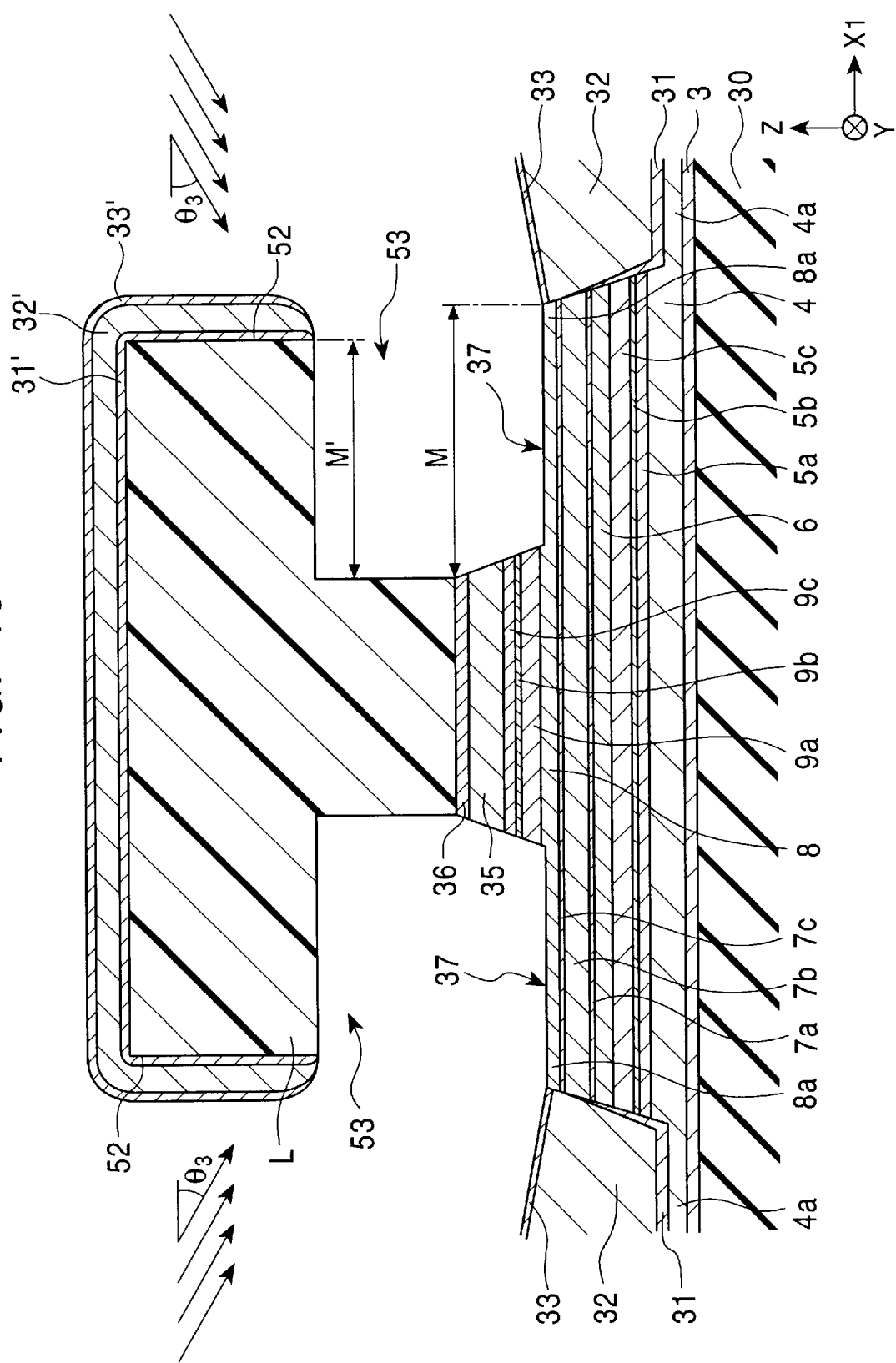
FIG. 18 is provided for describing a method for manufacturing the spin-valve type thin film magnetic element shown in FIG. 12, and shows the step for forming the lead junction.

The width M of each lead junction 37 in the X1-direction is determined by the width M' of each cut-off part 53 of the lift-off resist L in the X1-direction. While the width M of each lead junction 37 in the X1-direction is made to be a little wider than the width M' of each cut-off part 53 in the X1-direction in FIG. 18, the difference between the width M and the width M' is small, or may be considered to be substantially equal, in view of the total width of the laminated body 38 of several $\mu$m below the decimal point.

Accordingly, since the width M of the lead junction 37 in the X1-direction may be defined by the width M' of the cut-off part 53 in the X1-direction, the width of the lead junction 37 in the X1 direction can be precisely controlled. Therefore, the sense current is allowed to efficiently flow in the laminated body 38 by adjusting the contact area of the lead layer 34 on the lead junction 37.

More preferably, sputtering particle species kicked out of the laminated body 38 by etching is analyzed by a secondary ion mass spectrometry to detect the end point of etching.

Cu constituting the second non-magnetic conductive layer 8 is kicked out after the sputtering particles of Fe and Ni constituting the third pinned ferromagnetic pinned layer 9a have been kicked out by etching when the third ferromagnetic pinned layer 9a and the second non-magnetic conductive layer comprise, for example, a FeNi alloy and Cu, respectively. Therefore, deposition of the lead junction 37 may be stopped when a part of the second non-magnetic conductive layer 8 has been etched, by stopping the etching process at a prescribed time period after Cu has been detected by the second ion mass spectrometry.

The process described above permits etching accuracy for forming the lead junction 37 to be improved to form the lead junction 37 with high accuracy.

Figure 19:
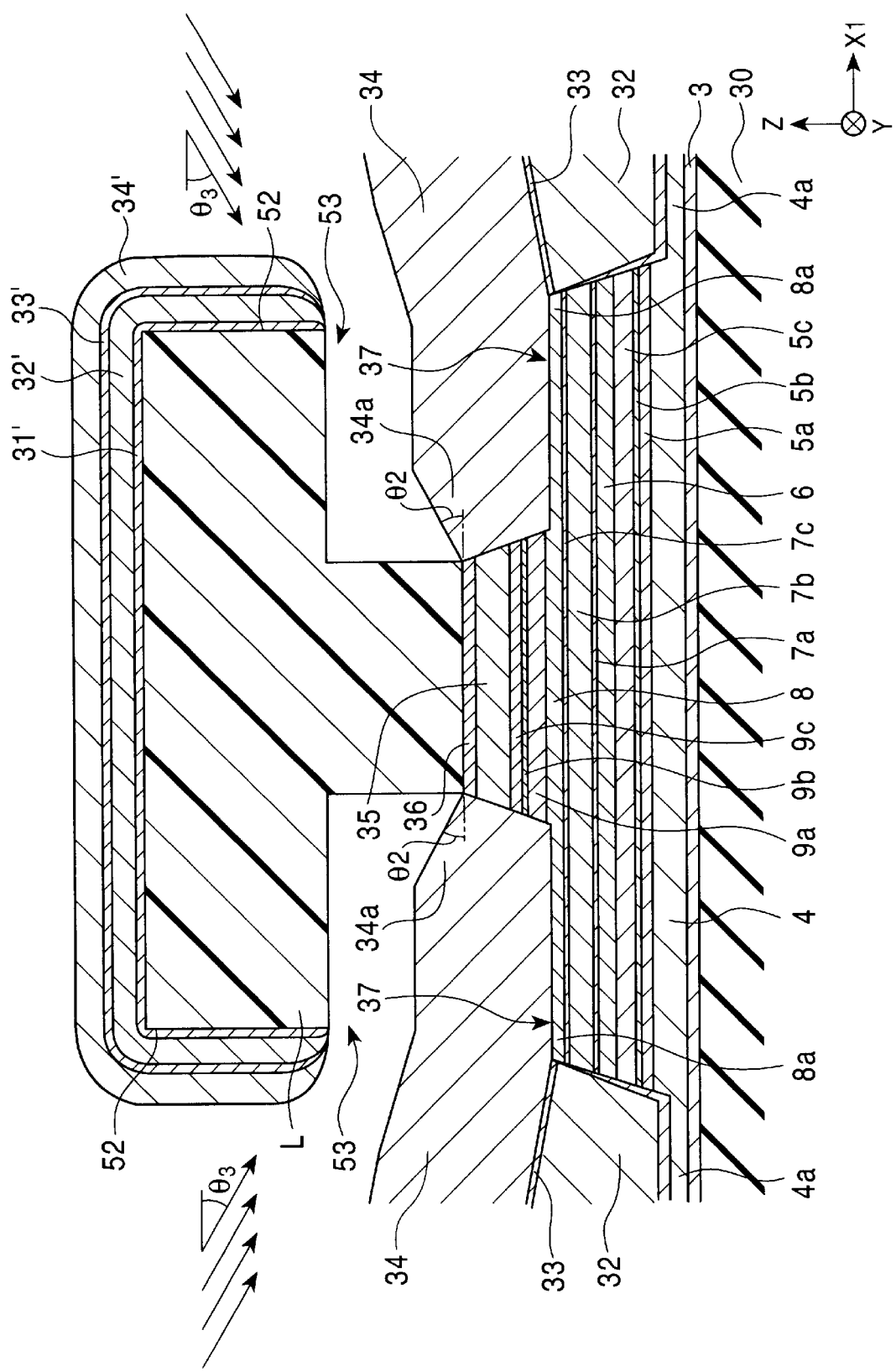
FIG. 19 is provided for describing another method for manufacturing the spin-valve type thin film magnetic element shown in FIG. 12, and shows the step for forming the lead junction.

In the lead layer deposition step, the lead layer 34 is laminated by depositing different sputtering particles at the angle of $\theta_3$ relative to the substrate 30 as shown in FIG. 19.

The lead layer 34 is laminated on the interlayer 33 and on the extension part 8a of the second non-magnetic conductive layer 8. Thus, the lead layer 34 to be connected to the laminated body 38 with the lead junction 37 is formed by extending the lead junction from each side of the laminated body 38 in the X1 direction toward the center of the laminated body 38. The lead layer 34 is formed so that the angle $\theta_2$ formed between the surface of the overlay part 34a and the surface of the laminated body 38 falls within the range of 45 to 70 degrees.

The sputtering particles are also deposited on the lift-off resist L during the sputtering particle deposition process, and a layer 347 having the same composition as the lead layer 34 is formed on the lift-off resist L.

Preferably, the sputtering particles are deposited by either the ion-beam sputtering method, long throw sputtering method or collimation sputtering method, or by a combination of these methods. These methods are excellent in linearity of the orbit of etching particles, which may be irradiated from a specified direction.

Preferably, the angle $\theta_3$ for determining the irradiation angle of the sputtering particles is approximately the same as the irradiation angle of the ion-beam in the process for forming the lead junction.

The angle $\theta_3$ can be determined, for example, by adjusting the angle formed between the surface of the sputtering target and the substrate 30.

Depositing the sputtering particles at an angle $\theta_3$ permits the lead layer 34 to be laminated on the lead junction 37 located at a position corresponding to the cut-off part 53 of the lift-off resist L. Consequently, the overlay part 34a of the lead layer 34 can be directly joined to the extension part 8a of the second non-magnetic conductive layer 8.

Finally, the lift-off resist L is removed and the laminated body is annealed in a magnetic field, in order to allow the exchange coupling magnetic field between the first and second antiferromagnetic layers 4 and 34 to be expressed to fix the direction of magnetization of the first and second pinned magnetic field 5 and 9. The bias magnetic field is also expressed by magnetizing the hard bias layers 32 in order to align the align the direction of magnetization of the free magnetic layer 7 in the X1-direction, thereby obtaining the spin-valve type thin film magnetic element 1 shown in FIG. 1.

According to the method for manufacturing the spin-valve type thin film magnetic element 1 described above, the laminated body 38 with an approximately trapezoidal cross section is formed by irradiating the etching particles such as an ion-beam at an angle $\theta_1$, followed by forming a pair of lead junctions 37 at a position corresponding to the cut-off parts 53 of the lift-off resist by irradiating different sputtering particles at an angle $\theta_3$. Consequently, the laminated body 38 and the lead junctions 37 can be formed using one lift-off resist, enabling the manufacturing process of the spin-valve type thin film magnetic element 1 to be shortened.

Since the spin-valve type thin film magnetic element 1 has the lead layer 34 comprising the overlay part 34a extending on the surface of the laminated body 38 from each side face to the center of the laminated body 38, the center portion of the laminated body 38 functions as a sensitive zone S while each side part of the laminated body 38 located under the overlay part 34a functions as a dead zone, thereby enabling the width of the sensitive zone S to serve as the track width. Accordingly, the track width may be narrowed to comply with narrowing the track width for high density recording.

The spin-valve type thin film magnetic element 1 satisfies the relation represented by $(Rs12/H12)/(Rsg2/Hg2) \leq 0.02$, when the length of the lead layer 34 vertically extending from the opposed face to the recording medium toward the inside of the element is defined as H12, the sheet resistance of the lead layer 34 is defined as Rs12, the length of the laminated body 38 vertically extending from the opposed face to the magnetic recording medium toward the inside of the element, or the elevation of the element, is defined as Hg2, and the sheet resistance of the laminated body 38 is defined as Rsg2. Therefore, resistance against the sense current flowing in from the overlay part 34a may be reduced to reduce the shunt sense current flowing in through the hard bias layer 32. Consequently, the sense current flowing in the dead zone located under the overlay part 34a of the laminated body is reduced to substantially prevent the magnetoresistance changes in the dead zone N from being expressed, thereby enabling side reading of the spin-valve type thin film magnetic element 1 to be prevented.

Since the shunt sense current is reduced and the sense current is converged on the sensitive zone S located at the center of the laminated body 38, the rate of change of magnetoresistance at the sensitive zone S as well as output characteristics of the spin-valve type thin film magnetic element 1 are substantially improved.

Since the relation among H12, Rs12, Hg2 and Rsg2 satisfies the relation of $(Rs12/H12)/(Rsg2/Hg2) \leq 0.01$, the resistance against the sense current flowing in from the overlay part 34a may be further reduced, thereby enabling the shunt sense current flowing through the hard bias layer 32 to be more reduced.

The relation of $(Rs12/H12) \leq 1 \ \Omega/\mu m$ is valid in the spin-valve type thin film magnetic element 1, when the length of the lead layer 34 vertically extending from the opposed face to the recording medium toward the inside of the element is defined as H12, the sheet resistance of the lead layer 34 is defined as Rs12, the length of the laminated body 38 vertically extending from the opposed face to the magnetic recording medium toward the inside of the element, or the elevation of the element Hg2, is adjusted in the range of 0.2 to 0.5 $\mu m$, and the sheet resistance Rsg2 of the laminated body 38 is adjusted in the range of 15 to 25 $\Omega/M^2$. Therefore, the sense current flowing in from the overlay part 34a can be reduced to reduce the shunt sense current flowing in through the hard bias layer 32.

The relation of $(Rs12/H12) \leq 0.5 \ \Omega/\mu m$ is valid between H12 and Rs12 in the spin-valve type thin film magnetic element 1, when Hg2 is adjusted in the range of 0.2 to 0.5/μm and Rsg2 is adjusted in the range of 15 to 25 Ω/M². Accordingly, the sense current flowing in from the overlay part 34a can be reduced to further reduce the shunt sense current flowing in through the hard bias layer 32.

Since the angle $\theta_2$ formed between the surface of the overlay part 34a of the lead layer 34 and the surface of the laminated body 38 falls within the range of 45 to 70 degrees in the spin-valve type thin film magnetic element 1, resistance against the sense current flowing in from the overlay part 34a may be further reduced to further reduce the shunt sense current flowing in from the hard bias layer 32.

Since the shunt sense current flowing in through the hard bias layer 32 is reduced in the spin-valve type thin film magnetic element 1 as described above, side reading of the spin-valve type thin film magnetic element 1 can be more effectively prevented. In addition, the rate of change of magnetoresistance in the micro-magnetic field in the sensitive zone S is further improved, thereby enabling the output characteristics of the spin-valve type thin film magnetic element 1 to be further improved.

The spin-valve type thin film magnetic element according to the present invention preferably satisfies the relation represented by $(RS12/H12)/(Rsg2/Hg2) \leq 0.02$, when the length of the electrode layer vertically extending from the opposed face to the recording medium toward the inside of the element is defined as H1, the sheet resistance of electrode is defined as Rs1, the length of the laminated body vertically extending from the opposed face to the magnetic recording medium toward the inside of the element, or the elevation of the element, is defined as Hg, and the sheet resistance of the laminated body is defined as Rsg2. Alternatively, the resistance per unit length in the X1-direction of the electrode layer is preferably represented by the relation of $(Rs1/H1) \leq 1$ Ω/μm in the spin-valve type thin film magnetic element according to the present invention, when the length vertically extending from the opposed face to the magnetic recording medium toward the inside of the electrode is represented by H1, the sheet resistance of the electrode layer is represented by Rs1, the length vertically extending from the opposed face to the recording medium toward the inside of the laminated body, or the elevation of the element Hg, is adjusted within the range of 0.2 to 0.5 μm, and the sheet resistance Rsg of the laminated body is adjusted within the range of 15 to 25 Ω/M². However, either one of the relations above may be valid in the spin-valve type thin film magnetic element according to the present invention.

The construction of the spin-valve type thin film magnetic element according to the present invention is not particularly restricted. For example, although the hard bias layer may be provided as the bias layer, an exchange bias layer formed by laminating a ferromagnetic layer and antiferromagnetic layer may be provided as the bias layer.

In the spin-valve type thin film magnetic element according to the present invention, at least one of the pinned magnetic layer and free magnetic layer is divided into two layers by being separated with a non-magnetic intermediate layer, and the divided layers may be put into a ferrimagnetic state having the directions of magnetization of by 180° different with each other, or all the pinned magnetic layer and free magnetic layer are not put into the ferrimagnetic state.

In the spin-valve type thin film magnetic element according to the present invention, a backed layer may be provided as the mean free path extension layer as shown in the first embodiment, a specular layer may be provided as the mean free path extension layer as shown in the second embodiment, or no mean free path extension layer is provided as shown in the third embodiment.

For example, both the backed layer and specular layer may be provided by laminating the specular layer on the opposed side to the face where the backed layer connected to the free magnetic layer contacts the free magnetic layer. The spin filter effect of the backed layer, and an effect for improving the rate of change of magnetoresistance by the specular effect of the specular layer may be simultaneously manifested in the spin-valve type thin film magnetic element having the construction as described above.

When both the backed layer and specular layer are provided as the mean free path extension layers, it is desirable that the thickness of the specular layer and the thickness of the backed layer are determined as a total thickness of the mean free path extension layer including them.

The thickness of the mean free path extension layer, or the thickness of the backed layer, may fall within a range of 5 to 30 angstroms. A thickness of the mean free path extension layer of smaller than 5 angstroms is not preferable, since the mean free path extension effect cannot be fully manifested to deteriorate the output characteristics of the spin-valve type thin film magnetic element.

The upper limit of the thickness of the specular layer is determined by the regenerative gap width, and should be approximately 500 angstroms or less.

A potential barrier is formed by the specular layer in the vicinity of the interface between the backed layer and specular layer. This barrier permits the up-spin conduction electrons traveling in the backed layer to be reflected at near the interface between the backed layer and specular layer while conserving their spin state. Consequently, the so-called specular effect is manifested by further extending the mean free path of the up-spin conduction electrons.

Since the up-spin conduction electrons having a extended mean free path due to the spin-filer effect of the backed layer may undergo specular reflection at near the interface between the backed layer and specular layer, the mean free path of the up-spin conduction electrons may be further extended and a so-called specular effect is expressed, thereby enabling the rate of change of magnetoresistance to be more enhanced.

The thin film magnetic head according to the present invention will be described in detail hereinafter.

Figure 20:
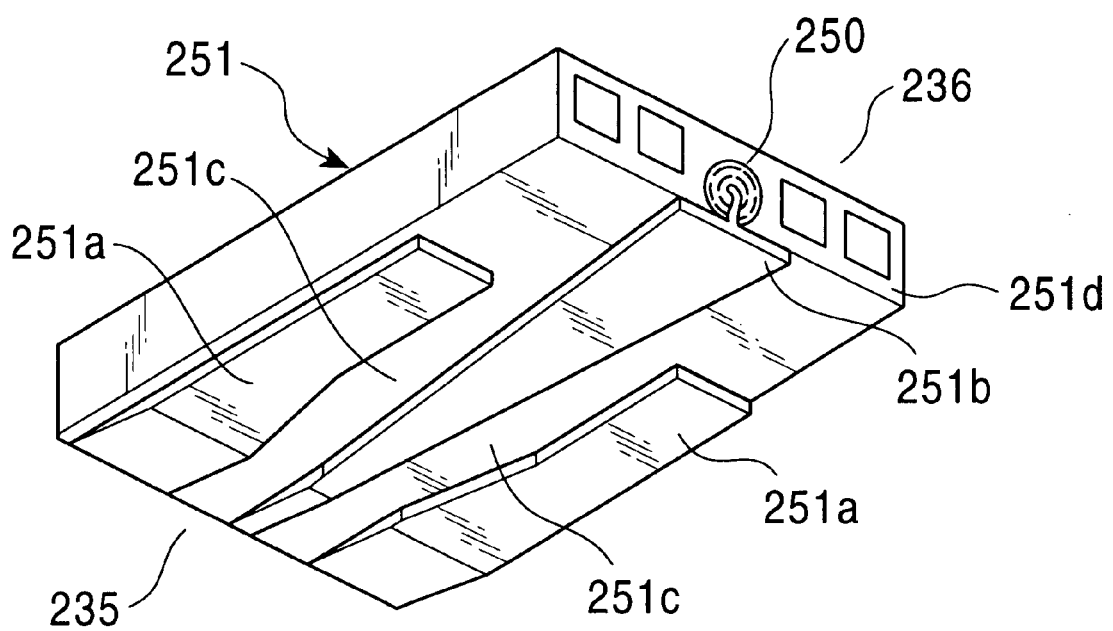
FIG. 20 is a perspective view showing one example of the thin film magnetic head according to the present invention.

FIG. 20 is a perspective view showing one example of the thin film magnetic head according to the present invention.

This thin film magnetic head is of a floating type to be mounted on a magnetic recording medium such as a hard disk device. The side denoted by a reference numeral 235 in FIG. 20 is a leading side directed in the upstream side in the travel direction of the disk face in a slider 251 of the thin film magnetic head, and the side denoted by a reference numeral 236 is a trailing side. Rails of ABS faces (air bearing side: floating face of the rails) 251a and 251b, and air groups 251c are formed on a face of the slider 251 opposed to the disk.

A magnetic core 250 is provided at an end face 251d at the trailing side of the slider 251.

Figure 21:
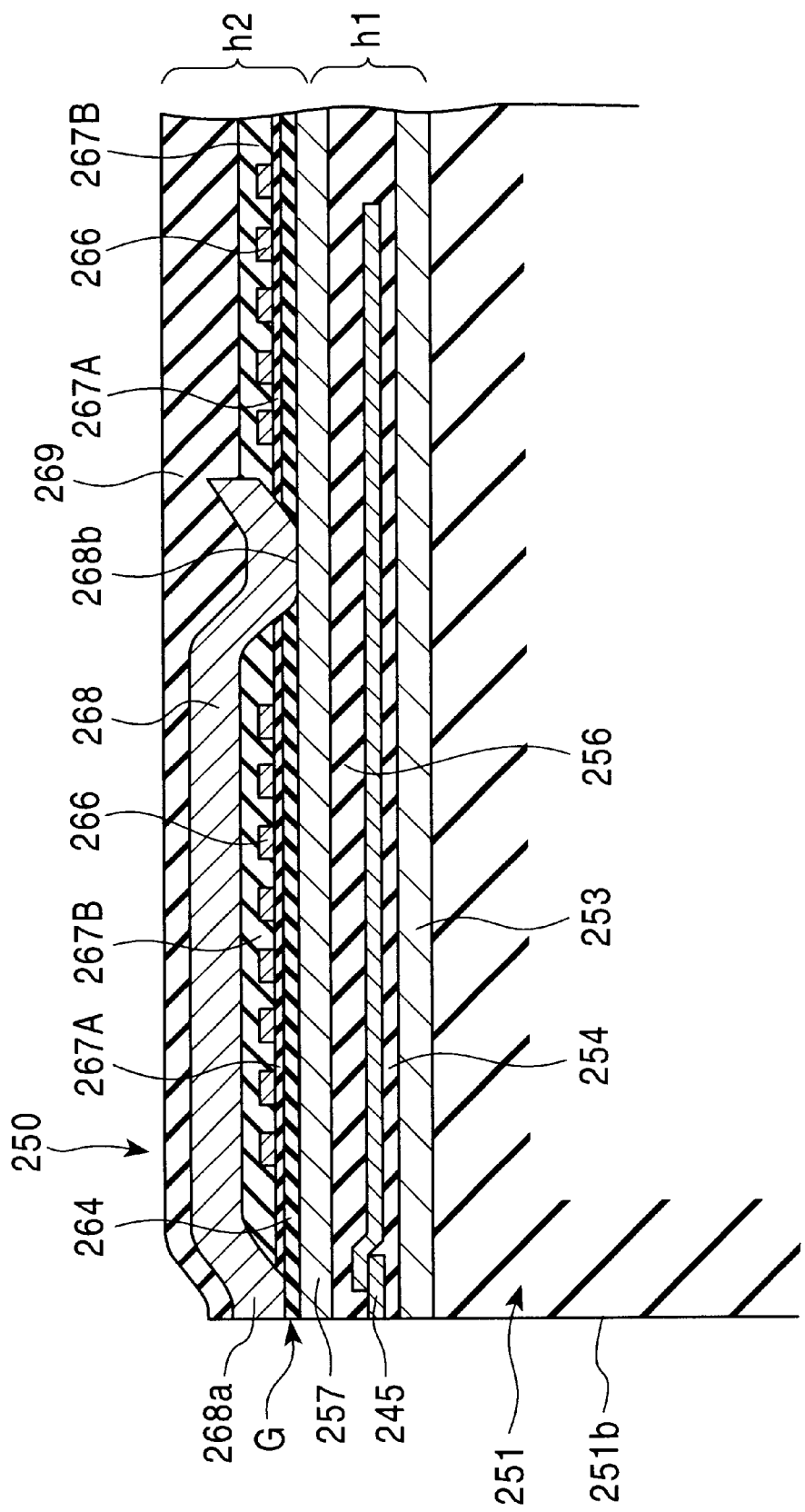
FIG. 21 is a cross section showing the magnetic core part of the thin film magnetic head shown in FIG. 20.
Figure 22:
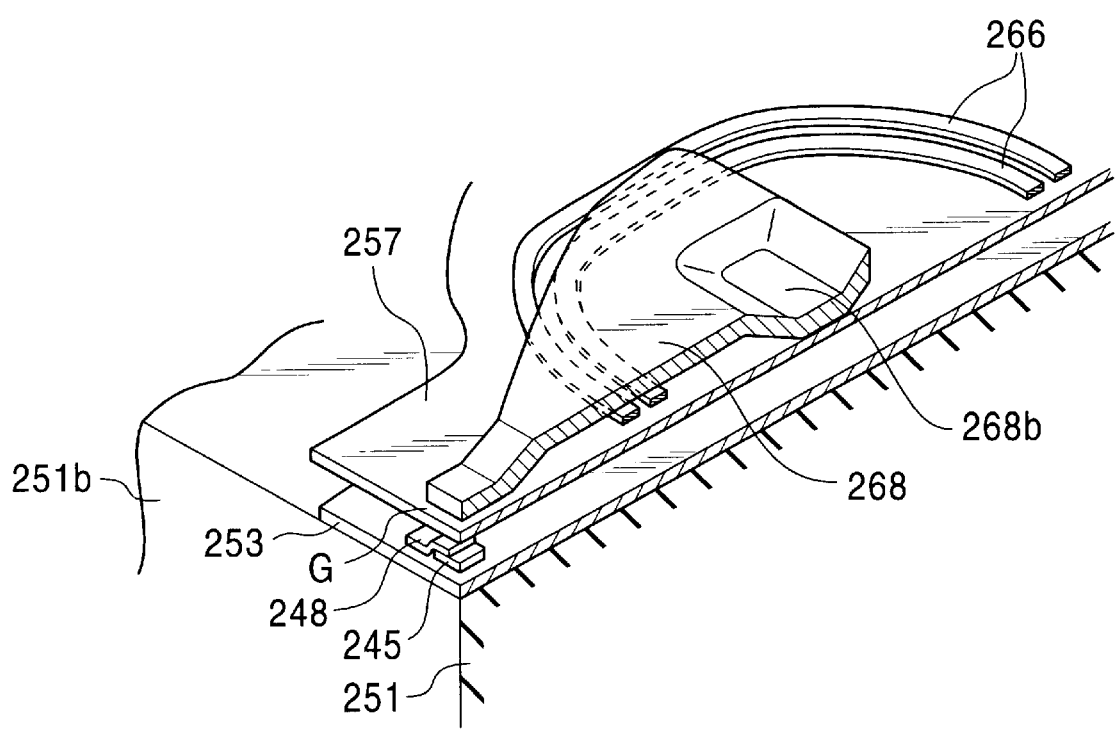
FIG. 22 is a schematic perspective view showing the thin film magnetic head shown in FIG. 21.

The magnetic core 250 of the thin film magnetic head in this embodiment is a composite type magnetic head with the structures shown in FIGS. 21 and 22, and is constructed by laminating a MR head (read head) h1 and an inductive head (write head) h2 in this order on the tailing side end face 251d of the slider 251.

In the MR head h1 in this embodiment, a lower gap layer 254 is provided on a lower shield layer 253 comprising a magnetic alloy formed at the end of the trailing side of the slider 251 that also serves as a substrate. A magnetoresistive element layer 245 is laminated on this lower gap layer 254. An upper gap layer 256 is formed on the magnetoresistive element layer 245, and an upper shield layer 257 is formed thereon. The upper shield layer 257 is also used as a lower core layer of the inductive head h2 provided thereon.

This MR head h1 makes resistance of the magnetoresistive layer 245 to change by sensing a fine leak magnetic field from the magnetic recording medium such as the hard disk, and recorded contents of the recording medium are read by reading resistance changes.

The magnetoresistive element layer 245 provided on the MR head h1 comprises the spin-valve type thin film magnetic element as hitherto described.

The spin-valve type thin film magnetic element is the most important member for constructing the thin film magnetic head (regenerative head).

The inductive head h2 comprises a gap layer 264 on the lower core layer 257, and a coil layer 266 patterned into a planar spiral is formed thereon. The coil layer 266 is surrounded by a first insulation layer 267A and second insulation layer 267B. One end of a magnetic pole 268a of an upper core layer 268 formed on the second insulation layer 267B is faced to the lower core layer 257 with a magnetic gap G apart on the ABS face 251b, and the other end 268b thereof is magnetically coupled with the lower core 257.

A protective layer 269 made of alumina is provided on the upper core layer 268.

In the inductive head h2 so constructed as described above, a recording current flow in the coil layer 266, and a recording magnetic flux is applied from the coil layer 266 to the core layer. The inductive head h2 is provided so that a magnetic signal is recorded on the magnetic recording medium such as a hard disk by taking advantage of the leak magnetic field from the tips of the lower core layer 257 and upper core layer 268 at the magnetic gap G.

For manufacturing the thin film magnetic head according to the present invention, the spin-valve type thin film magnetic element for forming the magnetoresistive element layer 254 is formed after forming the lower gap layer 254 on the lower shield layer 253 made of a magnetic material as shown in FIG. 21. Then, the upper shield layer 257 is formed on the spin-valve type thin film magnetic element by being separated with the upper shield layer 256, thereby completing the MR head (read head) h1.

Subsequently, the gap layer 264 is formed on the lower core layer 257 that also serves as the upper shield layer 257 of the MR head h1, and the spiral coil layer 266 is formed thereon so that the coil layer is surrounded by the first and second insulation layers 267A and 267B. The upper core layer 268 is successively formed on the second insulation layer 267B, and the protective layer 269 is formed on the upper core layer 268 to complete the thin film magnetic head.

The thin film magnetic head comprising the spin-valve type thin film magnetic element as hitherto described has high regenerative output of magnetic information with low incidence of side reading.

The constructions of the slider and inductive head of the thin film magnetic head are not restricted to those shown in FIGS. 20 to 22, and sliders and inductive heads having various other constructions may be employed.

EXAMPLES

The spin-valve type thin film magnetic element having the same construction as in the first embodiment shown in FIG. 1 was manufactured under the conditions shown in Table 1, which are exemplified as examples 1 to 15 and conventional Examples 1 to 3.

TABLE 1

| | | THICKNESS OF ELECTRODE t (Å) | LENGTH OF ELECTRODE $H_1$ (μm) | RESISTIVITY OF ELECTRODE $\rho_1$ (μΩ · cm) | SHEET RESISTANCE OF ELECTRODE $Rs_1$ (Ω/M$^2$) | ANGLE OF ELECTRODE θ (deg) | $Rs_1/H_1$ (Ω/μm) |
|---|---|---|---|---|---|---|---|
| EXAMPLE | 1 | 900 | 1.8 | 7 | 0.7 | 90 | 0.4 |
| | 2 | 900 | 1.8 | 7 | 0.7 | 45 | 0.4 |
| | 3 | 900 | 1.8 | 7 | 0.7 | 30 | 0.4 |
| | 4 | 900 | 1.8 | 7 | 0.7 | 20 | 0.4 |
| | 5 | 900 | 1.8 | 18.5 | 2.0 | 90 | 1.1 |
| | 6 | 900 | 1.8 | 18.5 | 2.0 | 20 | 1.1 |
| | 7 | 900 | 1.8 | 18.5 | 2.0 | 30 | 1.1 |
| | 8 | 900 | 1.8 | 18.5 | 2.0 | 45 | 1.1 |
| | 9 | 450 | 5 | 18.5 | 4.1 | 90 | 0.8 |
| | 10 | 450 | 5 | 18.5 | 4.1 | 90 | 0.8 |
| | 11 | 450 | 5 | 18.5 | 4.1 | 90 | 0.8 |
| | 12 | 900 | 5 | 18.5 | 2.0 | 90 | 0.4 |
| | 13 | 900 | 5 | 18.5 | 2.0 | 90 | 0.4 |
| | 14 | 900 | 5 | 18.5 | 2.0 | 90 | 0.4 |
| | 15 | 450 | 1.8 | 3.5 | 0.7 | 90 | 0.4 |
| CONVENTIONAL EXAMPLE | 1 | 900 | 1.8 | 18.5 | 2.0 | 90 | 1.1 |
| | 2 | 900 | 1.8 | 18.5 | 2.0 | 90 | 1.1 |
| | 3 | 450 | 5 | 18.5 | 4.1 | 90 | 0.8 |

| | | LENGTH OF GMR ELEMENT Hg (μM) | SHEET RESISTANCE OF GMR Rsg (Ω/M$^2$) | Rsg/Hg (Ω/μm) | $(Rs_1/H_1)/$ (Rsg/Hg) | RELATIVE OUTPUT AT OFF-TRACK POSITION | EFFECTIVE TRACK WIDTH |
|---|---|---|---|---|---|---|---|
| EXAMPLE | 1 | 0.3 | 19.96 | 66.53 | 0.006 | 0.0086 | 0.362 |
| | 2 | 0.3 | 19.96 | 66.53 | 0.006 | 0.0088 | 0.365 |
| | 3 | 0.3 | 19.96 | 66.53 | 0.006 | 0.0084 | 0.370 |
| | 4 | 0.3 | 19.96 | 66.53 | 0.006 | 0.009 | 0.374 |
| | 5 | 0.3 | 19.96 | 66.53 | 0.017 | 0.0248 | 0.367 |

TABLE 1-continued

|  |  |  |  |  |  |  |  |
|---|---|---|---|---|---|---|---|
|  | 6 | 0.3 | 19.96 | 66.53 | 0.017 | 0.0239 | 0.392 |
|  | 7 | 0.3 | 19.96 | 66.53 | 0.017 | 0.0242 | 0.385 |
|  | 8 | 0.3 | 19.96 | 66.53 | 0.017 | 0.0245 | 0.377 |
|  | 9 | 0.3 | 19.96 | 66.53 | 0.012 | 0.0185 | 0.365 |
|  | 10 | 0.4 | 19.96 | 49.9 | 0.016 | 0.0217 | 0.376 |
|  | 11 | 0.5 | 19.96 | 39.92 | 0.020 | 0.0244 | 0.385 |
|  | 12 | 1 | 19.96 | 19.96 | 0.020 | 0.0245 | 0.415 |
|  | 13 | 0.5 | 19.96 | 39.92 | 0.010 | 0.0088 | 0.381 |
|  | 14 | 0.3 | 19.96 | 66.53 | 0.006 | 0.0082 | 0.362 |
|  | 15 | 0.3 | 19.96 | 66.53 | 0.006 | 0.009 | 0.362 |
| CONVENTIONAL | 1 | 0.5 | 19.96 | 39.92 | 0.028 | 0.0331 | 0.387 |
| EXAMPLE | 2 | 0.7 | 19.96 | 28.51 | 0.040 | 0.0408 | 0.403 |
|  | 3 | 1 | 19.96 | 19.96 | 0.041 | 0.0339 | 0.425 |

The term "thickness of the electrode" in Table 1 refers to the dimension denoted by a symbol t in Fog. 1, or the thickness of the electrode layer as measured from the opposed face to the magnetic recording medium.

The term term "length of the electrode" refers to the length vertically extending from the opposed face to the magnetic recording medium toward the inside of the electrode layer, and the term "sheet resistance" refers to the resistivity of the electrode layer divided by the thickness of the electrode layer. The term "length of the GMR element" refers to the length vertically extending from the opposed face to the magnetic recording medium toward the inside of the laminated body, or generally termed as "elevation of the element". The term "GMR sheet resistance" refers to the resistivity of the laminated body divided by the total thickness of the laminated body.

The term "electrode angle" refers to the angle formed between the surface of the overlay part of the electrode and the surface of the laminated body.

The term "relative output at the off-track position" as used herein refers to the mean value of the regenerative output at the positions by ±0.7 µm apart from the center of the element of the spin-valve type thin film magnetic element (off-track position) divided by the regenerative output at the center of the element.

The term "effective track width" refers to the width of the laminated body that generates an regenerative output of 50% or more relative to the maximum regenerative output, which was determined by the micro-track profile method.

The thickness of each layer in the laminated body 16 of the spin-valve type thin film magnetic element in the examples 1 to 15 and conventional examples 1 to 3 is adjusted, from the bottom, as Ta 30/PtMn1 150/Co 20/Ru 8/Co 25/Cu 25/Co 10/NiFe 30/Cu 15/Ta 30 (each numeral is expressed in an angstrom unit).

In FIG. 1, the track width Tw was adjusted to 0.35 µm, and the combined width of the track width Tw and the width T of each overlay part 18*a* at each side of the tracke width was adjusted to 2.0 µm.

Figure 25:
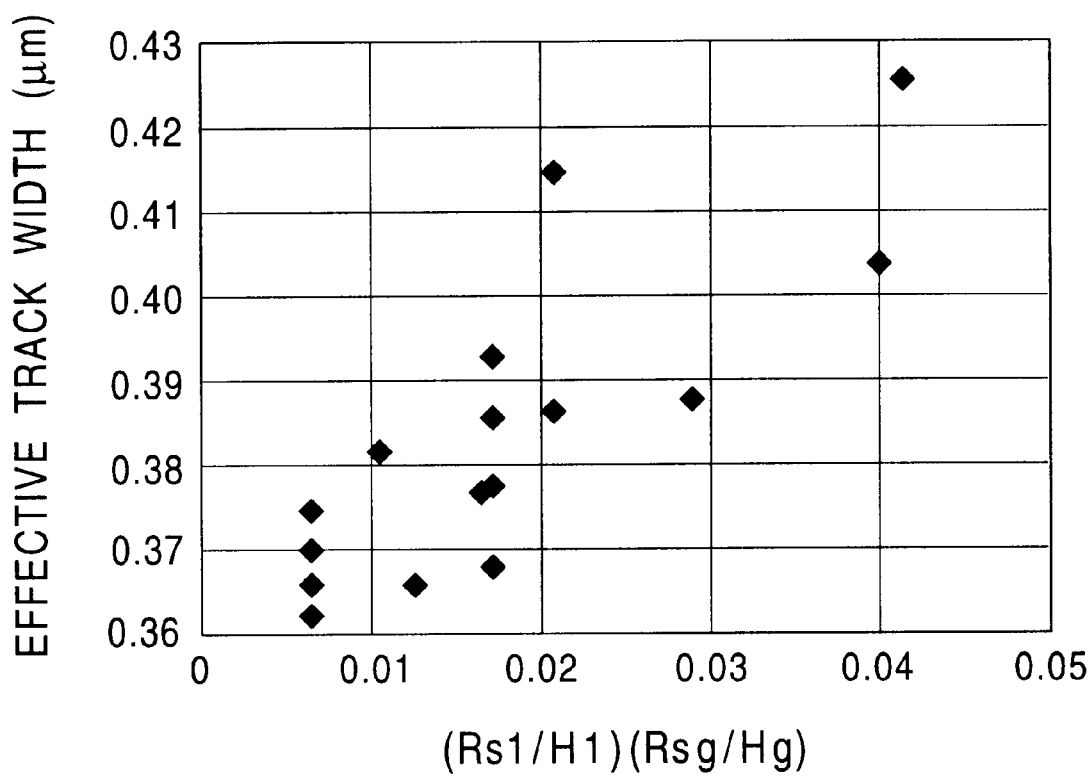
FIG. 25 is a graph showing the relation between (Rs1/H1)/(Rsg/Hg) and effective track width.

The relation between the value of (Rs1/H1)/(Rsg/Hg) and the effective track width of the spin-valve type thin film magnetic element in each of the examples 1 to 15 and conventional examples 1 to 3 was investigated, and the result is shown in FIG. 25.

FIG. 25 shows that the track width is narrowed in the spin-valve type thin film magnetic element having a (Rs1/H1)/(Rsg/Hg) value in the preferable range of 0.02 or less. FIG. 25 also shows that the track width is more narrowed in the spin-valve type thin film magnetic element having a (Rs1/H1)/(Rsg/Hg) value in the preferable range of 0.01 or less.

Figure 26:
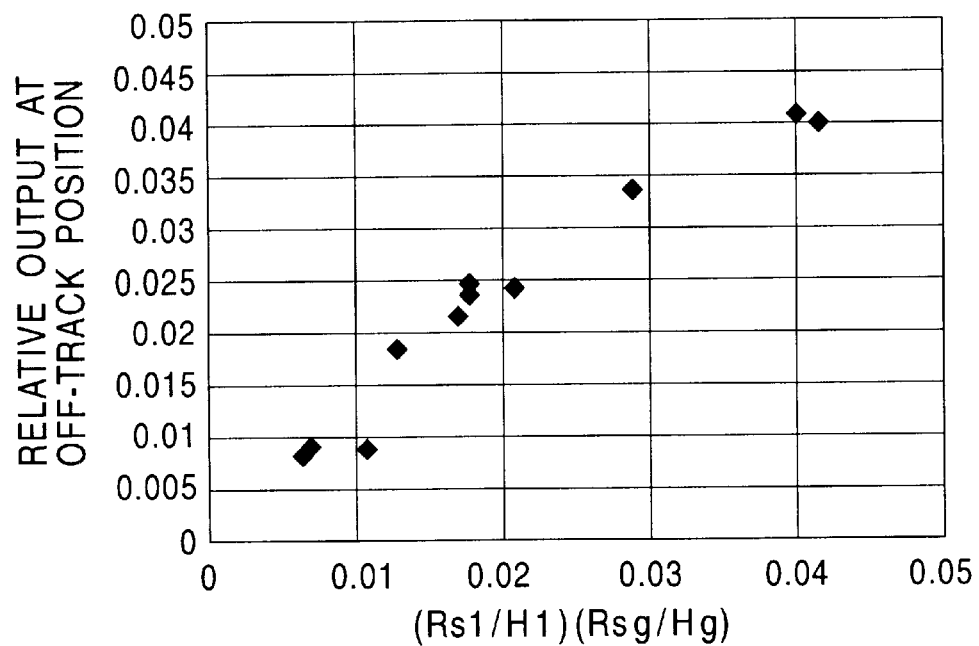
FIG. 26 is a graph showing the relation between (Rs1/H1)/(Rsg/Hg) and relative output at the off-track position.

The relation between the value of (Rs1/H1)/(Rsg/Hg) and the relative output at the off-track position in each of the spin-valve type thin film magnetic element in the examples 1 to 15 and conventional examples 1 to 3 was investigated, and the result is shown in FIG. 26.

FIG. 26 shows that the relative output is reduced at the off-track position in the spin-valve type thin film magnetic element having the (Rs1/H1)/(Rsg/Hg) value in a preferable range of 0.02 or less. It was also confirmed that the relative output is further reduced at the off-track position in the spin-valve type thin film magnetic element having the (Rs1/H1)/(Rsg/Hg) value in a more preferable range of 0.01 or less.

The relation between the (Rs1)/H1) value and the relative output at the off-track position was investigated in each spin-valve type thin film magnetic element in the examples 1 to 15 and in the conventional examples 1 to 3. The result is shown in FIG. 27.

Figure 27:
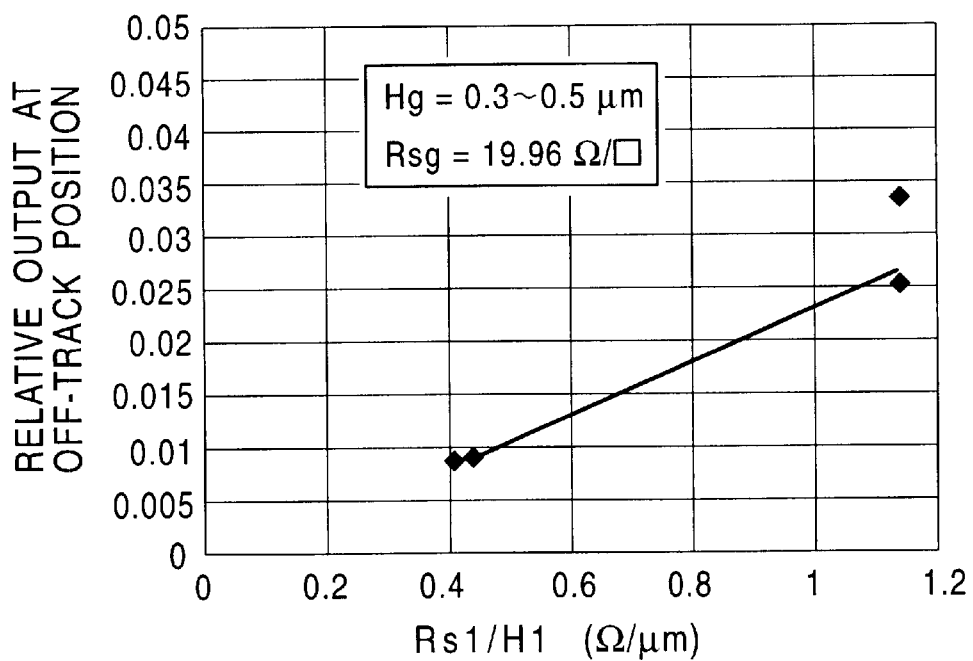
FIG. 27 is a graph for investigating the relation between (Rs1/H1)/(Rsg/Hg) and relative output at the off-track position.

The examples having the Hg values in the range of 0.3 to 0.5 µm among the examples shown in Table 1 are plotted in FIG. 27. FIG. 27 shows that the relative output at the off-track position is reduced in the spin-valve type thin film magnetic element having a (Rs1/H1) value within the preferable range of 1 $\Omega/\mu m$. It was also confirmed that the relative output at the off-track position is further reduced in the spin-valve type thin film magnetic element having a (Rs1/H1) value within the more preferable range of 0.5 $\Omega/\mu m$.

The relation between the electrode angle θ and effective track width was investigated using the spin-valve type thin film magnetic element in the examples 1 to 8. The result is shown in FIG. 28.

Figure 28:
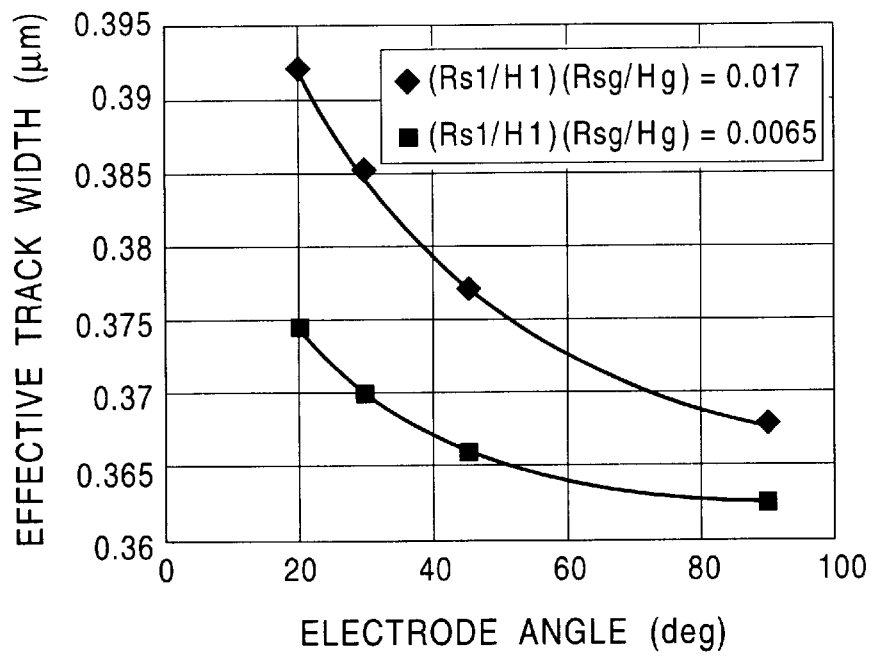
FIG. 28 is a graph for investigating the relation between the electrode angle θ and effective track width.

The symbols (♦) and (■) in FIG. 28 show the results in the examples 1 to 4, and the results in the examples 5 to 8, respectively.

FIG. 28 shows that the effective track width is narrowed when the electrode angle falls within a preferable range of 45 to 70 degrees. It is also shown that the track width is suddenly widened at an angle less than 45 degrees.

The effective track width is more narrowed in the examples 1 to 4 having the (Rs1/H1)/(Rsg/Hg) values within the range of less than 0.01, as compared with the examples 5 to 8 having the (Rs1/H1)/(Rsg/Hg) values of 0.01 or more.

The regenerative output was measured by the micro-track profile method with respect to the spin-valve type thin film magnetic element in the examples 1 and 13, and in the conventional example 1.

Figure 29:
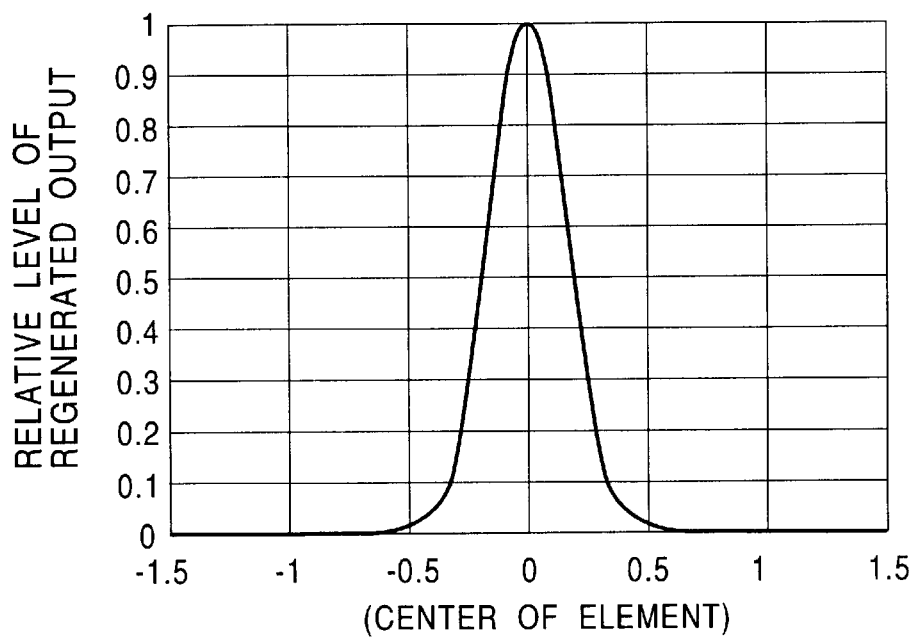
FIG. 29 is a graph showing the micro-track profile in Example 1.
Figure 30:
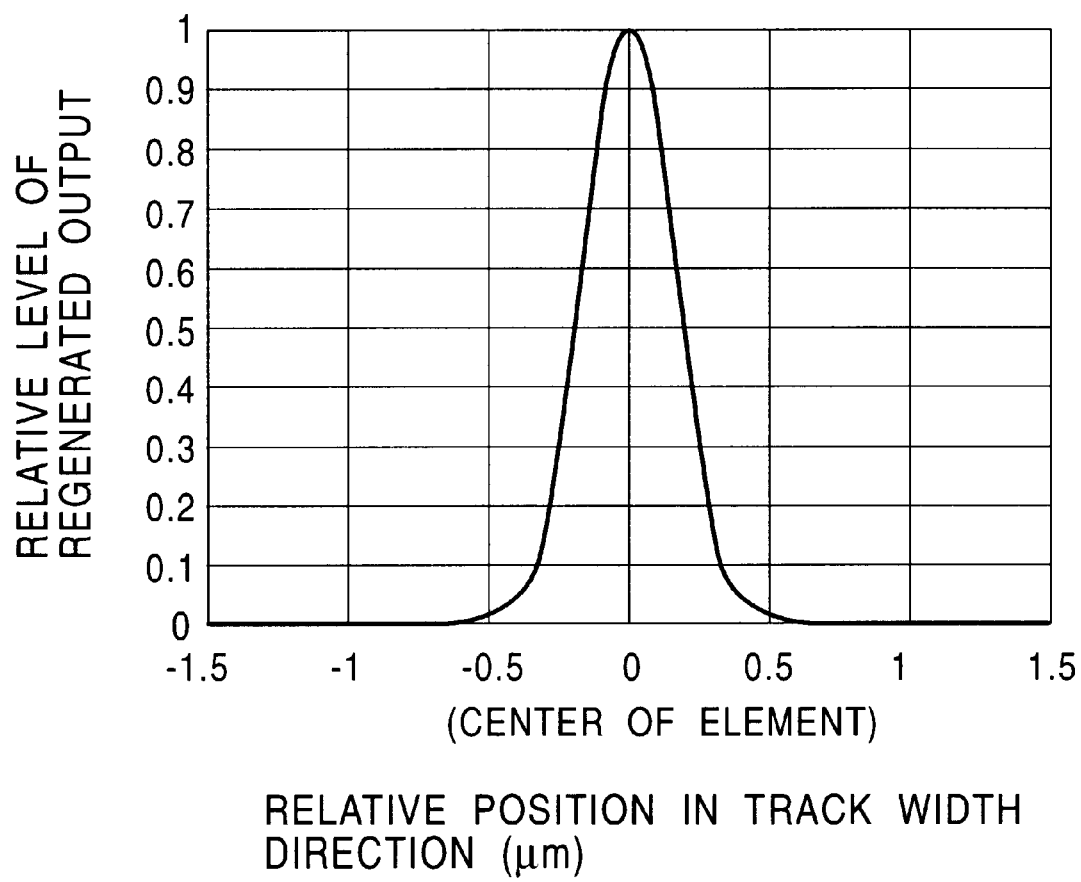
FIG. 30 is a graph showing the micro-track profile in Example 13.
Figure 31:
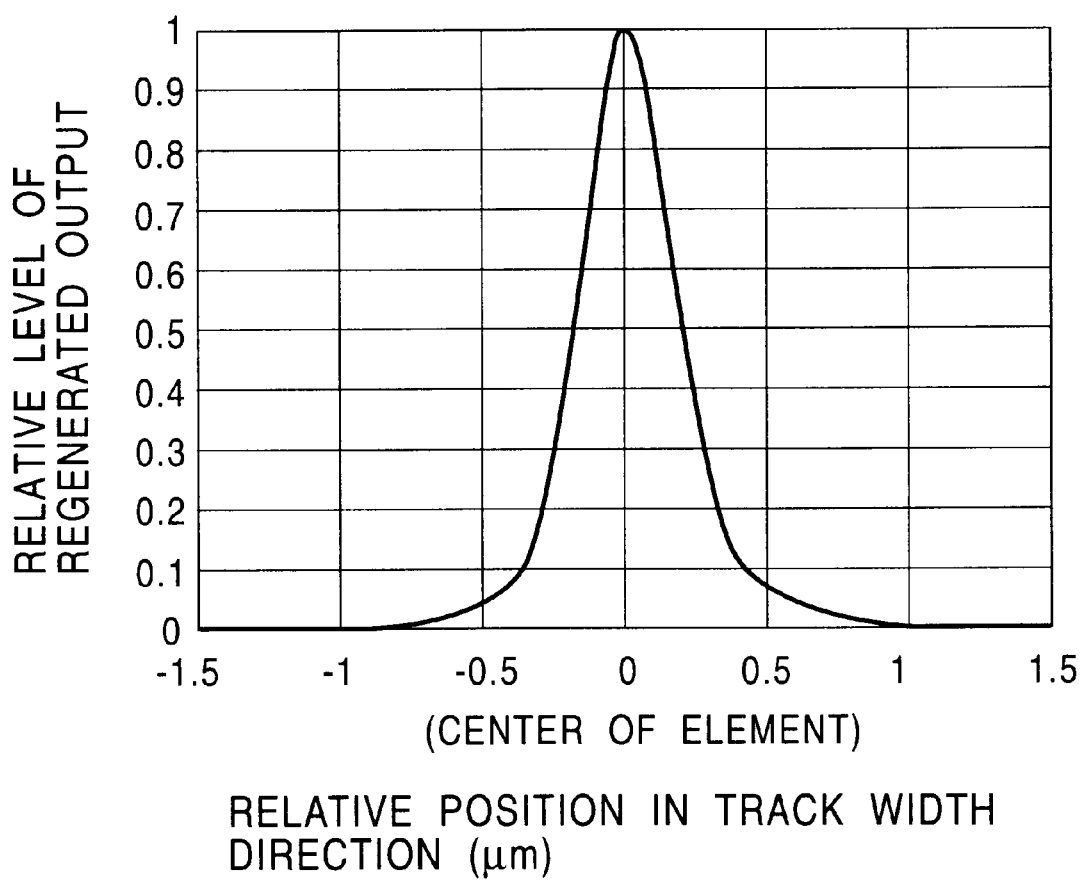
FIG. 31 is a graph showing the micro-track profile in Conventional Example 1.

The results are shown in FIGS. 29, 30 and 31.

FIG. 29 is a graph showing the relative value of the regenerative output in the example 1, FIG. 30 is a graph showing the relative value of the regenerative output in the example 13, and FIG. 31 is a graph showing the relative value of the regenerative output in the conventional example 1.

It was revealed from the comparison among FIGS. 29, 30 and 31 that, while the element is sensitive at the position by ±0.7 μm apart from the center of the element (off-track position) as shown in the relative value of the regenerative output in the conventional example shown in FIG. 31, the element is insensitive at the off-track position as shown in the relative value of the regenerative output in the examples 1 and 13 shown in FIGS. 29 and 30.

The results suggest that side reading hardly occurs in the examples 1 and 13 as compared with the conventional example 1.

What is claimed are:

1. A spin valve type thin film magnetic element comprising:
    a laminated body formed by laminating, on a substrate, at least an antiferromagnetic layer, a pinned magnetic layer formed in contact with the antiferromagnetic layer in which the direction of magnetization is fixed by an exchange coupling magnetic field with the antiferromagnetic layer, and a free magnetic layer formed on the pinned magnetic layer by being separated with a non-magnetic conductive layer, the direction of magnetization of the free magnetic layer being aligned to be approximately perpendicular to the direction of magnetization of the pinned magnetic layer;
    a bias layer for aligning the direction of magnetization of the free magnetic layer to be approximately perpendicular to the direction of magnetization of the pinned magnetic layer; and
    an overlay part extending on the surface side of the laminated body from each side toward the center of the laminated body,
    a pair of electrode layers for flowing a sense current in the laminated body being further provided,
    wherein the relation represented by the following general equation is valid when the length of the electrode layer vertically extending in the direction from an opposed face to a magnetic recording medium toward the inside of the magnetic element is represented by H1, a sheet resistance of the electrode layer is represented by Rs1, the length of the laminated body vertically extending in the direction from an opposed face to the magnetic recording medium toward the inside of the magnetic element, or the elevation of the magnetic element, is represented by Hg, and the sheet resistance of the laminated body is represented by Rsg:

$(Rs1/H1)/(Rsg/Hg) \leq 0.02$.

2. A spin-valve type thin film magnetic element according to claim 1, wherein the relation among H1, Rs1, Hg and Rsg is represented by the following general equation:

$(Rs1/H1)/(Rsg/Hg) \leq 0.01$.

3. A spin-valve type thin film magnetic element according to claim 1, wherein the angle formed between the surface of the overlay part of the electrode layer and the surface of the laminated body is within the range of 45 degrees to 70 degrees.

4. A spin-valve type thin film magnetic element according to claim 1 comprising a dual structure in which the non-magnetic conductive layer, pinned magnetic layer and antiferromagnetic layer are formed on each side in the direction of thickness of the free magnetic layer.

5. A spin-valve type thin film magnetic element according to claim 1 comprising a mean free path extension layer for extending the mean free path of conduction electrons.

6. A spin-valve type thin film magnetic element according to claim 1, wherein at least one of the pinned magnetic layer and free magnetic layer is divided in two parts by being separated with a non-magnetic intermediate layer, and the direction of magnetization of one of the divided layer is by 180° different from the direction of magnetization of the other divided layer to form a ferrimagnetic state.

7. A spin-valve type thin film magnetic element according to claim 1, wherein the antiferromagnetic layer comprises an alloy containing Mn, and at least one element of Pt, Pd, Rh, Ru, Ir, Os, Au, Ag, Cr, Ni, Ne, Ar, Xe and Kr.

8. A spin valve type thin film magnetic element comprising:
    a laminated body formed by laminating, on a substrate, at least an antiferromagnetic layer, a pinned magnetic layer formed in contact with the antiferromagnetic layer in which the direction of magnetization is fixed by an exchange coupling magnetic field with the antiferromagnetic layer, and a free magnetic layer formed on the pinned magnetic layer by being separated with a non-magnetic conductive layer, the direction of magnetization of the free magnetic layer being aligned to be approximately perpendicular to the direction of magnetization of the pinned magnetic layer;
    a bias layer for aligning the direction of magnetization of the free magnetic layer to be approximately perpendicular to the direction of magnetization of the pinned magnetic layer; and
    an overlay part extending on the surface of the laminated body from the each side toward the center of the laminated body,
    a pair of electrode layers for providing a sense current to the laminated body being further provided,
    wherein the relation represented by the following general equation is valid when the length vertically extending from an opposed face to a magnetic recording medium toward the inside of the magnetic element is represented by H1, the length Hg vertically extending from an opposed face to the magnetic recording medium toward the inside of the magnetic element, or the elevation of the magnetic element, is adjusted in the range of 0.2 to 0.5 μm, and a sheet resistance Rsg of the electrode layer is adjusted in the range of 15 to 25 $\Omega/M^2$:

$(Rs1/H1) \leq 1 \ \Omega/\mu m$.

9. A spin-valve type thin film magnetic element according to claim 8, wherein the relation represented by the following general equation is valid between H1 and Rs1 when Hg is adjusted within the range of 0.2 to 0.5 μm and Rsg is adjusted within the range of 15 to 25 $\Omega/M^2$:

$(Rs1/H1) \leq 0.5 \ \Omega/\mu m$.

10. A spin-valve type thin film magnetic element according to claim 8, wherein the angle formed between the surface of the overlay part of the electrode layer and the surface of the laminated body falls within the range of 45 degrees to 70 degrees.

11. A spin-valve type thin film magnetic element according to claim 8 comprising a dual structure in which the non-magnetic conductive layer, pinned magnetic layer and antiferromagnetic layer are formed on both sides of the free magnetic layer, respectively, in the direction of thickness.

12. A spin-valve type thin film magnetic element according to claim 8 comprising a mean free path extension layer for extending the mean free path of conduction electrons.

13. A spin-valve type thin film magnetic element according to claim 8, wherein at least one of the pinned magnetic layer and free magnetic layer is divided in two parts by being separated with a non-magnetic intermediate layer, and the direction of magnetization of one of the divided layer is by 180° different from the direction of magnetization of the other divided layer to form a ferrimagnetic state.

14. A spin-valve type thin film magnetic element according to claim 8, wherein the antiferromagnetic layer comprises an alloy containing Mn, and at least one element of Pt, Pd, Rh, Ru, Ir, Os, Au, Ag, Cr, Ni, Ne, Ar, Xe and Kr.

* * * * *